(12) United States Patent
Hiramatsu et al.

(10) Patent No.: US 8,384,263 B2
(45) Date of Patent: Feb. 26, 2013

(54) ROTATING ELECTRICAL MACHINE HAVING A COMPACT STATOR

(75) Inventors: Hiromichi Hiramatsu, Yokohama (JP); Takashi Ishigami, Hitachinaka (JP); Yasuyuki Saito, Hitachinaka (JP); Yuichiro Tanaka, Hitachinaka (JP); Kenichi Nakayama, Hitachinaka (JP); Yutaka Matsunobu, Mito (JP); Noriaki Hino, Mito (JP)

(73) Assignee: Hitachi, Ltd., Tokyo (JP)

( * ) Notice: Subject to any disclaimer, the term of this patent is extended or adjusted under 35 U.S.C. 154(b) by 156 days.

(21) Appl. No.: 12/370,082

(22) Filed: Feb. 12, 2009

(65) Prior Publication Data
US 2009/0267441 A1    Oct. 29, 2009

(30) Foreign Application Priority Data

Feb. 14, 2008  (JP) .................. 2008-032527
Feb. 14, 2008  (JP) .................. 2008-032529
Feb. 14, 2008  (JP) .................. 2008-032531

(51) Int. Cl.
*H02K 3/28* (2006.01)
*H02K 3/00* (2006.01)
*H02K 3/04* (2006.01)

(52) U.S. Cl. .................. 310/208; 310/195; 310/198

(58) Field of Classification Search .................. 310/195, 310/198, 201, 203, 206, 207, 208, 179, 180; H02K 3/00, 3/04, 3/12, 3/14, 3/28
See application file for complete search history.

(56) References Cited

U.S. PATENT DOCUMENTS

| 3,345,740 | A  | * | 10/1967 | Murdock et al. .............. 310/206 |
| 5,744,896 | A  | * | 4/1998 | Kessinger et al. ............ 310/208 |
| 6,359,361 | B1 | * | 3/2002 | Wakui et al. .................. 310/198 |
| 6,404,091 | B1 |   | 6/2002 | Nakamura et al. |
| 2005/0200223 | A1 | * | 9/2005 | Tajima et al. ............ 310/156.46 |
| 2006/0066167 | A1 | * | 3/2006 | Saito et al. ................... 310/208 |
| 2008/0174199 | A1 | * | 7/2008 | Ishigami et al. .............. 310/206 |

FOREIGN PATENT DOCUMENTS

| EP | 0 740 403 A1 | 10/1996 |
| JP | 58-63054 A | 4/1983 |
| JP | 64-1444 A | 1/1989 |
| JP | 5-30693 A | 2/1993 |
| JP | 8-298756 A | 11/1996 |
| JP | 2000-350425 A | 12/2000 |
| JP | 2005-51981 A | 2/2006 |

OTHER PUBLICATIONS

Japanese Office Action dated Mar. 13, 2012 including English-language translation (Five (5) pages).

* cited by examiner

*Primary Examiner* — Quyen Leung
*Assistant Examiner* — Michael Andrews
(74) *Attorney, Agent, or Firm* — Crowell & Moring LLP

(57) ABSTRACT

A rotating electrical machine includes a stator including at least two element coils of the same phase each having a plurality of turns and connected to each other through a coil-to-coil connection wire, the element coils being arranged in adjacent slots, respectively; and a rotor rotatably provided to the stator through a gap. The element coils of the same phase are fitted in the adjacent slots so that wound around portions of the element coils partially overlap each other. The coil-to-coil connection wire connects at a coil end portion conductor wires extending from linear conductor wire portions of innermost wires of the element coils contained in the slots.

9 Claims, 66 Drawing Sheets

FIG.13

BEFORE INSERTION

AFTER INSERTION

421

422

4221

16

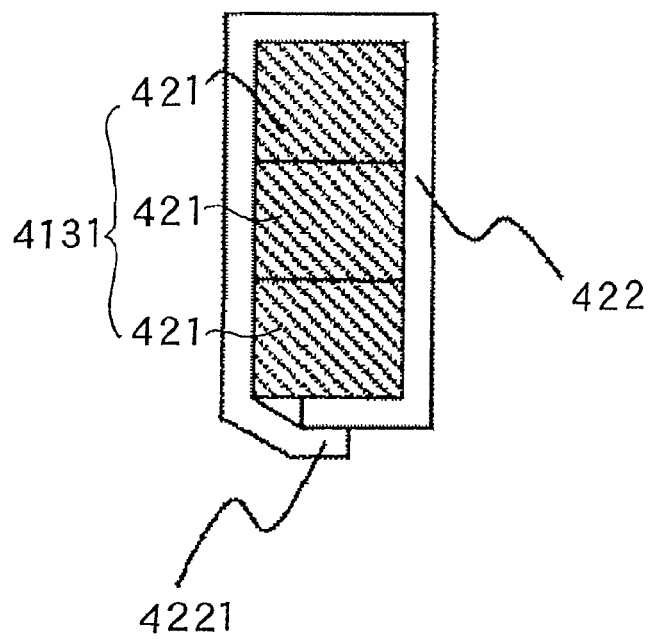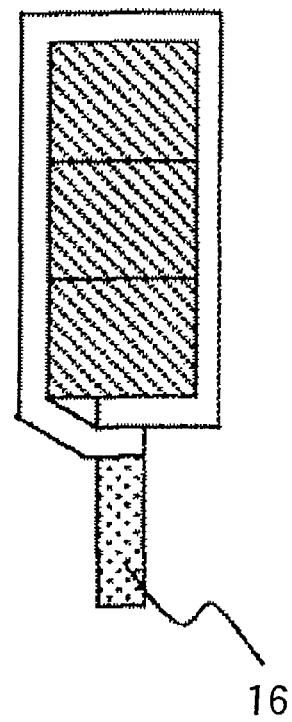

FIG.67A
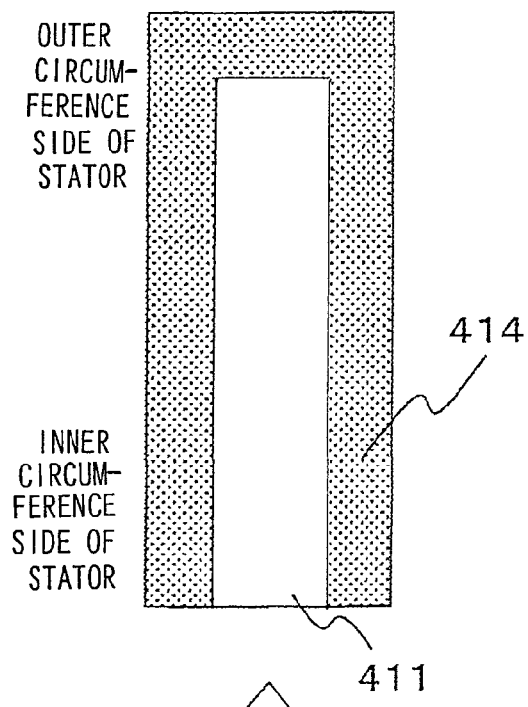
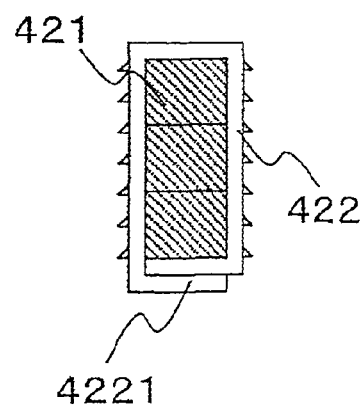
FIG.67B
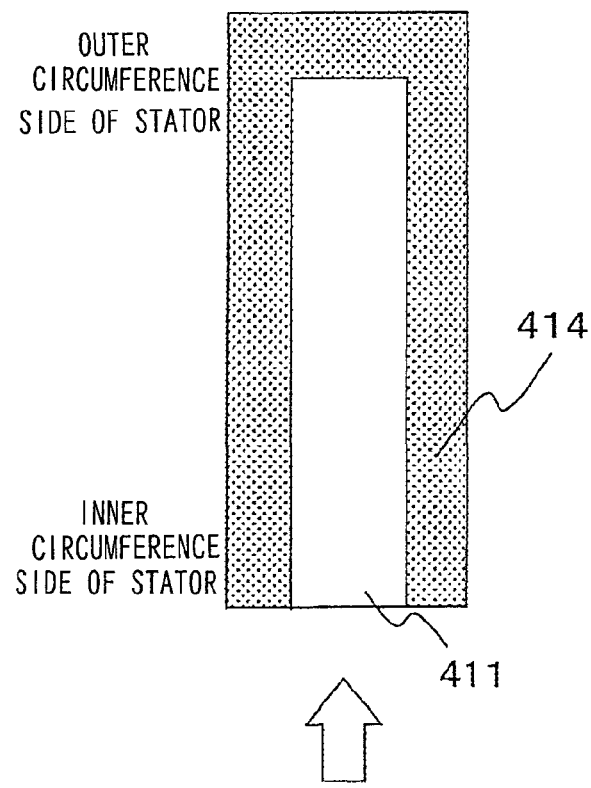
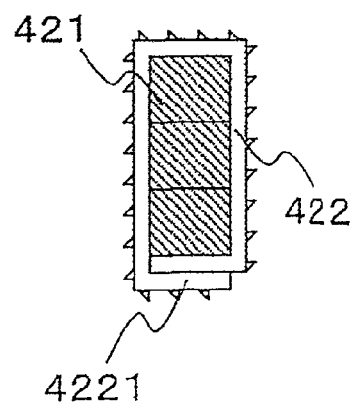

ROTATING ELECTRICAL MACHINE HAVING A COMPACT STATOR

INCORPORATION BY REFERENCE

The disclosures of the following priority applications are herein incorporated by reference:

Japanese Patent Application No. 2008-032529 filed Feb. 14, 2008

Japanese Patent Application No. 2008-032527 filed Feb. 14, 2008

Japanese Patent Application No. 2008-032531 filed Feb. 14, 2008

BACKGROUND OF THE INVENTION

1. Field of the Invention

The present invention relates to rotating electrical machines such as electric motors and generators.

2. Description of Related Art

The tightening regulations on the exhaust gas emission to cope with soaring oil prices and global warming have activated development of electric vehicles and hybrid electric vehicles that use rotating electrical machines such as motors and generators.

Conventional distributed winding stators for these rotating electrical machines include those stators of a lap winding format as disclosed in, for example, JP H08-298756A and JP 2005-51981A. Such a lap winding stator is constituted as follows. A rectangular wire is wound into individual oblong coin-like coils (i.e., ellipse-like coils having two parallel linear sides bridged by round ends; hereafter referred to as ellipse-like coils). Each of the ellipse-like coils is fixed in whole and the fixed wires are subjected to torsional deformation. The coil ends of each coil are formed into a non-interfering format for double layer winding. The individual coils thus obtained are inserted in respective slots to provide a lap winding stator.

A coil for use in a rotating electric machine in the related art is disclosed in, for example, JP S64-1444A. The coil is formed as follows. That is, a temporary fixation tape is wound around an original form coil having a pair of linear regions thereof that are to constitute coil sides of a final coil using a film insulator composed of a wound thermoplastic film. Then, only the linear regions of the original form coil is introduced into an ultrasonic welding apparatus equipped with a fixing apparatus to weld the insulator film of the wire and an insulation tape for insulation from ground is wound. The thus insulated coil is then inserted into a slot.

The conventional distributed winding stator, however, is manufactured by winding and deforming coils one by one. This makes it necessary to provide wire terminals twice the number of the coils and arrange and weld the wire terminals onto the side or top part of the coil ends. This results in an increase in the size of the coil ends, so that it has been difficult to provide compact connection and arrangement of the wire terminals.

Two slot insertion regions of the lap winding coil that are to be inserted into slots are arranged in different slots of the stator, so that they could not be inserted the slots without undergoing elastic deformation. When the lap winding coils are continuously formed, the coils pull each other, resulting in an increase in difficulty of the operation of inserting the coils into the slots. For these reasons, a certain gap (0.1 to 0.2 mm or more) is required between the two coils in order to assemble a continuous lap winding coil of a flat wire with insulation into a slot of the stator. This delimits the space factor and heat dissipation performance of the coil.

In the case of inserting a coil into a slot of a rotating electrical machine, it is desirable that a coil in whole has a flexibility upon deformation of the coil into a shape suitable for inserting it into the slot after having been formed into a wound shape. However, when the coil is inserted into the slot after the deformation, it is necessary to fix the slot insertion region of the coil so that it will not loosen or feaze. The conventional technology would not have sufficiently taken account of achieving a good balance between the two properties.

SUMMARY OF THE INVENTION

It is an object of the present invention to provide a rotating electrical machine that can improve the space factor and radiation performance, achieve size reduction and higher output power, and improve productivity.

To achieve the above-mentioned object, the present invention provides a rotating electrical machine that comprises a stator including at least two element coils of the same phase each having a plurality of turns and connected to each other through a coil-to-coil connection wire, the element coils being arranged in adjacent slots, respectively; and a rotor rotatably provided to the stator through a gap, wherein: the element coils of the same phase are fitted in the adjacent slots so that wound around portions of the element coils partially overlap each other; and the coil-to-coil connection wire connects at a coil end portion conductor wires extending from linear conductor wire portions of innermost wires of the element coils contained in the slots.

A rotating electrical machine according to another embodiment includes: a stator having incorporated there in a plurality of double-layer lap winding coils connected to each other through a bridge wire, with wire of each coil having a substantially rectangular shape; and a rotor rotatably provided to the stator through a gap, wherein slots in the stator are each provided with an outwardly extending inclination on an inner circumference side of an insertion portion where the coil and an insulation are to be inserted.

A rotating electrical machine according to another embodiment includes: a stator including a stator core in which a plurality of slots are formed in a circumferential direction, each of the slots being provided with a coil insertion portion on an inner circumference thereof, and a coil that is formed by winding around a stator winding wire a plurality of times; and a rotor rotatably provided on an inner circumference side of the stator, wherein the coil is bundled by being wrapped with an insulator, a portion of the coil that is wrapped with the insulator is inserted into the slot in a radial direction, and a coil end portion of the coil is not wrapped with the insulator so that the coil is left to be exposed.

BRIEF DESCRIPTION OF THE DRAWINGS

FIG. 13 is a diagram showing the relationship between slot numbers of the stator and the respective coils constituting the stator windings;

FIG. 65A is a diagram illustrating a first step of the process of fixing the insulation material as shown in FIG. 64;

FIG. 65B is a diagram illustrating a second step of the process of fixing the insulation material as shown in FIG. 64;

FIG. 67A is a diagram illustrating a third example of the other embodiment, indicating a first step of the process of fixing the insulation material;

FIG. 67B is a diagram illustrating a third example of the other embodiment, showing a second step of the insulation material fixing process; and

DETAILED DESCRIPTION OF THE INVENTION

Hereinafter, embodiments of the present invention are described with reference to the attached drawings.

First Embodiment

Figure 47:
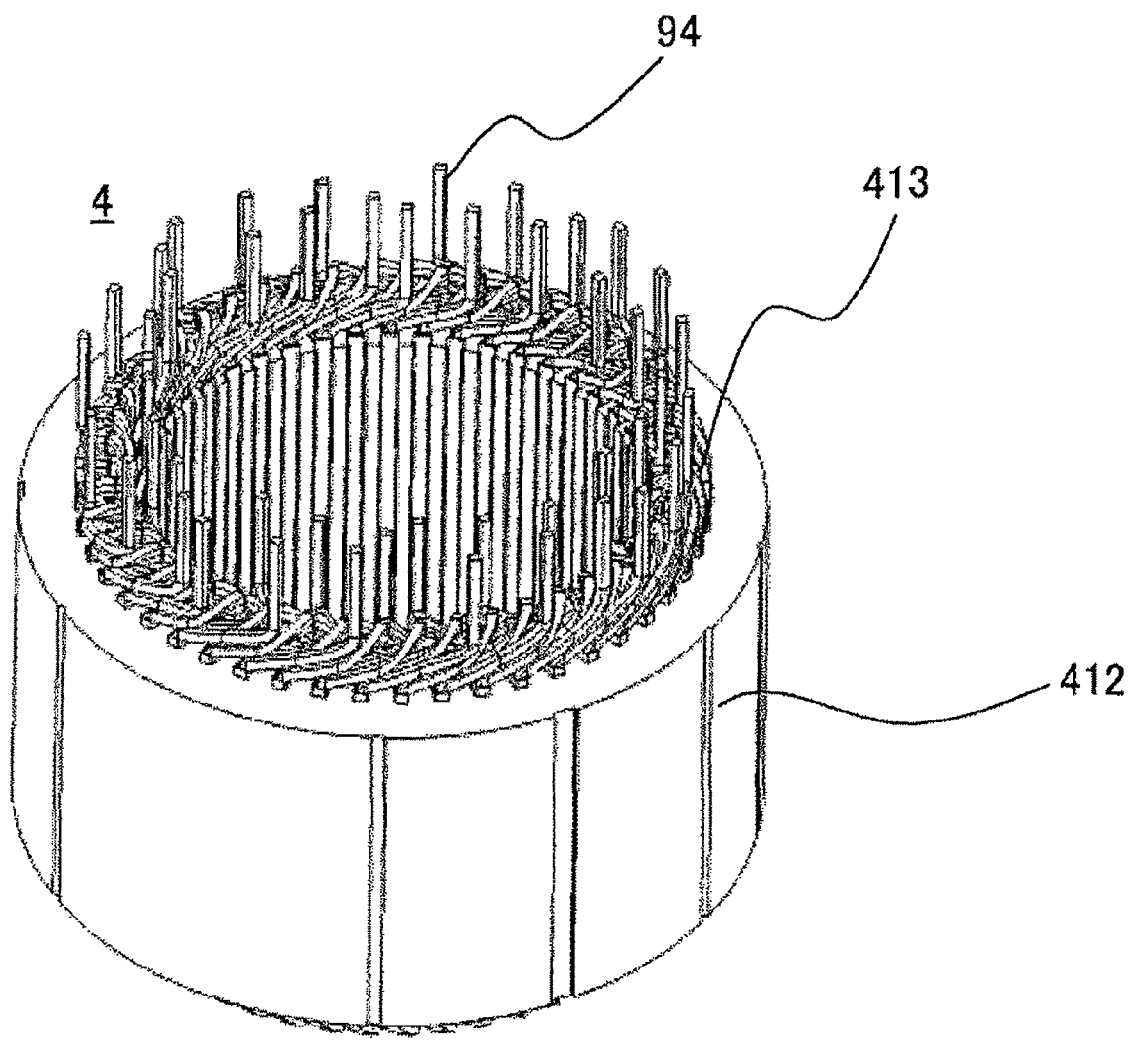
FIG. 47 is a diagram showing the stator in the first embodiment.

FIG. 47 illustrates a lap winding stator 4 comprised of a rectangular wire with NSPP (number of slots per pole and per phase)=2. A stator iron core 412 is constituted by laminating punched silicon steel sheets. On an inner circumference of the cylinder of the stator iron core 412 are radially provided a plurality of slots at equal intervals. In the slots are incorporated lap winding coils 413 each of which is wrapped with an insulation paper therearound. In the figure, wire terminals of the coils are not connected. The wire terminals are connected to neutral points between the coils to constitute an electric circuit.

Inside the stator 4, there is coaxially incorporated a magnet rotor (not shown) or a squirrel-cage copper rotor (not shown) and both the ends of the rotor are rotatably supported by a shaft bearing. Thus, an electric motor or a generator is constituted.

In the present embodiment, there is provided a three-phase induction motor with the number of slots of the stator being 48 and the number of slots per phase and per pole, NSPP, being 48÷8÷3=2; a coil of the same phase is incorporated in every two slots.

Figure 48:
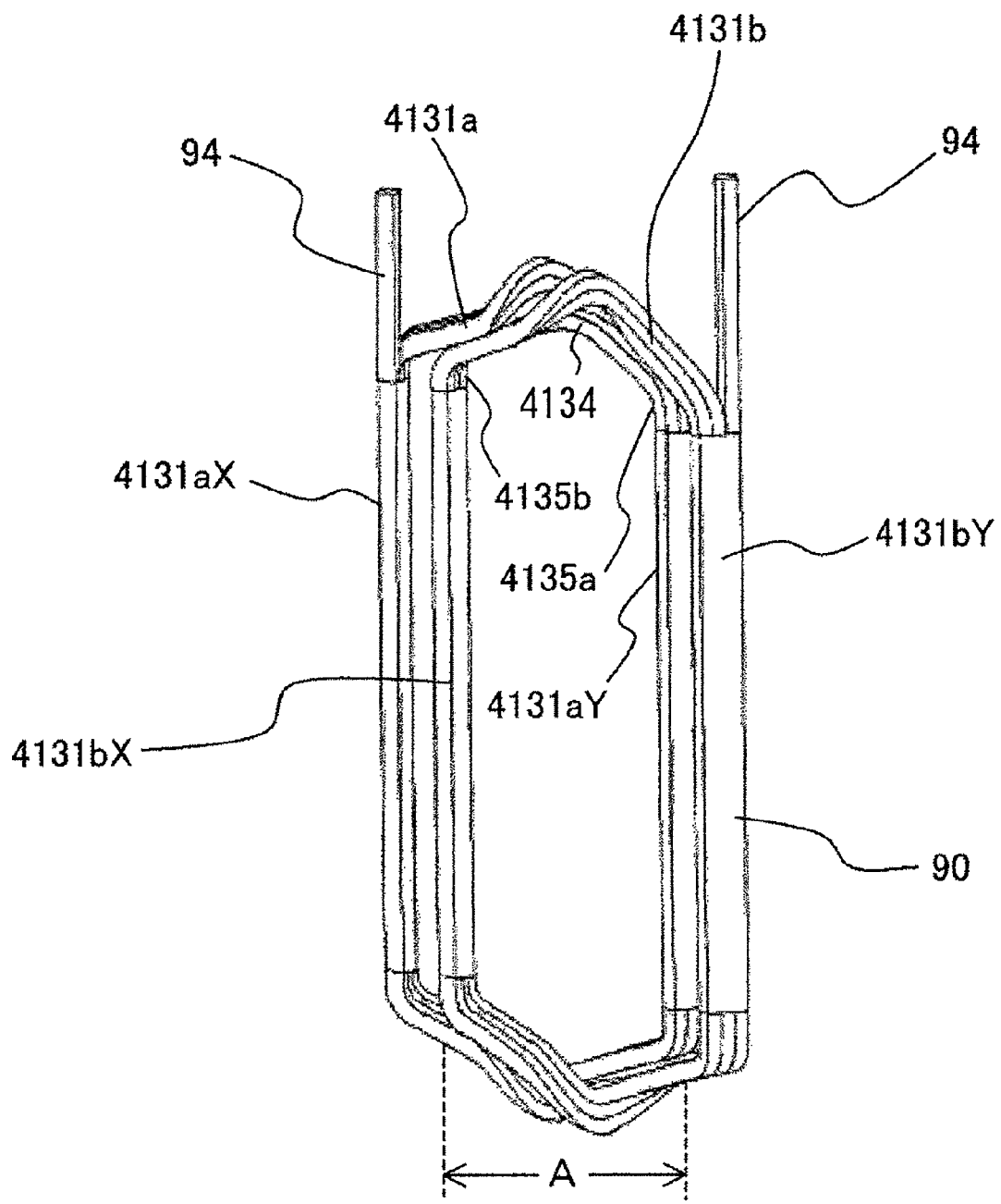
FIG. 48 is a diagram showing two connected lap winding coils in a row.

FIG. 48 shows lap winding coils 413 of the same phase that are incorporated in slots adjacent to each other. Two coils 4131a and 4131b have each a plurality of turns and wound continuously. The first element coil 4131a includes two linear conductor regions 4131aX and 4131aY. Similarly, the second element coil 4131b includes two linear conductor regions 4131bX and 4131bY. Among the four linear conductor regions, conductors extending from innermost coils (conductors 4135a and 4135b) positioned at an overlapped portion A between the first element coil 4131a and the second element coil 4131b are connected to each other through an coil-to-coil connector wire 4134. An insulation paper 90 is attached to the linear conductor regions and the resultant insulated linear conductor regions are incorporated into the slot. In this case, the linear conductor regions 4131aX and 4131bX are each arranged on the rotor side (topside) in the slot. On the other hand, the linear conductor regions 4131aY and 4131bY are each arranged on the side opposite to the rotor (on the back core side, on the bottom side).

Figure 49:
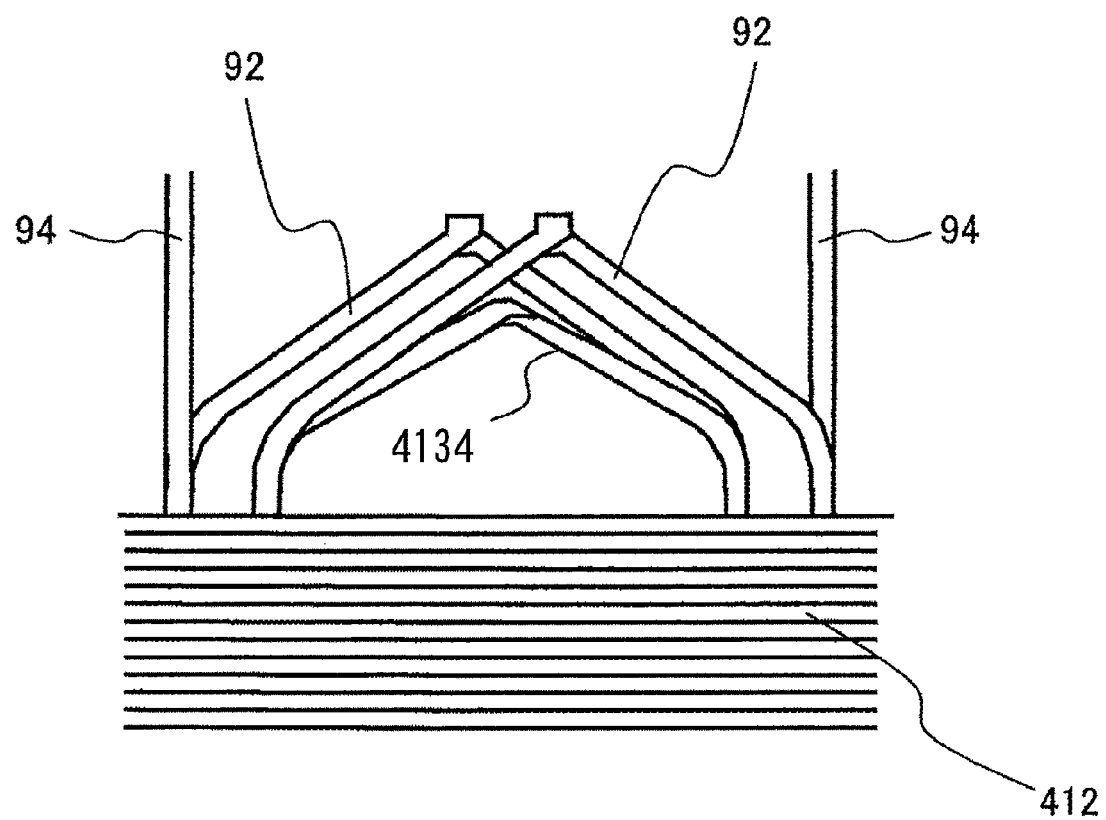
FIG. 49 is a diagram show in the coil end in a state in which the two connected lap winding coils have been incorporated in the stator.

FIG. 49 shows the shape of a coil end of the coil when it is incorporated into the stator iron core 412. The coil-to-coil connector wire 4134 has a shape of being bent back into an angle structure and is held in a space between the inner side of an angle structure of another coil different from the coil-to-coil connector wire 4134 and the end face of the stator iron core 412 in the axial direction. As shown in FIG. 48, adjacent coils of the same phase are continuously wound, so that the number of the coil terminals 94 is identical with the number of coils, i.e., 48. In the case of single winding coils, the number of coil terminals 94 is "number of coils"×2=98.

According to the present embodiment, the coil-to-coil connector wire 4134 is held between the coil end 92 and the end face of the stator iron core 412 in the axial direction and hence space in the axial direction for connecting terminals is unnecessary. This can reduce the size of the stator in the axial direction. The wire terminals 94 of the continuous coils are raised from the outer circumference side, so that the wire terminals do not have to be drawn out between the coils ends unlike the conventional technology. As a result, the inclination of the conductors at the coil ends can be reduced to achieve a close contact therebetween and in addition, the size of the coil end itself in the axial direction can be reduced.

Figure 50:
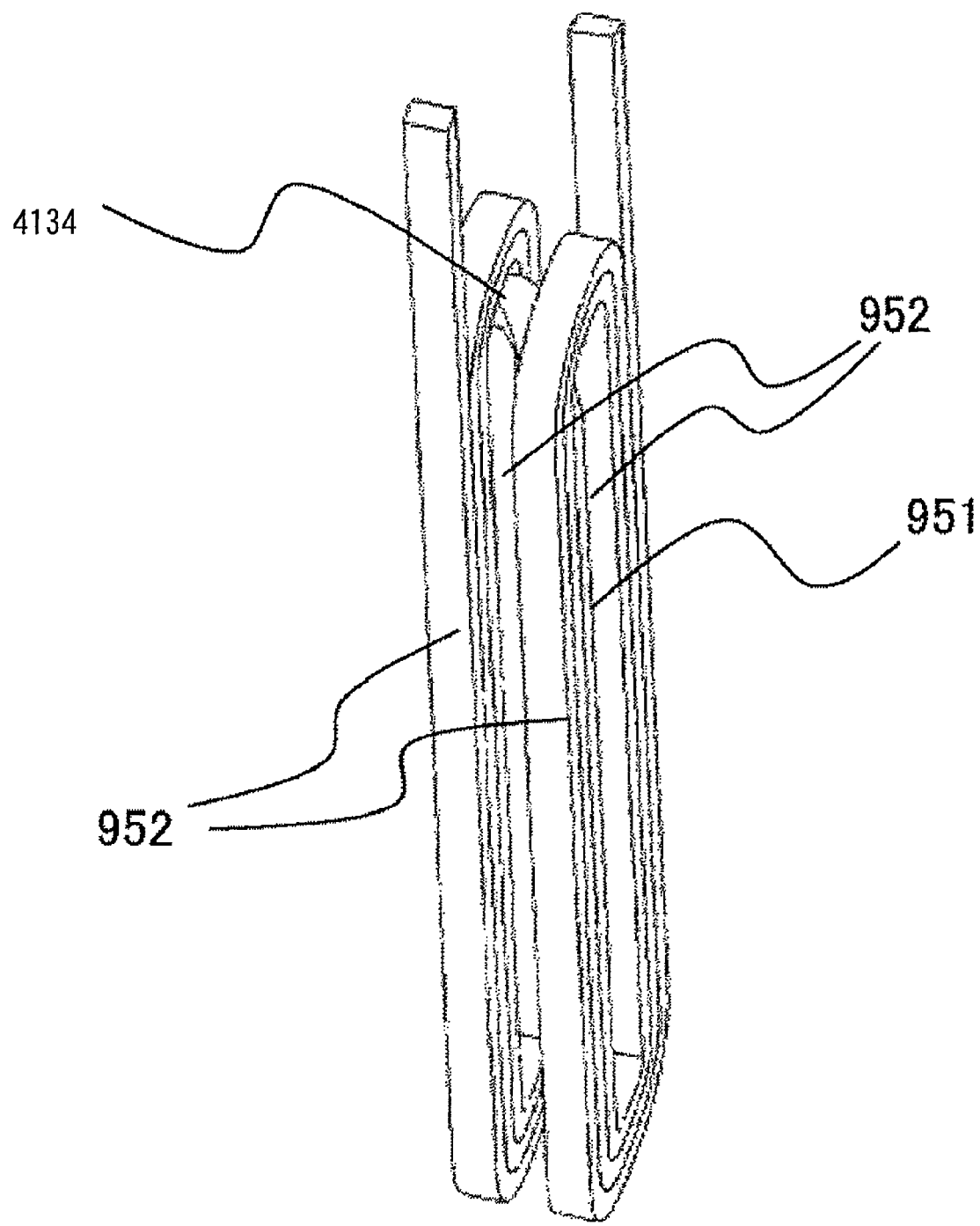
FIG. 50 is a perspective view showing a continuously wound original form coil.
Figure 51:
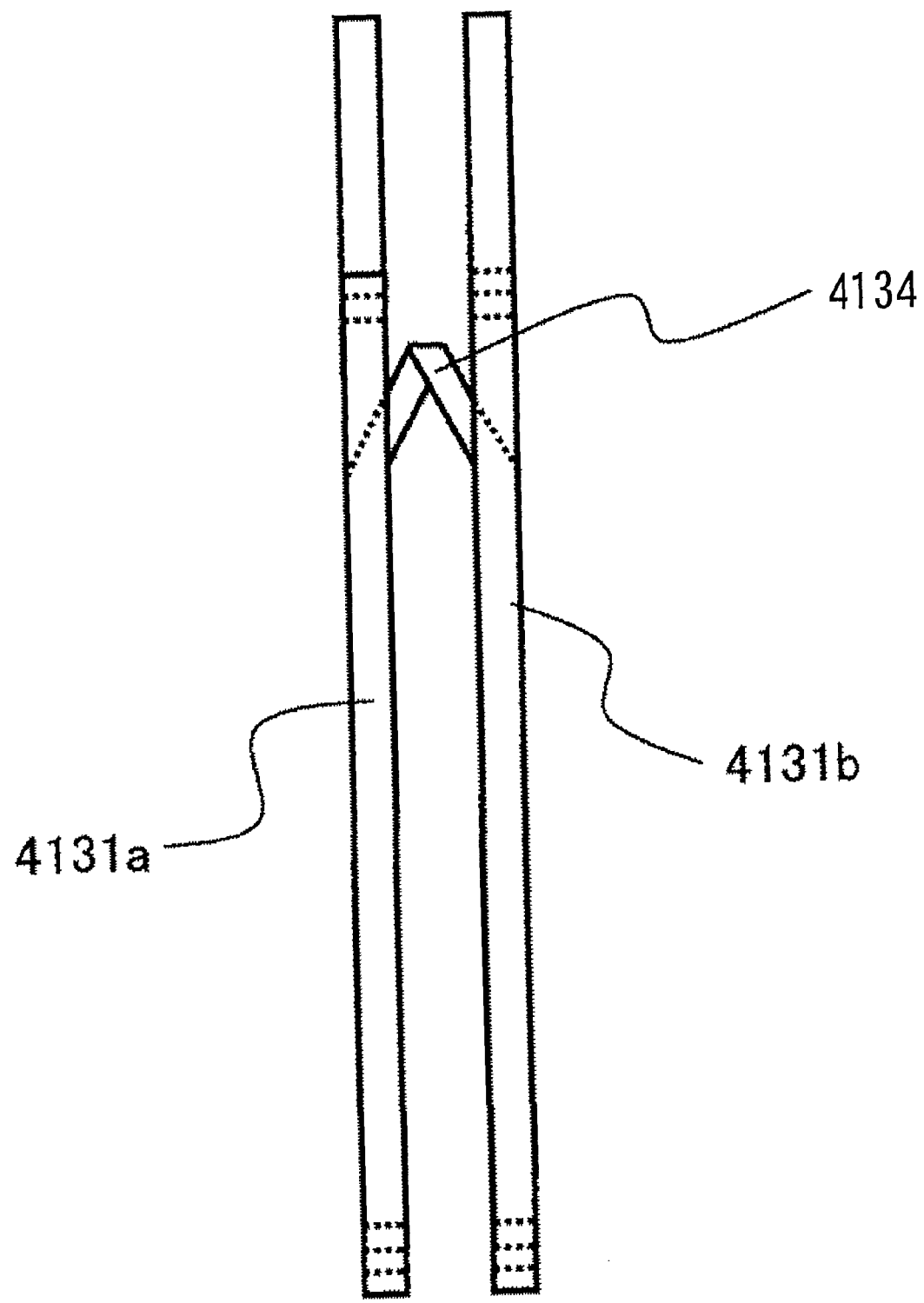
FIG. 51 is a side view of a two continuous winding original form coil.

The production method for the two continuous lap winding stator of the above-mentioned structure is explained below. First, a wire is folded back with the coil-to-coil connector wire 4134 as center and portions of wires on the respective sides are wound in orientations opposite to each other to obtain two continuous ellipse-like original form coils 951 as shown in FIG. 50. Two element coils 4131a and 4131b are spaced apart from each other by a slot pitch of the stator iron core 412 and as shown in FIG. 51, the coil-to-coil connector wire 4134 connects the inner sides of the both the element coils 4131a and 4131b and assumes a shape of an angle structure.

Figure 52:
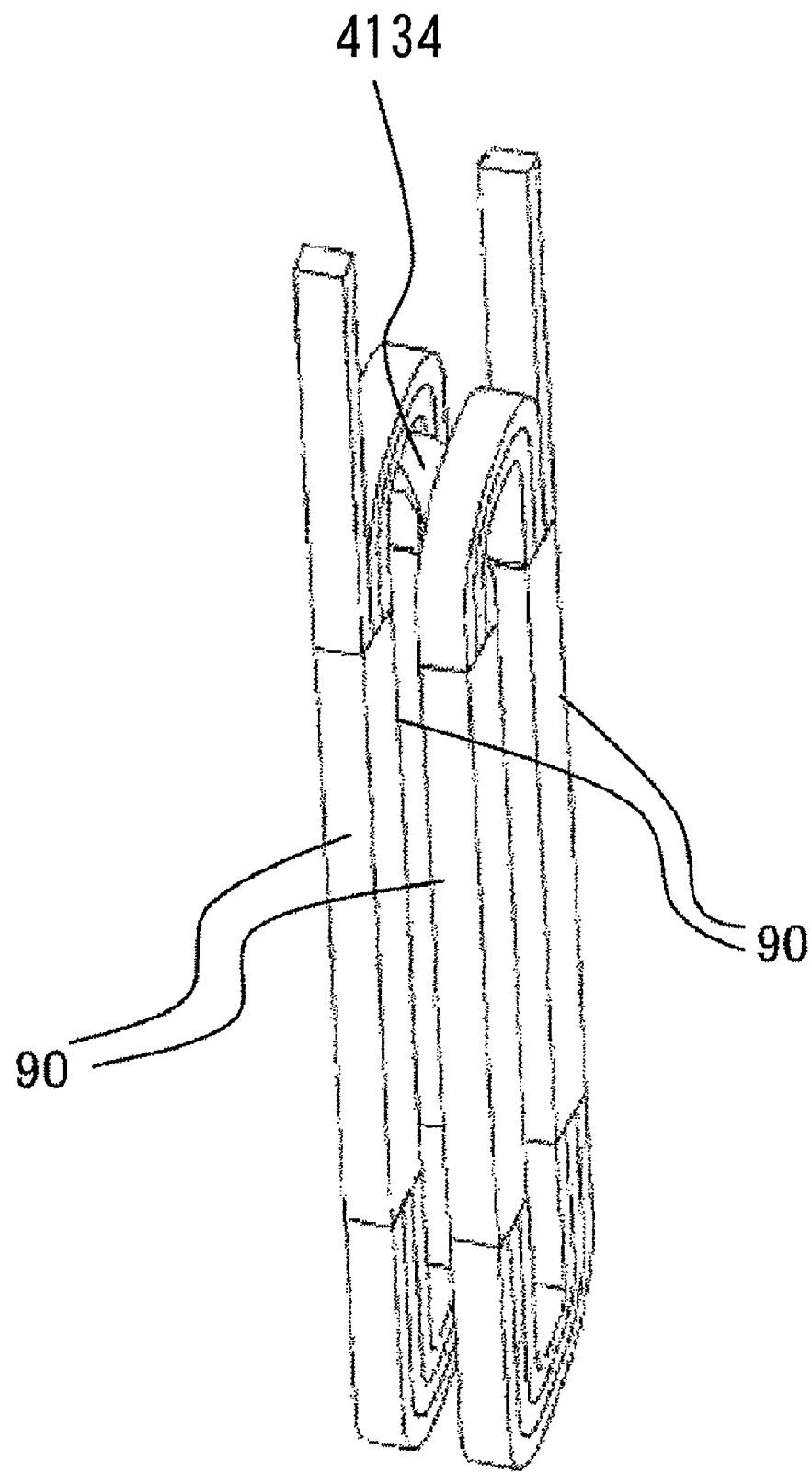
FIG. 52 is a diagram showing the two continuous winding original form coils with insulating paper.

Self-fusing wires are used for these coils and slot insertion regions 952 in the coil are fixed by a heating process by electric current application. Further, as shown in FIG. 52, insulation papers 90 are attached to outer circumferences of the slot insertion regions 952 (the fixation and insulation of the regions to be inserted in the slots may be performed by an alternative means such as winding a tape). Two bottom side coils (regions of the coils to be inserted at the bottom side) and two top side coils (regions of the coils to be inserted at the top side) are held and the coils were expanded in a direction such that they are withdrawn from each other to perform plastic deformation (drawing and bending) As a result, two continuous coils of hexagonal shapes as shown in FIG. 48 are formed. The height of the top of coil-to-coil connector wire 4134 is adjusted in advance such that the coil-to-coil connector wire 4134 is arranged in a space between the inner side of the actual coil end, and the end face in the axial direction of the stator iron core 412. This height depends on the size of the cross-section of the wire and slot pitch. For example, when a flat wire having a conductor cross-section of 2.0 mm×1.6 m is used and the slot pitch is 7 mm, the top of the bridge wire is set lower than the innermost circumference of each original form coil 951 by about 5 mm. The two continuous coils deformed into hexagonal shapes are incorporated into a slot through a slot opening inside the stator iron core 412. The steps of deformation and insertion may be performed manually or automatically by the manufacturing method to be detailed later.

In the above-mentioned embodiment, the structure of the stator has been explained referring to coils made of a rectangular wire. However, wires having a circular cross-section may be used for the coils. Although explanation has been made on rotating electrical machines, the present invention is also applicable to direct acting type electrical motors in which the stator iron core is linearly developed.

Figure 53:
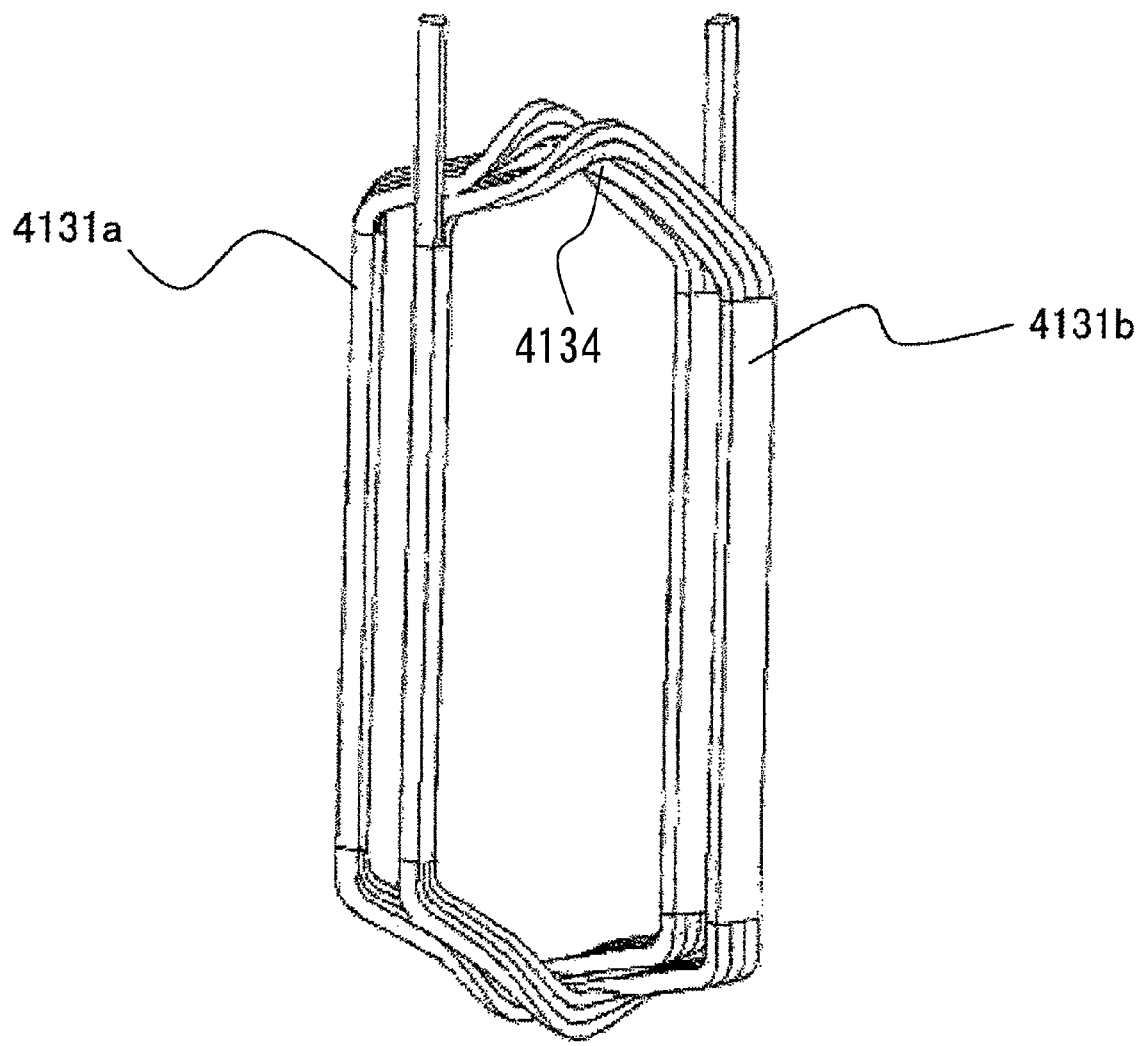
FIG. 53 is a diagram showing an alternative embodiment of the lap winding two continuous coils.

Further, as shown in FIG. 53, the coupling of the first and the second element coils 4131*a* and 4131*b* may be achieved by connection of the top coil of the element coil 4131*a* and the bottom coil of the element coil 4131*b* may be made continuous with each other in the inside of the coil. When the coils shown in FIG. 48 and FIG. 53 are alternately arranged in combination, electric circuits can be constituted by connecting the wire terminals from the top coils to each other and the wire terminals from the bottom coils to each other. That is, the wire terminals can be connected to each other without passing over the coil ends, so that the size in the axial direction of the stator can be reduced.

Rotating electrical machines for use in automobiles are under a strong pressure for downsizing so as to be mountable on moving vehicles. In addition, to make best use of a limited amount of power supplied from the battery to output a high torque, there is required an power density much higher than that of rotating electrical machines for general industries or home electric appliances. There is a trend that for this purpose, a rectangular wire is used for stator coils to increase current density and heat dissipation performance in order to promote downsizing of rotating electrical machines to a greater extent and manufacture of higher power rotating electrical machines.

On the other hand, there are two methods of winding wires for stators of rotating electrical machines, i.e., concentrated winding and distributed winding. The concentrated winding provides a non sinusoidal waveform as an magneto motive force wave form and is inferior to the distributed winding in rotation performance such as noise and torque pulsation. Heretofore, it has been compelled to use concentrated winding stators in many cases because of the limitation on the space available for mounting the rotating electrical machine in the vehicle system. A future trend will be that the distributed winding stators are modified to have shorter coil ends in order to be adapted to rotating electrical machines for vehicle installation.

From the above-mentioned two trends in development of rotating electrical machines, it will be easy to foresee that there is promoted development of a distributed winding stator made of a rectangular wire with a short coil end for use in rotating electrical machines for electric cars and hybrid automobiles.

However, the distributed winding stator is wound and deformed one by one and hence includes wire terminals in a number twice the number of the coils. The wire terminals must be arranged along or above the sides or the top part of the coil ends and welded thereto. Therefore, in order to further reduce the size of terminal connection of a lap winding stator made of a rectangular wire, it is necessary to cope with two tasks, i.e., to reduce the number of terminal connections by continuously winding coils of the same phase and not to arrange the wire bridge of the continuously wound coils over the actual coil end.

As mentioned above, in the present embodiment, first, the first coil and the second coil are wound in opposite orientations with the coil-to-coil connector wire 4134 being a center thereof, and inside both the coils two continuous original form coils including the top side (rotor side) coil and the bottom side (opposite-rotor side) coil are wound. The ellipse-like original form coils are spaced apart from each other by a slot pitch and the wire bridge that connects both the coils to each other is shaped into an angle structure. After the slot insertion regions are fixed by heating of the self-fusing wire or taping of the wire, the top side coil and the bottom side coil of each coil are simultaneously twisted to form two continuous hexagonal coils. By adjusting the height of the coil-to-coil connector wire 4134 of the original form coil in advance, the coil-to-coil connector wire 4134 bridging adjacent coils can be arranged between the coil end in the form of an angled structure and the end face in the axial direction of the stator iron core.

As a result, in the lap winding stator with NSPP (slot number per phase and per pole)=2 using a rectangular wire (also round wire being usable), it is possible to reduce the number of connections of coil terminals and arrange the coil-to-coil connector wire 4134 that connects the continuous coils between the actual coil end and the end face in the axial direction of the stator iron core. This makes it unnecessary to secure the size in the axial direction that is required for connection. That is, it is unnecessary to extend the position of the connection in the axial direction of the coil end in consideration of attachment of the terminals for connection and of damages to the coating of the wire. The coil-to-coil connector wire 4134 that connects the continuous coils can be held between the actual coil end, and the end face in the axial direction of the stator iron core. Further, since the wire terminals of the continuous coils are positioned on the outer circumference side of the coils, the distance between the coils at the coil end can be reduced until they contact to reduce the height of the actual coil end.

Second Embodiment

Next, details of the second embodiment will be described with reference to the attached drawings.

Figure 7:
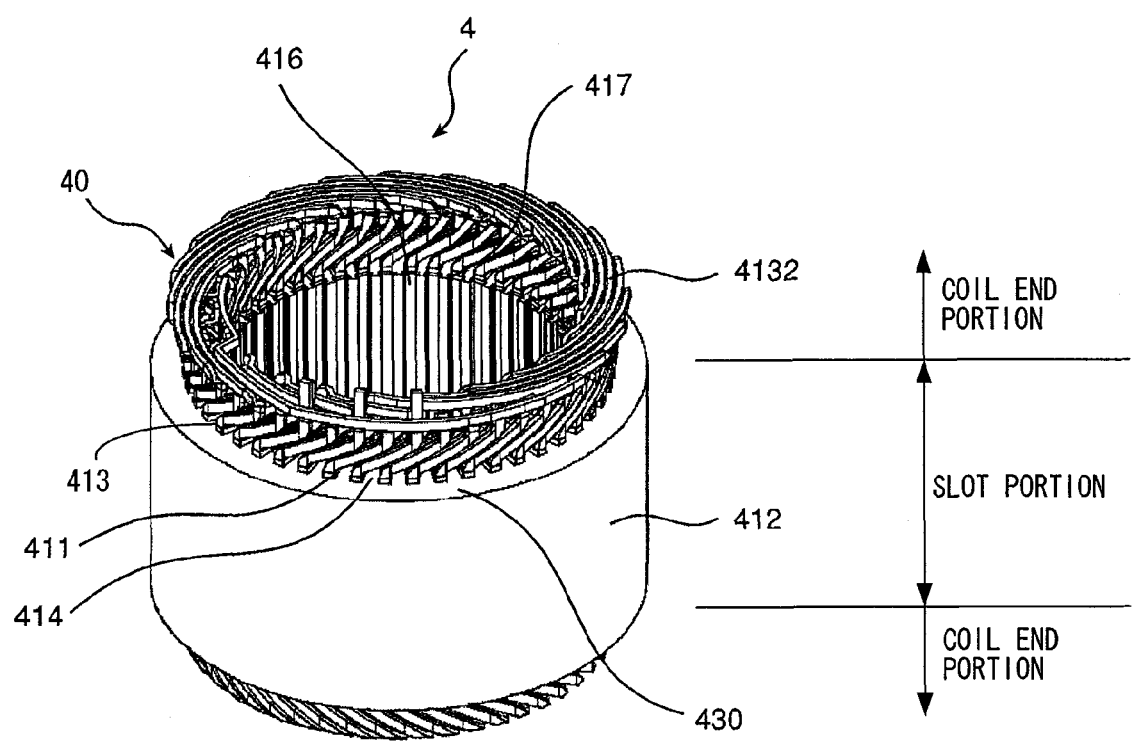
FIG. 7 is a perspective view of a stator.

FIG. 7 is a perspective view of a continuous lap winding stator 4 made of a rectangular wire. The stator iron core 412 is fabricated by laminating punched silicon steel sheets or the like. In the slots (grooves) provided radially on the inner circumference of the cylinder of the iron core, there are incorporated respective stator coils 413, which are lap winding coils made of a rectangular wire and protected as wrapped by insulation paper. The stator coils 413 are fabricated by a plurality of sets of two or more coils that are made continuous through bridge wires 4132.

The stator shown in FIG. 7 is of 3-phase, 48-slot, NSPP (number of slots per phase and per pole)=2, and 2Y-connection and includes 8 coils of the same phase that are continuous in series. In this case, the number of wire terminals before connection is 12.

The number of continuously wound coils is not limited to 8. For example, in a stator of 3-phase, 48-slot, NSPP (number of slots per phase and per pole)=2, and 2Y-connection like the stator shown in FIG. 7, two lap winding coils made of a rectangular wire to be inserted into adjacent slots may be made by winding two coils continuously as shown in FIG. 48 above. In this case, two element coils 4131a and 4131b are wound in mutually opposite orientations with the coil-to-coil connector wire 4134 being center therebetween. The wire terminals 94 are arranged on the outer circumference sides. When twenty four sets of the two continuous coils are incorporated in the stator iron core 412, the structure as shown in FIG. 47 is obtained and the number of wire terminals before connection is 48.

In the inside of the continuous lap winding stator 4 made of a rectangular wire, there is incorporated a permanent magnet rotor or a squirrel-cage type copper rotor, which will be explained in detail, coaxially and both the ends of the rotor are rotatably supported by bearings to construct an electric motor or a generator.

Figure 8:
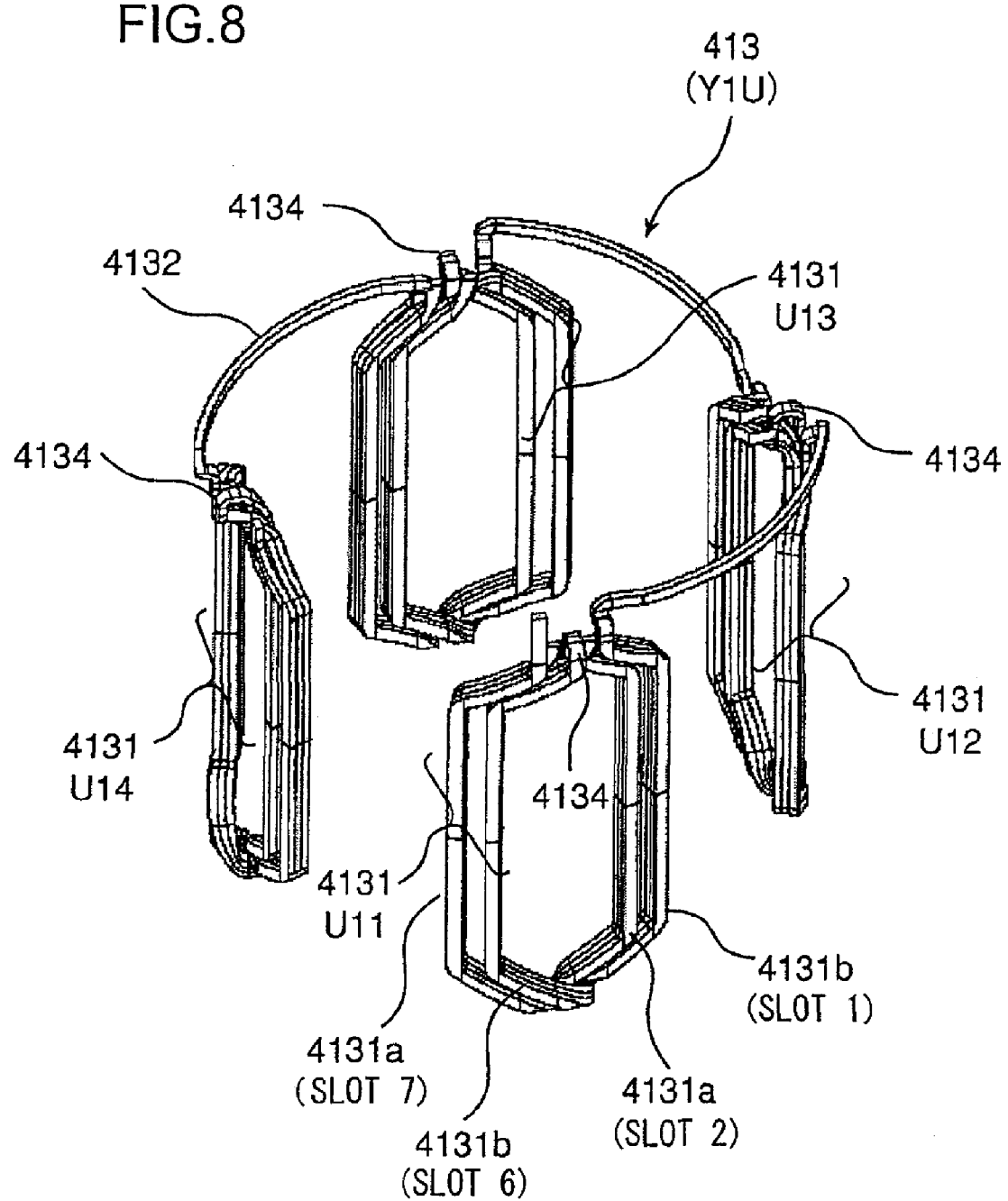
FIG. 8 is perspective view of a single continuous coil for constituting a stator winding.
Figure 55:
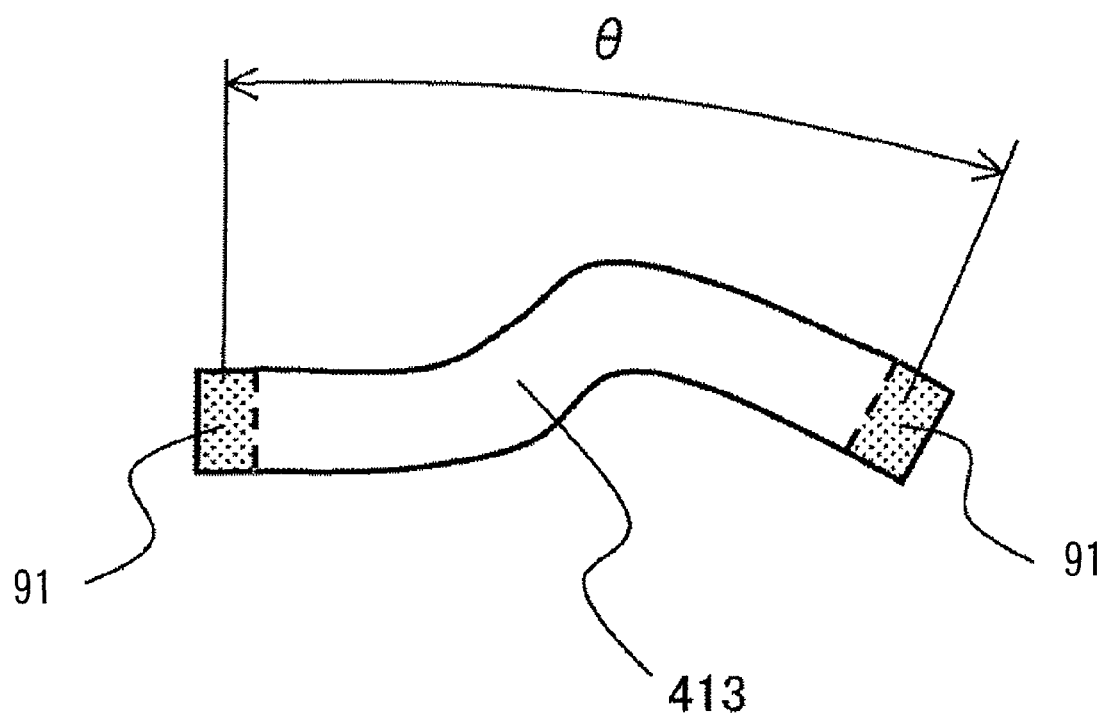
FIG. 55 is a diagram showing positional relationship of the slot inserting parts of lap winding coils of a flat wire.

The coil of the present invention, which is manufactured by a manufacturing method to be detailed later, has a final shape as shown in FIG. 8. When two slot insertion regions of original form coils with insulation papers 90 are held and subjected to plastic deformation by moving them such that they are separated from each other, an angle θ between the two slot insertion regions 91 of the same coil as shown in FIG. 55 is preferably equal to an angle between two slots into which the two slot insertion regions 91, respectively, are inserted.

Figure 56:
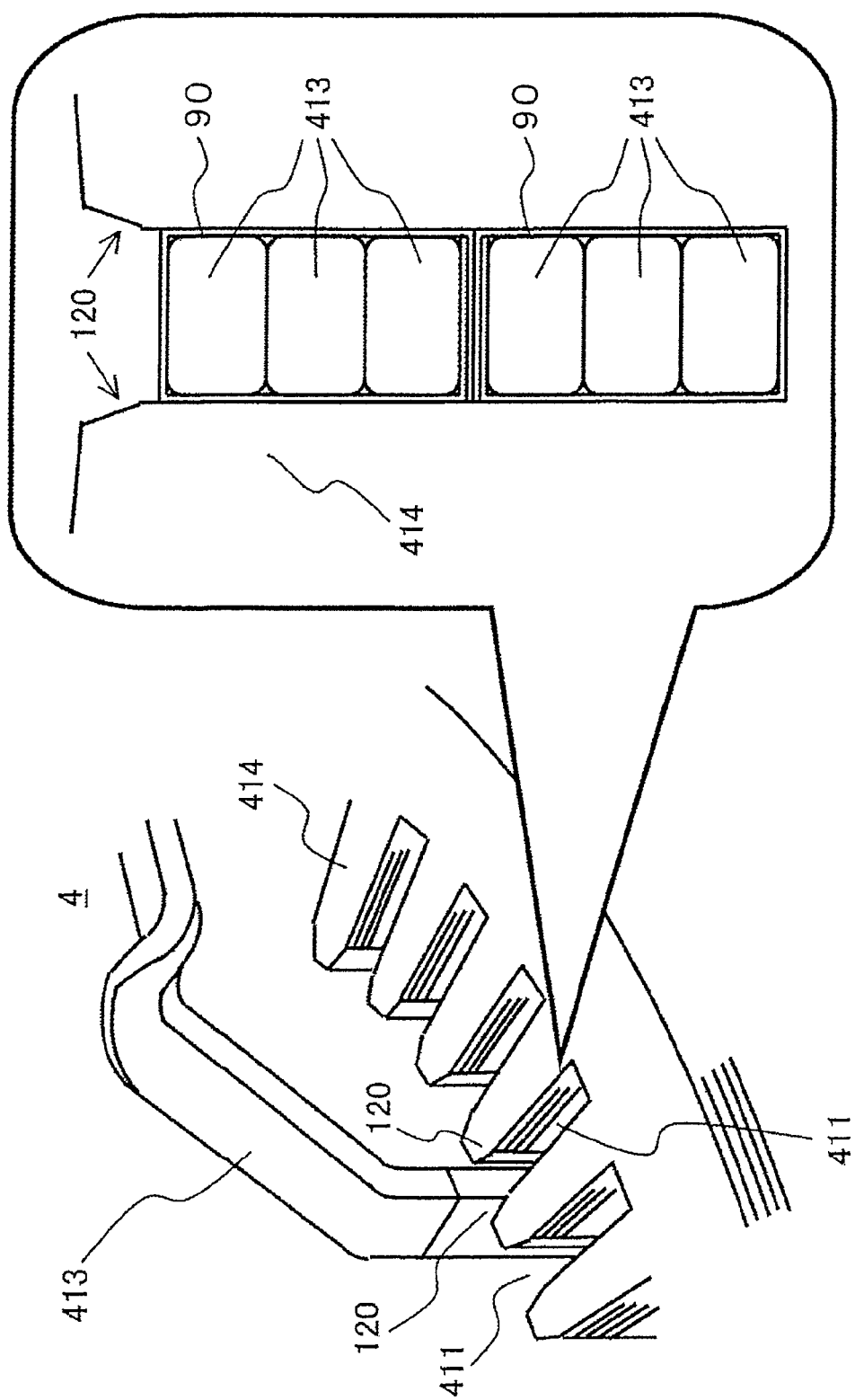
FIG. 56 is a diagram showing a shape of the slot when no slot wedge groove is provided.
Figure 57:
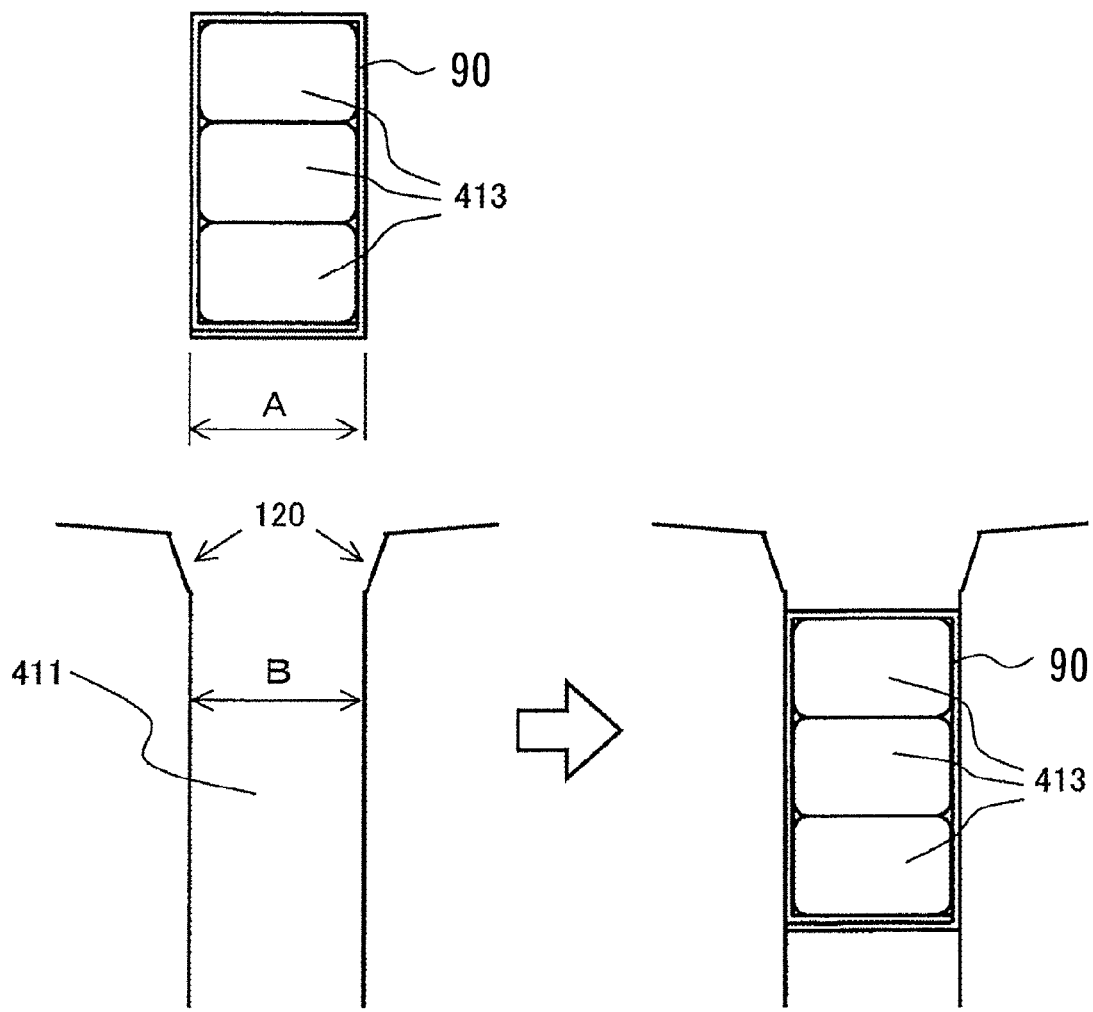
FIG. 57 is a diagram showing the relationship between the widths of the coil and the insulation paper and the width of the slot.

The obtained continuous lap winding coil of a rectangular wire is inserted into a slot 411 from the inside of the stator 4. As shown in FIG. 56, the slot 411 is provided with a slant 120, which broadens toward outside, in an area closer to the inner circumference than the area in which the coil 413 with the insulation paper 90 is inserted. As a result, fluctuation in open space of which both the slot insertion regions of the coils and misalignment of positions due to mutual pulling by the coils upon continuous winding are absorbed. Thus, even if the space between the coil 413 with the insulation paper 90 and the slot 411 is small, the stator can be assembled without difficulty. In addition, as shown in FIG. 57, a total width A of the coil 413 with the insulation paper 90 before the incorporation is made larger than the width B of the slot 411 of the coil insertion part and the coils are assembled by pressing them into the slots. Therefore, the space factor of the lap winding coils of a rectangular wire in the slot can be significantly increased as compared with the conventional technology. An increased degree of contact between the coil and the insulation paper gives an increased heat dissipation performance. Further, since the coils are not deformed more than necessary when they are incorporated into the core, high insulation reliability can be obtained.

Figure 58:
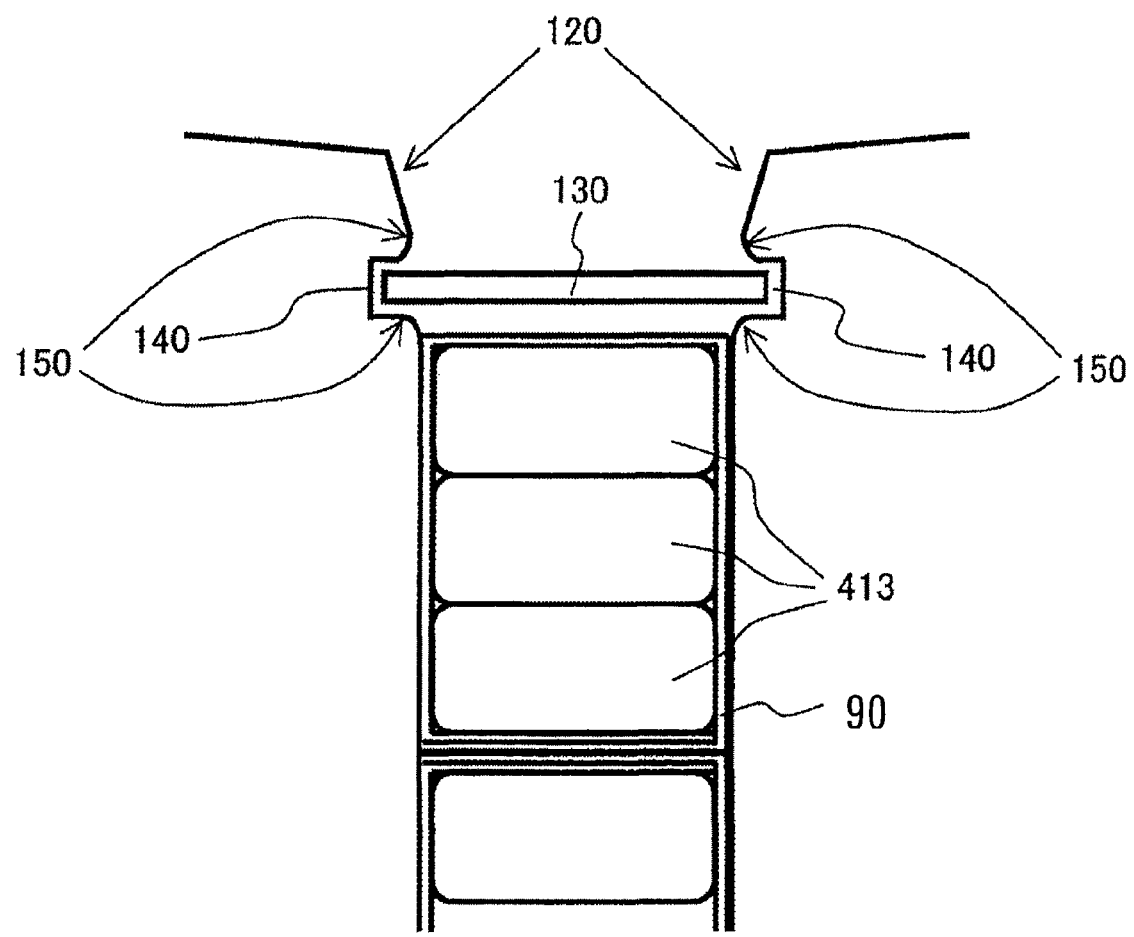
FIG. 58 is a diagram showing a shape of the slot when a slot wedge groove is provided.
Figure 59:
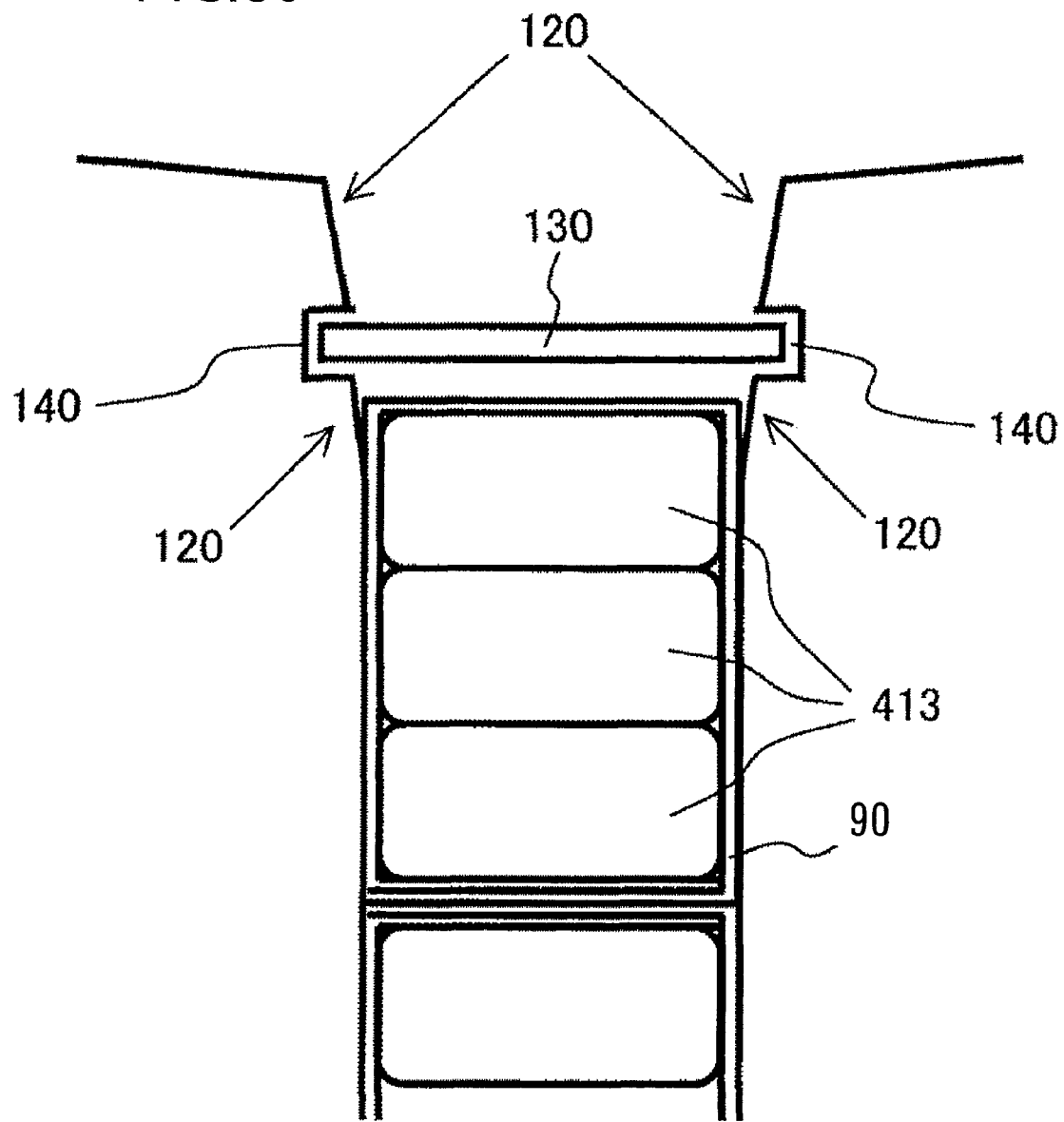
FIG. 59 is a diagram showing an alternative shape of the slot when a slot wedge groove is provided.

When an insertion groove 140 for a slot wedge 130 is provided as shown in FIG. 58 in order to prevent coming out of the coil from the slot, the outward broadening slant 120 is provided in an area closer to the inner circumference than the insertion groove 140. Corners 150 at which the insertion slot 140 and the slot 411 meet are formed into an R shape or the outwardly broadening slant 120 is provided on each of the inner circumference side and the outer circumference side. This facilitates coil assembly, and improves slot space factor, and heat dissipation performance in the case where the insertion groove 140 for the slot wedge 130 is provided in the same manner as in the case where it is not provided.

Figure 60:
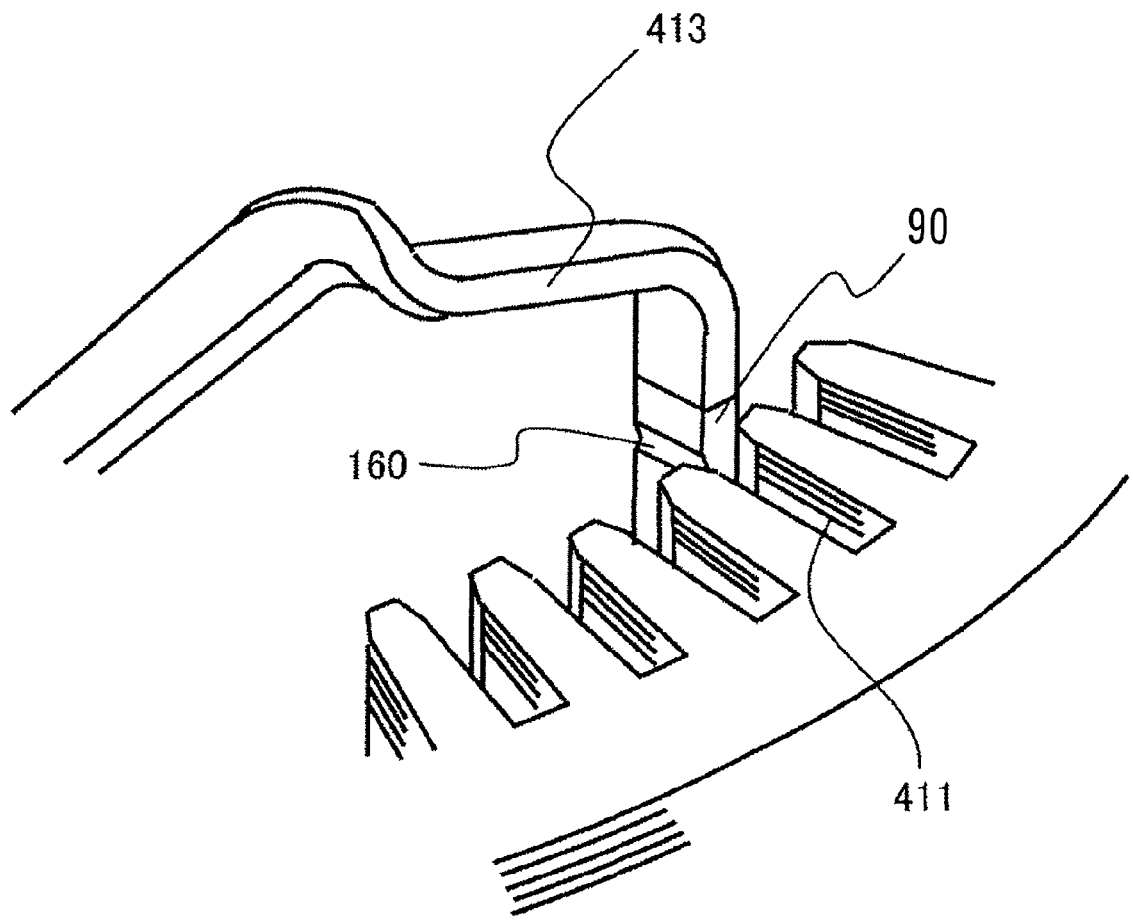
FIG. 60 is a diagram showing a state in which the coil and the insulating paper are provided with recesses, respectively.

By the above-mentioned method, the gap between the coil 413 with the insulation paper 90 and the slot 411 can be made smaller or even to a negative value. However, there will be a high possibility that upon the operation of inserting coils, the coils and/or the insulation material is damaged at the corners of the slot on an end face of the stator iron core in the radial direction. Accordingly, as shown in FIG. 60, the coil (coil conductor) and the insulation paper at the position at which they are in contact with the corners in the radial direction of the slot may be advantageously subjected to plastic deformation to form a depression 160 before the operation of inserting the coils. As a result, damages of the coil and the insulation paper at the corners of slots on the end face of the core can be avoided.

As explained above, according to the present embodiment, a continuous lap winding stator with a rectangular wire that has a high slot space factor and excellent insulation performance can be obtained. A small-size high power rotating electrical machine can be realized by the reduction in size of the coil ends and improvement of motor characteristics and radiation performance due to slot space factor superior to the conventional technology.

As mentioned above, the two slot insertion regions of the lap winding coils cannot be incorporated into the slots unless they are subjected to plastic deformation when they are inserted in the slots. When lap winding coils are continuously wound, it becomes more difficult to insert coils into slots because a plurality of coils is pulled by each other. For these reasons, a certain space (0.1 mm to 0.2 mm or more) is necessary between the continuous lap winding coils with insulated rectangular wire and the slots of the stator iron core in order to incorporate the coils into the slots.

In the present embodiment, a plurality of lap winding coils is continuously wound and deformed into hexagonal shapes in order to decrease the number of connections of wire terminals of the lap winding stator made of rectangular wires, reduce the space in which wire terminals are arranged, and reduces the length in the axial direction of the wire required for connecting the wire terminals. For example, if terminals for connection are used, the length in the axial direction of the stator that corresponds to the length of the terminals for connection is required. On the other hand, when the connection of wires is achieved by melting the electric wire itself by, for example, TIG welding, the position of connection must be set remote from the coil end in order to fix the wire terminals and prevent the burnout of insulation film of other coils.

Further, the slot space factor and heat dissipation performance are improved as compared with the conventional stators by providing an outwardly broadening slant at a position on the inward side than the position of the slot at which the coil and the insulation are inserted to enable incorporation of the coils and the insulation material into the slots by pressing or in a manner similar thereto relative to the dimensional relationship.

The continuous lap winding stators made of the rectangular wire allow for a decrease in the number of connections of terminals as compared with the conventional single Lap winding stator made of the rectangular wire, so that the space for arranging wire terminals can be made smaller to decrease the length in the axial direction required for the connection of wire terminals. That is, the size in the axial direction of the motor can be decreased.

Also, the distance between the coil with the insulation and the slot can be decreased or eliminated to drastically increase the space factor of the continuous lap winding stator made of the rectangular wire by providing an outwardly broadening slant with the slot. As a result, there can be achieved a rotating electrical machine with a motor having a smaller size and achieving a higher power than the conventional motor.

While in the continuous lap winding stator made of the rectangular wire, according to the present invention, the coils are installed at higher density than conventionally both in the slots and at the coil ends, the number of connections is decreased and the possibility of occurrence of damages on the insulation coating upon assembling the coils is decreased. This results in an improvement in the reliability of the insulation.

Third Embodiment

Now, a third embodiment of the present invention is explained with reference to the attached drawings.

Figure 61A:
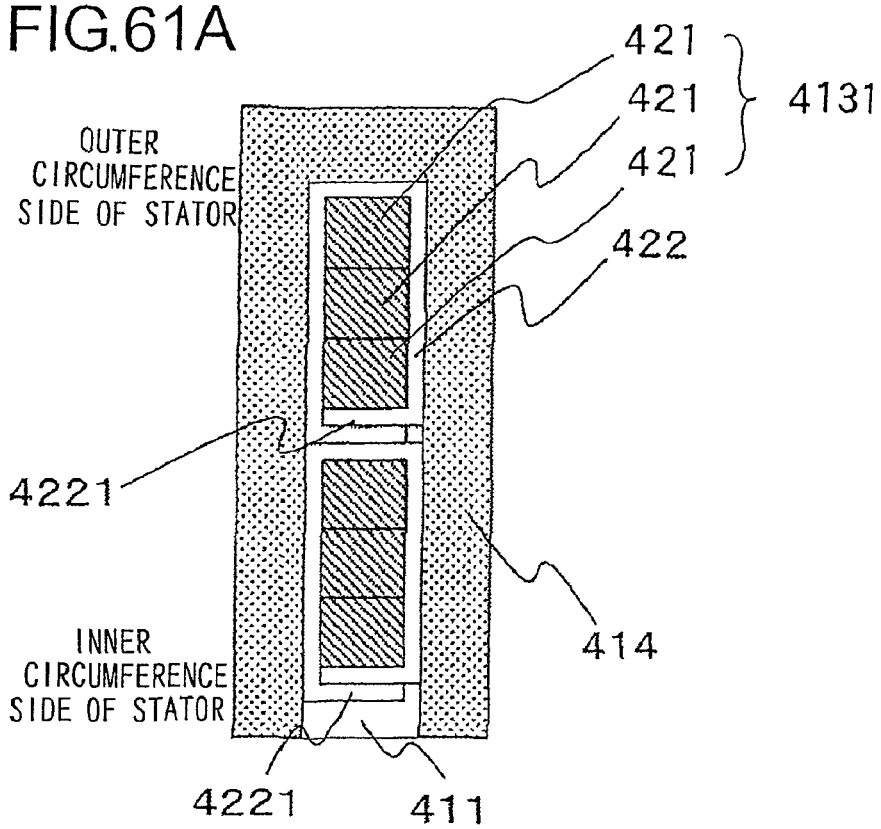
FIG. 61A is a diagram showing a portion where the insulating material is overlapped.
Figure 61B:
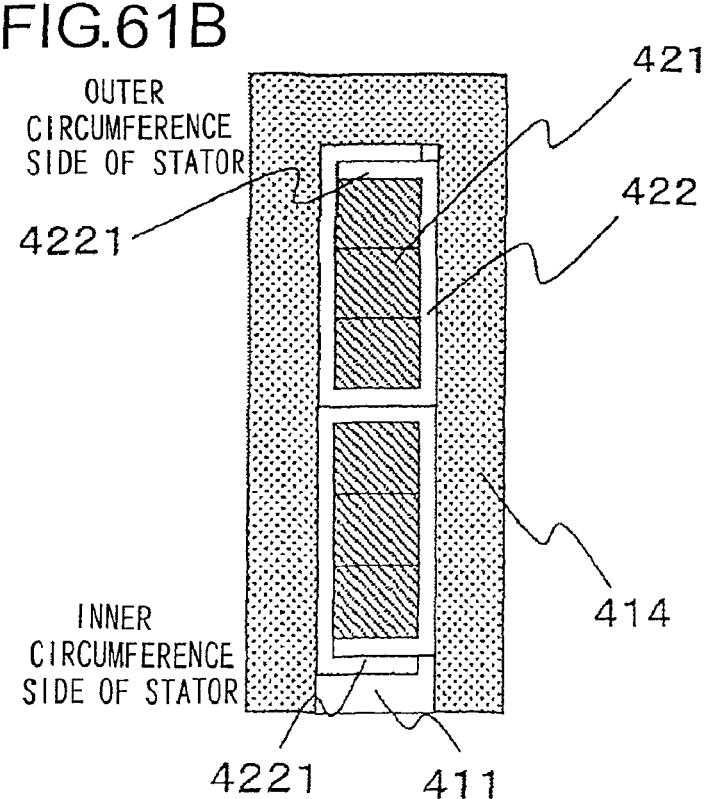
FIG. 61B is a diagram showing an alternative example of the layout of the overlapped portion.

FIGS. 61A and 61B are cross-sectional views of coils 4131 (4131a, 4131b) with an insulation material 422 on the outer circumference thereof being inserted in a slot 411 defined by the teeth 414. The coils 4131 are formed by winding around in a plurality times a wire 421 made of a rectangular wire having a substantially rectangular cross-section. On the inward side of the stator, there is provided an opening of the slot 411, through which the coils 4131 each having the insulation material 422 are inserted in the back thereof (i.e., in the outward side of the stator, in this case).

The coil 4131 used in the present embodiment includes hexagonal coils. The coil 4131 is fitted in slots such that one and the other of a pair of opposing linear regions of the hexagonal coils are respectively fitted in a pair of non-adjacent slots that are separated by two or more slots. In the slot 411, there are inserted two sets of the coils 4131 each with the insulation material 422. Hereafter, among the coils in the slots, the coil 4131 positioned on the outer circumference side is referred to as an "outer coil" and the coil 4131 positioned on the inner circumference side is referred to as an "inner coil".

The arrangement of an overlapped portion 4221 of the insulation material 422 is explained. There are two methods for applying the insulation material 422 to the coil 4131. One of the methods is to arrange the overlapped portions 4221 of the insulation material 422 on the same inner circumference side both in the outer coil and in the inner coil as shown in FIG. 61A. The other method is to arrange the overlapped portions 4221 on opposite sides of the stator, i.e., on the outer circumference side in the outer coil and on the inner circumference side in the inner coil as shown in FIG. 61B. Besides, a method may be conceived by which contrary to the arrangement shown in FIG. 61A, the overlapped portions 4221 are arranged on the same outer circumference side of the stator. Also, a method may be conceived by which the overlapped portions 4221 of the outer coil and the inner coil are arranged on opposite sides, i.e., on the outer circumference side in the inner coil and on the inner circumference side of the stator in the outer coil in contrast to the arrangement as shown in FIG. 61B. However, drawings for illustrating such modifications are omitted here.

Figure 62:
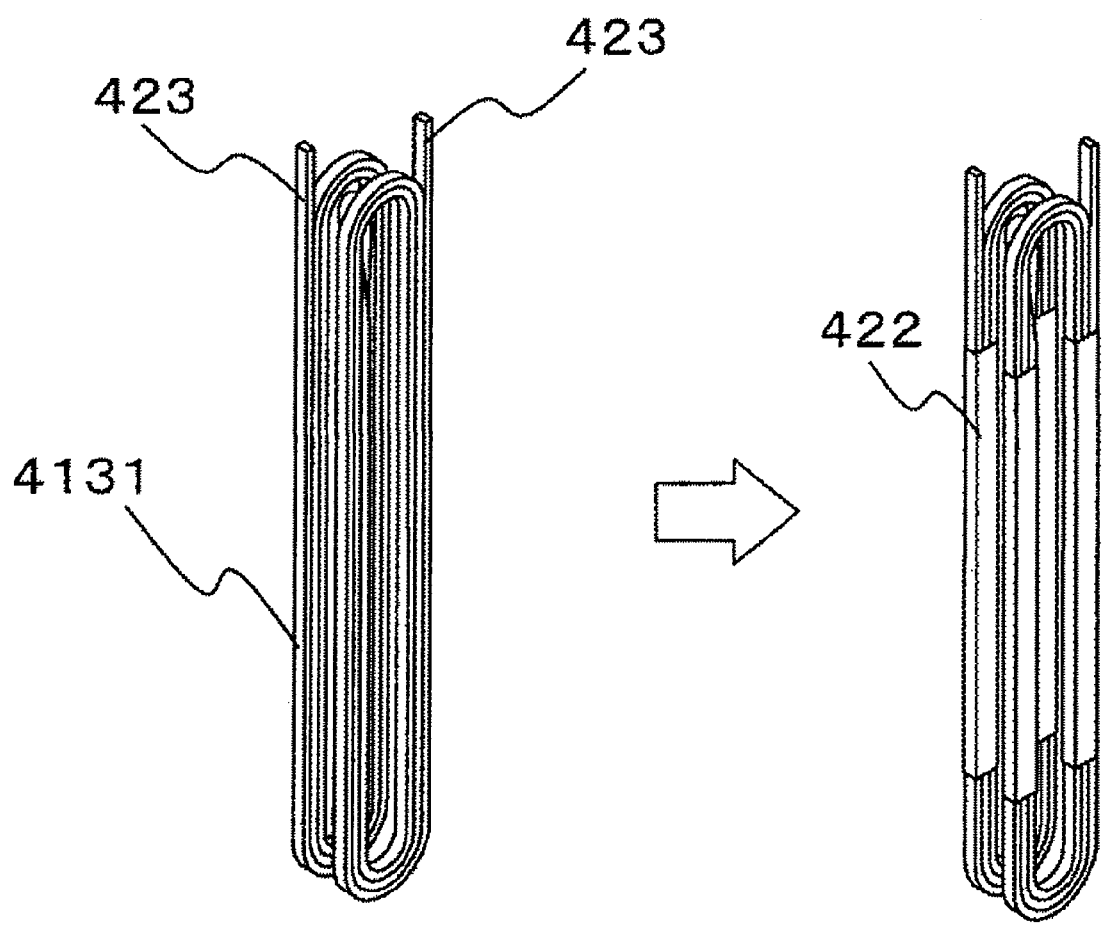
FIG. 62 is a diagram showing the step of applying an insulation material to the coil.

FIG. 62 is a schematic diagram illustrating the process of applying the insulation material 422 on the coil 4131. The coil 4131 includes two wire terminals 423 that protrude from the wound around portions of the coils for two sets of hexagonal coils. In the case of conventional coils, two wire terminals 423 one protruding from the inner coil and the other protruding from the outer coil are provided for a set of hexagonal coils. When there are two sets of hexagonal coils, four wire terminals 423 are provided. However, as a result of further improvement of the method of winding wires, the number of the wire terminals 423 that protrude from the wound around portions of the coils can be decreased to two for two sets of the hexagonal coils as shown in the figure by using a single wire terminal 423 on the inner circumference side in common. The winding method of this type is called "α-winding".

The insulation material 422 is wound around and fixed to the coil 4131 using an applicator (not shown). A plurality of sets of the coils 4131 to which the insulation material 422 has been applied is provided and incorporated into the stator iron core 412 by using a device for fitting the coils as detailed later to form the stator 4.

FIGS. 63A to 63F are diagrams illustrating the process of practicing the present invention. Illustration is made of a process of applying the insulation material 422 to one side of a pair of opposing linear regions of a hexagonal coil formed by winding around a plurality of times the wire 421 made of a flat rectangular wire having a substantially rectangular cross-section.

Figure 63A:
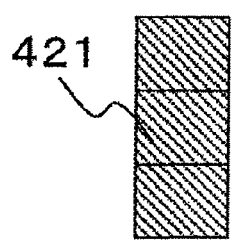
FIG. 63A is a diagram illustrating a first step of the process of fixing the insulation material.

FIG. 63A is a cross-sectional view of the linear region of the hexagonal coil. The hexagonal coil is formed by winding around a plurality of times (in this example, 3 rounds) the wire 421 made of a flat rectangular wire having a substantially rectangular cross-section. As a method for preventing separation of the wire 421, a wire holding member (not shown) may be used to hold a portion (referred to as a "coil end") of the coil 4131 that protrudes from the portion of the coil 4131 that is fitted in the stator iron core 412 (the latter portion being referred to as a "slot portion") to enable the wire 421 to be held without being separated from each other.

Figure 63B:
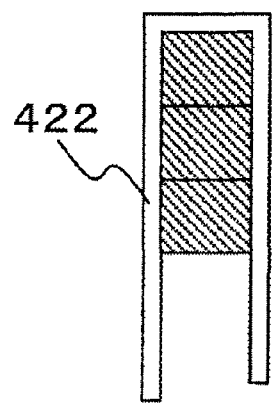
FIG. 63B is a diagram illustrating a second step of the process of fixing the insulation material.

FIG. 63B illustrates a state in which the insulation material 422 is supplied and positioned at a coil formed by winding around a plurality of times the wire 421 made of a flat rectangular wire having a substantially rectangular cross-section. In the figure, the insulation material 422, which is arranged in a U-shaped form along the wires 421, has ends with different lengths from each other. This arrangement is provided so as to make the thickness of the overlap of the insulation substantially equal along the side of the coil 4131 where the ends of the insulation material 222 overlap one on another. However, if a sufficient overlapped portion can be secured, the lengths of the ends of the insulation material 422 may be the same.

Figure 63C:
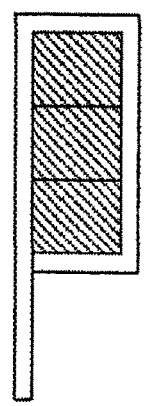
FIG. 63C is a diagram illustrating a third step of the process of fixing the insulation material.

FIG. 63C illustrates a state in which the insulation material 422 is supplied and positioned at a coil formed by winding around a plurality of times the wire 421 made of a flat rectangular wire having a substantially rectangular cross-section and then one of the ends of the U-shaped insulation material 422 is folded. This structure is obtained by folding one of the overlapping portions of the insulation material 422 which should be closer to the wires 421 in the state shown in FIG. 63B using a folding device (not shown).

Figure 63D:
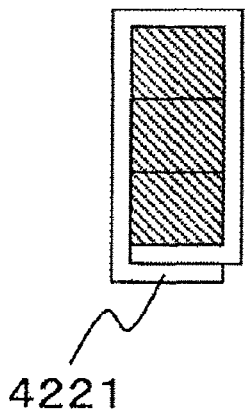
FIG. 63D is a diagram illustrating a fourth step of the process of fixing the insulation material.

FIG. 63D illustrates a state in which the insulation material 422 is supplied and positioned at a coil formed by winding around a plurality of times the wire 421 made of a flat rectangular wire having a substantially rectangular cross-section and then both the ends of the U-shaped insulation material 422 are folded. This structure is obtained by starting from the state shown in FIG. 63C and folding another end of the insulation material 422 onto one of the overlapping portions 4221 of the insulation material 422, which should be closer to the wires 421 and has been already folded, using a folding device (not shown).

Figure 63E:
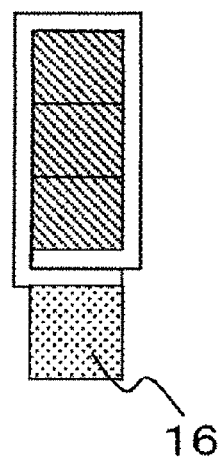
FIG. 63E is a diagram illustrating a fifth step of the process of fixing the insulation material.

FIG. 63E illustrates a state in which the insulation material 422 is supplied and positioned at a coil formed by winding around a plurality of times the wire 421 made of a flat rectangular wire having a substantially rectangular cross-section, then both the ends of the U-shaped insulation material 422 are folded, and a fixation head 16 is positioned on the overlapping portion 4221. This structure is obtained by positioning the fixation head 16 to the overlapping portion 4221 of the insulation material and is used for melting the overlapping portion 4221 of the insulation material by the function of the fixation head to fix the insulation materials 422 to each other. When a thermoplastic resin is used as the insulation material 422, a device for increasing the temperature of the resin to a softening temperature (for example, a heating head or an ultrasonic head) or higher is used to melt and fix the insulation material 422 on the side closer to the wires 421 and the insulation material 422 on the top side thereof from among the overlapping portions 4221 of the insulation material 422, thus exhibiting a fixation strength. Temperature conditions under which the temperature of the resin is increased to the softening temperature or higher are selected such that the minimum thickness of the overlapping portion 4221 after the melting and fixation is equal to or larger than the thickness of the insulation material 422.

Figure 63F:
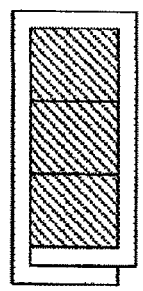
FIG. 63F is a diagram illustrating a sixth step of the process of fixing the insulation material.

FIG. 63F illustrates a state in which the wire 421 made of a flat rectangular wire having a substantially rectangular cross-section is wound around a plurality of times to form a coil, the insulation material 422 is supplied and positioned on the coil to form a U-shaped structure, ends of the U-shaped insulation material 422 are folded, and the overlapping portions 4221 are fixed to each other.

A series of the steps is performed to the other side of the pair of opposing linear regions of the hexagonal coils simultaneously or sequentially. As a result, there is obtained a hexagonal coil that includes a coil formed by winding around a plurality of times a wire made of a flat rectangular wire having a substantially rectangular cross-section, the wound around portions being bundled and fixed with an insulator.

Since the rotating electrical machine of the present embodiment includes the coil 4131 whose wire has a substantially rectangular cross-section, its space factor in the slots 411 of the stator iron core can be increased. In particular, use of the overlapping winding makes it possible to wind the coil in a state where the coils 4131 having a substantially rectangular cross-section are laminated one on another. Therefore, high power and good rotating properties are obtained.

In the rotating electrical machine of the present embodiment the cross-section of the coil is arranged to be a substantially rectangle shape which is longer in its circumferential direction and shorter in its radial direction. For this reason, the number of the coils 4131 in the slot 411 can be increased as much as possible and the effect of reduction in loss by higher harmonics can be increased. From the viewpoint of space, the length of the side that protrudes on the side of the coil end becomes smaller, so that the amount of protrusion of the coil end can be reduced. It is difficult to form the thin coil 4131 by deforming the coils one by one. However, in the present embodiment, the coils can be formed without difficulty since they are lap wound and bundled.

In the rotating electrical machine according to the present embodiment, the occurrences of damages of the coating on the surface of the coils when the coils 4131 are formed or inserted into slots can be avoided since the insulation member 422 is fixed to the slot insertion regions of the coil 4131.

In the rotating electrical machine according to the present embodiment, a coil insertion area of the slot in which a coil is to be inserted is made an open slot. The open space has a width in the radial direction which is substantially equal to or larger than that of an area of the slot where the coil 4131 is fitted. Therefore, the region to be inserted in the slot of the coils 4131 can be inserted into the slot without difficulty and the space factor of the coils 4131 in the slot will not be decreased.

In the rotating electrical machine according to the present embodiment, coming out of the coil 4131 from the coil insertion area of the slot can be prevented by attaching a holding member that prevents movement of the coil 4131 on the inner circumference side of the coil insertion area of the slot.

Figure 64:
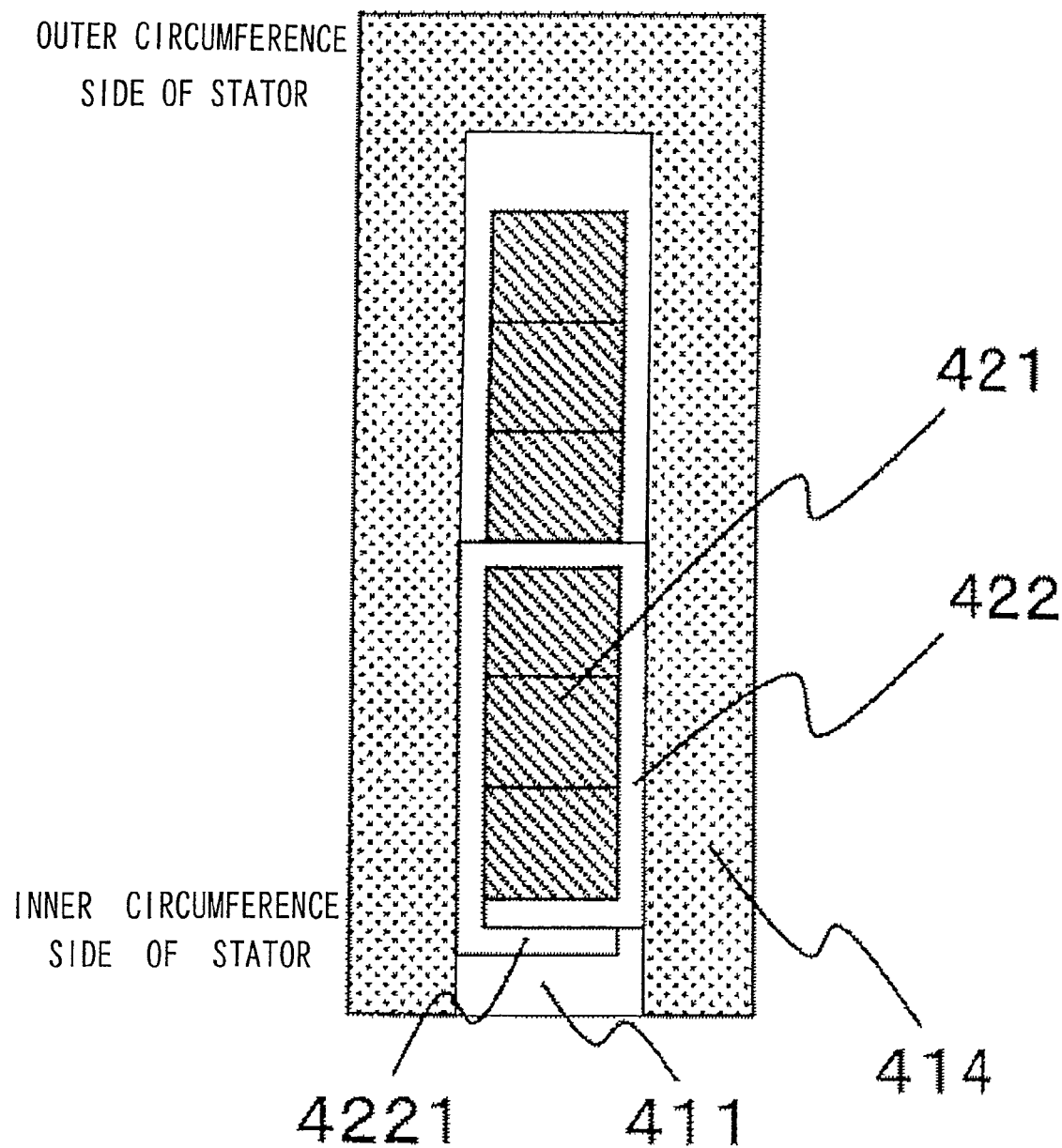
FIG. 64 is a cross-sectional view showing an example of the other embodiment in which the insulation material is fixed to the coil.

FIG. 64 is a diagram showing an alternative example of the stator according to the present embodiment. If the insulation property of the wire 421 is sufficient to secure the insulation performance of the stator, the insulation material 422 is wound around one of the pair of linear regions of the coil formed by winding around the wire a plurality of times and then is bundled and fixed, but the insulation material 422 is not wound around the other of the pair of linear regions.

FIGS. 65A and 65B illustrate an alternative example of the stator. In the structure of the stator shown in FIGS. 63A to 63F, when the insulation material 422 is applied around the outer circumference of the coil 4131 formed by winding around a plurality of times the wire 421 made of a flat rectangular wire having a substantially rectangular cross-section, the width of the overlapping portion 4221 is set substantially the same as the width of the wire 421. However, the width of the overlapping portion 4221 may be narrower than the width of the wire 421 if a desired insulation property can be secured from the properties of the insulation material 422 even when the width of the overlapping portion 4221 is decreased. In addition, the power for melting the overlapping portion 4221 of the insulation material 422 can be decreased by narrowing the width of the fixation head 16. When the power is the same, the time in which the softening temperature is reached can be shortened.

Figure 66A:
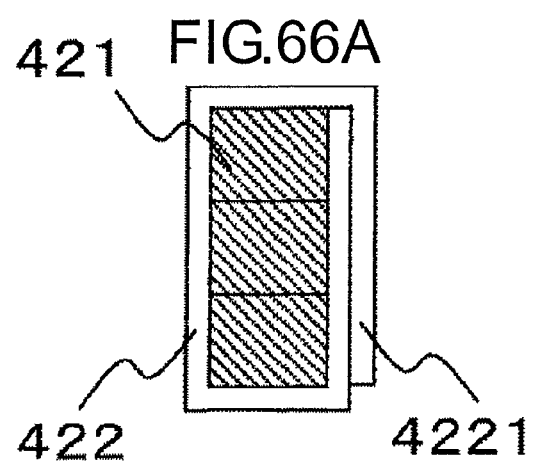
FIG. 66A is a diagram illustrating a second example of the other embodiment, indicating a first step of the process of fixing the insulation material.
Figure 66B:
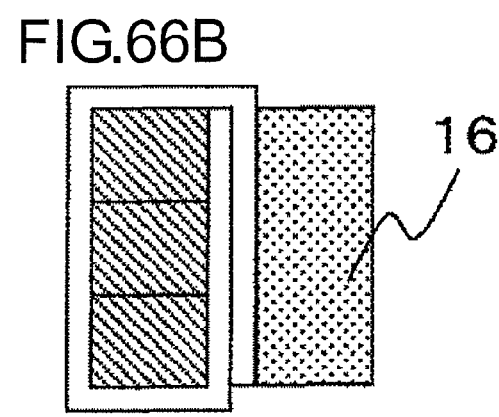
FIG. 66B is a diagram illustrating a second example of the other embodiment, indicating a second step of the process of fixing the insulation material.

FIGS. 66A and 66B illustrate an alternative example of the stator. In the structure of the stator shown in FIGS. 63A to 63F, when the insulation material 422 is provided around the outer circumference of the coil 4131 formed by winding a plurality of times the wire 421 made of a flat wire having a substantially flat cross-section, the overlapping portion 4221 is arranged in the direction of the depth of the slot 411 (in the radial direction of the stator). This structure is designed to make the length of the overlapping portion 4221 minimum, that is, to make the space factor of the wire maximum. However, when it is desired to increase the fixation region independently of the space factor of the wire, the overlapping portion 4221 can be arranged such that it is positioned in the width direction (i.e., in the radial direction of the stator 4) as shown in FIGS. 66A and 66B. On this occasion, the fixation head 16 is made to have a shape that conforms to the position and width of the overlapping portion 4221.

FIGS. 67A and 67B illustrate an alternative example of the stator. In the preceding examples, a conventional insulation paper having a fibrous surface is used as it is in order to take advantage of the smoothness of the surface of the insulation material so that the resistance upon insertion of the bundled coils into the slot 411 can be reduced. However, in order to prevent the coil 4131 from coming out of the slot 411 due to the electromagnetic force or vibration when it is used in the stator of a rotating electrical machine, other members called wedges are attached to the opening of the slots 411 respectively. Accordingly, by providing protrusions on the surface of the insulation material 422, there can be obtained advantages in that use of the conventional wedges can be avoided, the thickness of the conventional wedges can be decreased, or a material having strength lower than that of the conventional wedges can be used for the wedges.

In FIG. 67A, the insulation material 422 having inherent surface smoothness as a material is provided with a plurality of protrusions at both sides in the direction of the width of the slot 411 (i.e., in the radial direction of the stator) in a stage where the insulation material 422 is fixed to the wire 421. The shapes of the protrusions are made such that the coil 4131 is easy to move in the insertion direction thereof and on the contrary difficult to move in the direction in which it is comes out, so that the protrusions are effective for preventing coming off of the coil 4131 from the slot 411.

In FIG. 67B, the insulation material 422 has protrusions on the surface thereof in the state of a material. In this case, the same devices as those used for the insulation material 422 having no protrusions on the surface thereof can be used. In addition, it is effective for preventing the coming off of the coil 4131 from the slot 411.

In the above-mentioned examples, the degree of fixation of the insulation material is controlled such that the wire 421 and the insulation material 422 are not fixed to each other. As a result, the positioning of the wire 421 and the insulation material 422 immediately before the insertion of the wire into the stator can be optimized.

In the method of fixing the wire 421 and the insulation material 422 to each other, the length of the insulation material 422 has been determined to be rather long so that a sufficient length of protrusion from the lamination thickness of the stator can be secured in view of insulation distance taking into consideration the precision in determining the fixation position of the insulation material 422 with respect to the coil. By performing no fixation of the wire 421 and the insulation material 422 to each other as in the present embodiment, the length of the insulation material 422 can be decreased to the necessity minimum independently of the precision of fixation positioning of the insulation material 422 with respect to the coil by the adjustment immediately before the insertion of the coil into the stator.

In the above-mentioned embodiment, control of the degree of fixation such that the wire 421 and the insulation material 422 do not fix to each other makes it possible that when troubles occur upon inserting the stator, the wire 421 is not damaged. When only the insulation material 422 is damaged, the coil can be taken out for replacing and re-fixation of insulation material 422, and thus it becomes possible to reduce waste coils.

In the above-mentioned embodiments, when the insulation material 422 is fixed, the insulation material 422 for the coil slot portion and the insulation material 422 for the coil end portion can be fixed simultaneously or in a separate step. As a result, there can be selected different types and thicknesses of the insulation material 422 appropriate for insulating the coil slot portion from ground and for insulating the coil end portion from other one of different phase. If the shapes of the insulation material required for respective parts are different, the pieces of the insulation material 422 cut out effectively to keep its good yield may be integrated in the fixation step even when the insulation materials 422 of the same material and the same thickness are used.

In the above-mentioned embodiments, explanation has been made on the method of incorporating the coil in which the coil is inserted through the opening provided on the inner circumference side of the stator toward the outer circumference of the stator. However, there may also be applied a method of incorporating the coil through an opening provided on the outer circumference side of the stator toward the inner circumference side of the stator.

As an alternative example, a thermosetting resin may be used as the insulation material 422. The insulation material 422 is temporarily jointed by spot fixing before the coil together with it is incorporated into the slot. It is possible to effect main curing in a heating step such as a treatment with a varnish.

In conventional stators that include a core and windings, it is necessary to increase the density of the windings in order to achieve high efficiency. For a distributed winding stator, the following structure is adopted. That is, when a coil formed by winding around in a plurality of times a wire made of a flat rectangular wire having a substantially rectangular cross-section is provided in a plurality of slots that is open on the inner circumference side of the stator iron core, the wire wound around in a plurality of times and is bundled and fixed with an insulator into a hexagonal coil and one and the other of opposing linear regions of the hexagonal coil are fitted into slots so as to overlap in the radial direction. The coil to be arranged on the outer circumference side of the core is introduced first and then the coil to be arranged on the inner circumference side of the core is introduced. On this occasion, for some of the coils, it is necessary to once take out from the slot one of the linear regions of the coil that constitutes the coil on the inner circumference side of the core and has already been inserted into the slot and insert the other of the linear regions that constitutes the coil on the outer circumference side of the core and then insert again the one of the linear regions of the coil that constitutes the inner circumference of the core into the slot.

Therefore, it is necessary to achieve a good balance between the flexibility of the coil in whole upon deforming the coil into a shape suitable for being inserted into the slot and the stiffness of fixing the regions of the coil to be inserted in the slots to prevent from their loosening upon the insertion of the deformed coil into the slots when the coil formed by winding around the wire in a plurality of times is bundled and fixed with the insulator.

For example, a self-fusing wire that includes an insulated wire having a fusion layer on the insulation coating is formed into a coil. An insulation paper is positioned and firmly attached to the outer circumference of the coil. In this state, current is applied to the wire to generate heat. This causes the fusion layer on the surface of the wire to be molten, so that the wire and the insulation paper can be fixed to each other.

However, with this method, there is a possibility that the wire in whole is heated and there occurs not only the fixation of the insulation paper to the slot portion but also fixation of the coil ends. When the coil is deformed from the shape suitable for being wound around into the shape suitable for being inserted into the slot, there occurs a defect of peeling off of the insulation coating or the like. Since there is no fusion layer at the overlapping portion of the insulation paper, the overlapping portion remains as it is or it is necessary to fix the insulation paper with other means such as an adhesive. There should be also taken into account a demerit that the self-fusion wires are more expensive than non-fusing wires.

According to another conventional method, an insulation tape is wound obliquely around the coil in whole or around a portion of the coil that corresponds to the core slot. In this tape winding, human hands or a machine cannot work unless there is a sufficient space inside the coil.

Such an oblique winding method can be used if the mechanism for winding an insulation material has a size such that it is not obstructive when it is arranged between the opposing linear regions of the coil. Since the overlapping portion exists all over the outer circumference, there is a limitation on an increase in the space factor of the wire, which is a ratio of the area of the wire to the area of the slot. In addition, since the ratio of the cross-sectional area of the insulation tape to the cross-sectional area of the coil is small, the space factor of the wire is less affected. However, since the size of the coil used in a tiny motor is correspondingly smaller, it is difficult for the insulation tape winding mechanism to be situated between the opposing linear regions of the coil. Further, since the ratio of the cross-sectional area of the insulation tape to the cross-sectional area of the coil increases, there is a possibility that the space factor is decreased.

On the other hand, in the present embodiment, the insulation material can be provided onto a coil obtained by winding around the wire a plurality of times by a method in which the insulation material and the wire are supplied separately and the insulation material is not wound around the coil end portion, whereas the insulation material is wound over the coil at the slot insertion portion, with one side thereof being fixed. With this construction, it is possible to achieve a coil keeping both properties of n the flexibility of the coil in whole that is required when the wound shape of the coil is changed its form into a shape suitable for being inserted into the slot and the stiffness of fixing the coil so that the portion of the coil to be inserted into the slot will not loosen, when the coil formed by winding around the wire a plurality of times is bundled and fixed with the insulation material and provided in a plurality of slots formed so as to be open on the inner circumference side of the stator core.

By firmly fixing the core slot portion and allowing the coil end portion to retain a sufficient flexibility, a motor having a high reliability can be obtained. Since the surface of the insulation material has lubricating property, the workability of assembling the coil into the core is increased.

Fourth Embodiment

All the above-mentioned embodiments are suitable for the rotating electrical machine and coil thereof according to a fourth embodiment of the present invention explained below.

Explanation is made on an electric motor for use in a hybrid automobile that constitutes a rotating electric machine according to an embodiment of the present invention. The hybrid automobile according to the present embodiment has both the function of a drive motor that drives wheels and the function of a generator that generates electricity and switches the functions one from another depending on the running condition of the automobile. Now, the present invention is explained taking an induction type rotating electrical machine as an example. However, the present invention may be applied to rotating electrical machines of other types, for example, a synchronous rotating electrical machine.

Figure 1:
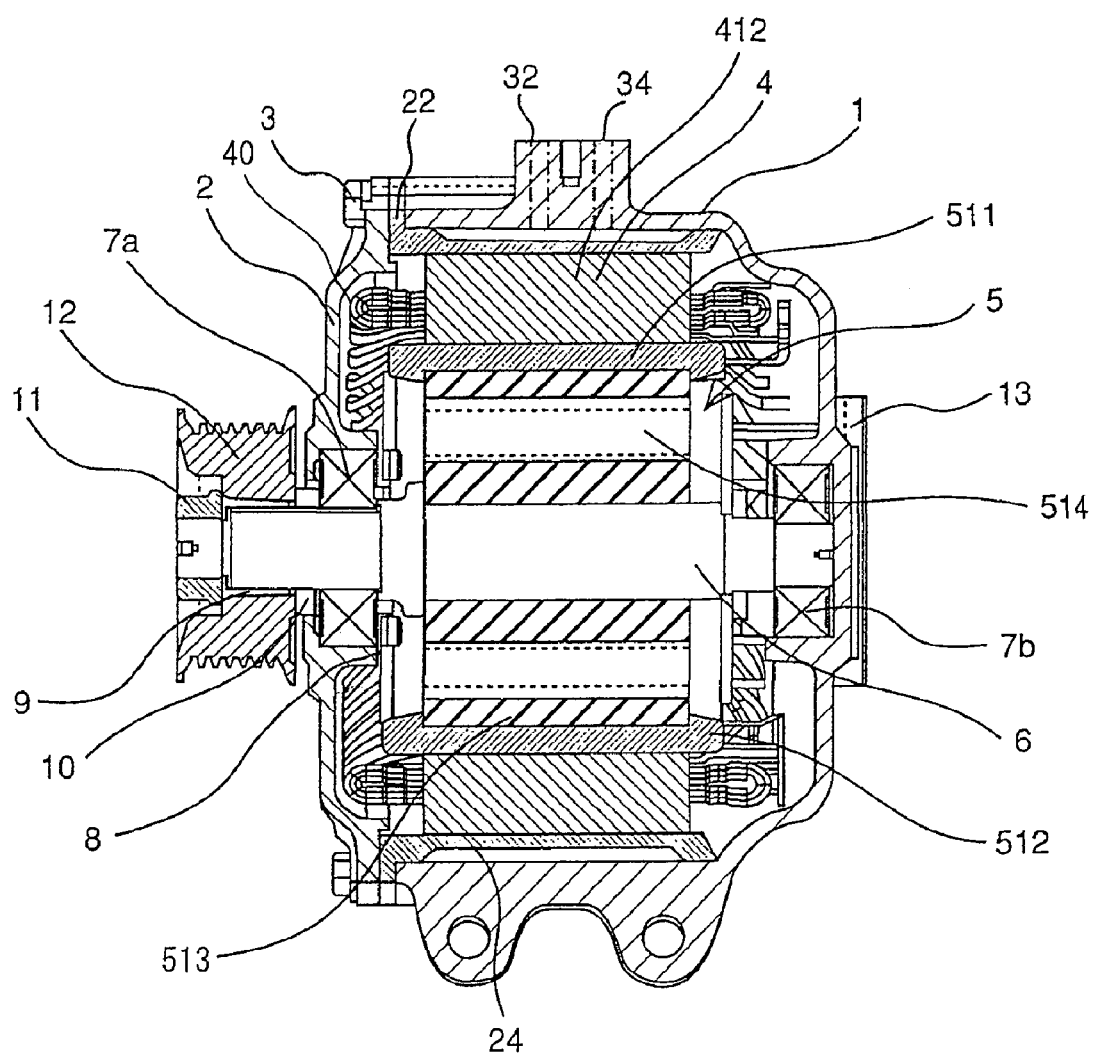
FIG. 1 is a sectional side view showing an electrical motor.
Figure 2:
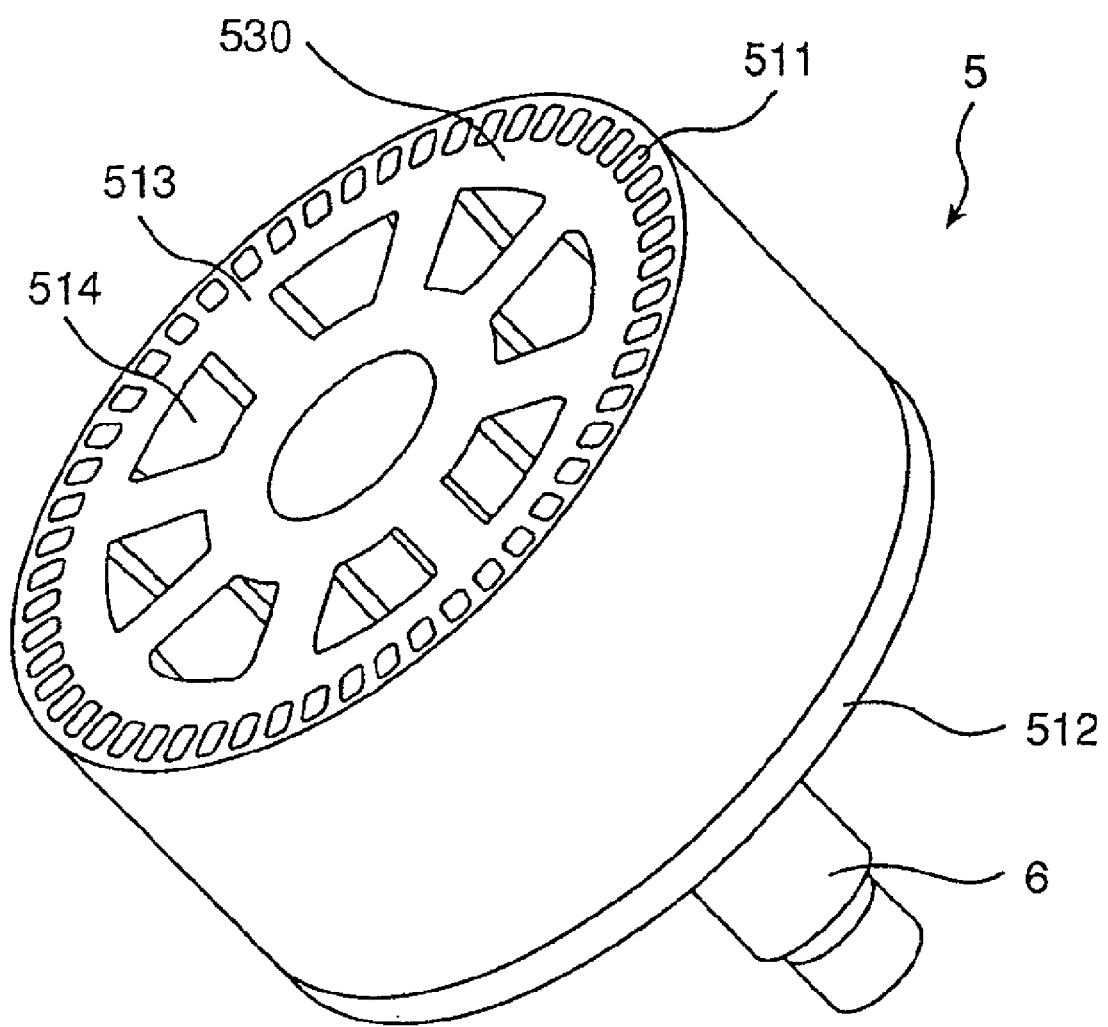
FIG. 2 is a perspective view showing the cross-section of a rotor.
Figure 3:
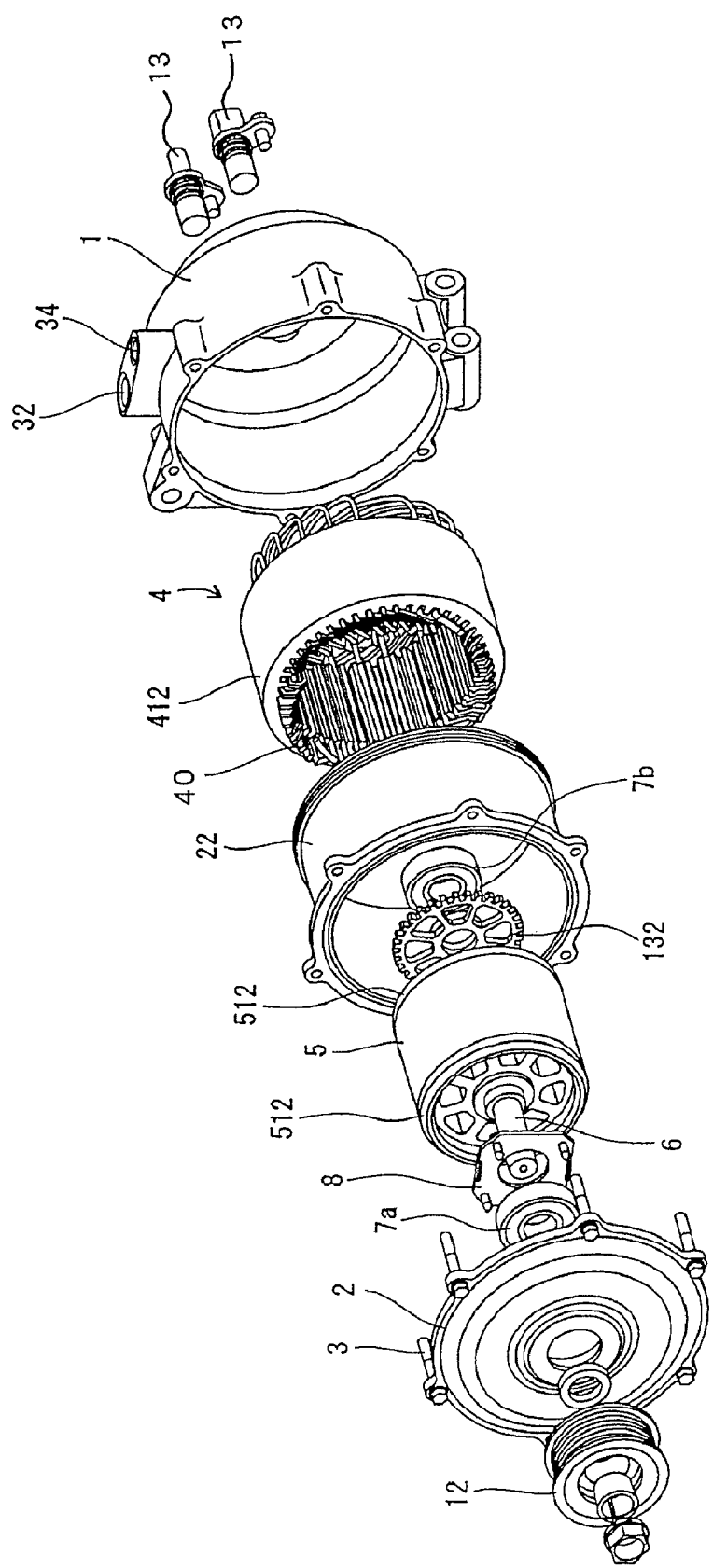
FIG. 3 is an exploded perspective view showing respective parts of a motor.

FIG. 1 is a side cross-section of an induction type rotating electrical machine. FIG. 2 is a perspective view of a cross-section of a rotor. FIG. 3 is an exploded perspective view showing respective parts of an inductive rotating electrical machine.

The inductive rotating electrical machine includes a housing 1 and a cover 2 that seals an opening end of the housing 1 and a cover that seals an opening edge of the housing 1. A canal forming member 22 is provided on the inner side of the housing 1. One end of the canal forming member 22 is fixed as held between the housing 1 and the cover 2. A canal 24 is formed between a stator 4 and the housing 1. Cooling water is introduced into the canal 24 through an inlet 32 for cooling water and is discharged to an outlet 34 from the canal 24 to cool the rotating electrical machine. The housing 1 and the cover 2 are fastened with a plurality of, for example, six bolts 3.

Figure 4:
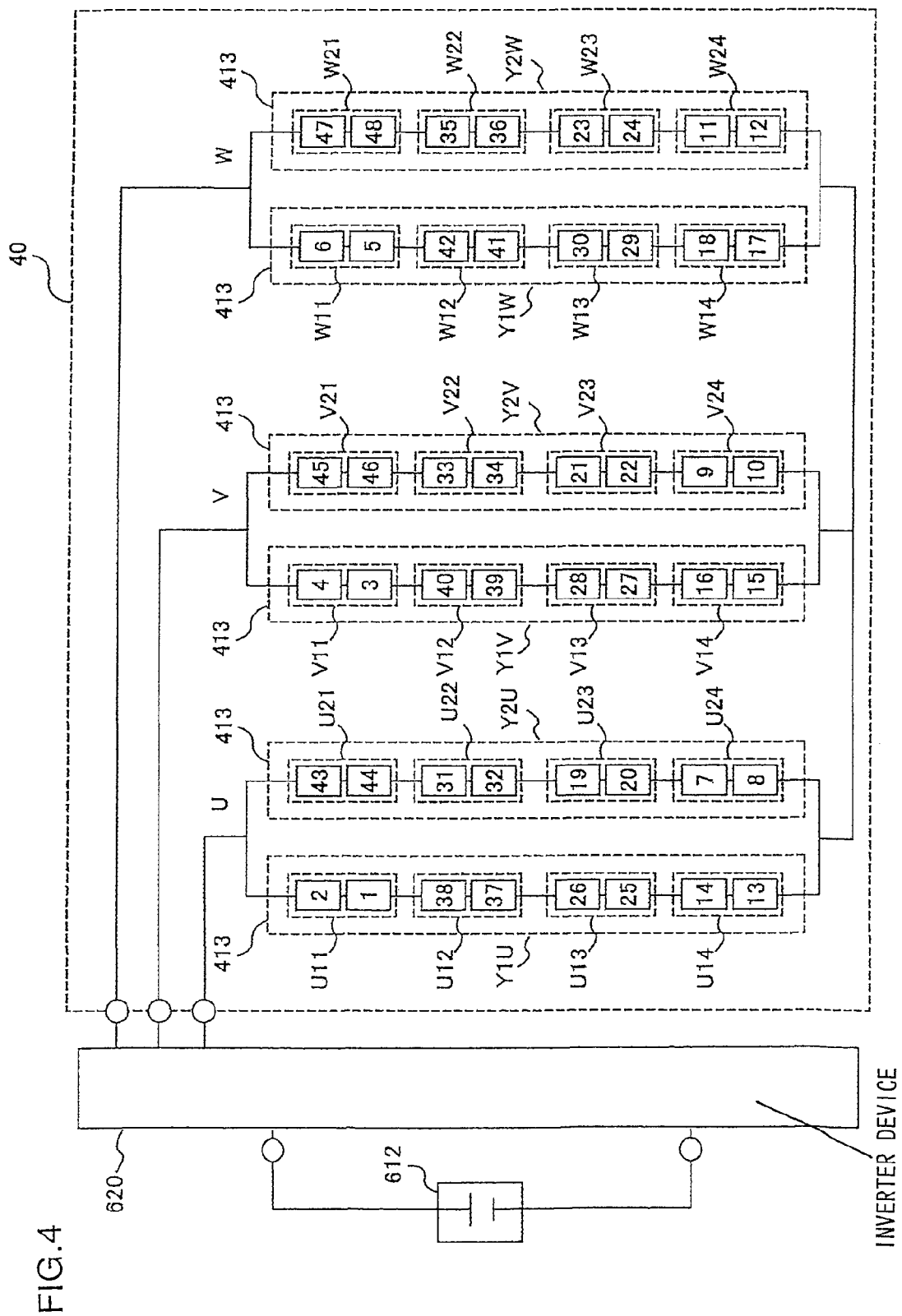
FIG. 4 is a system diagram illustrating electrical connections.
Figure 6:
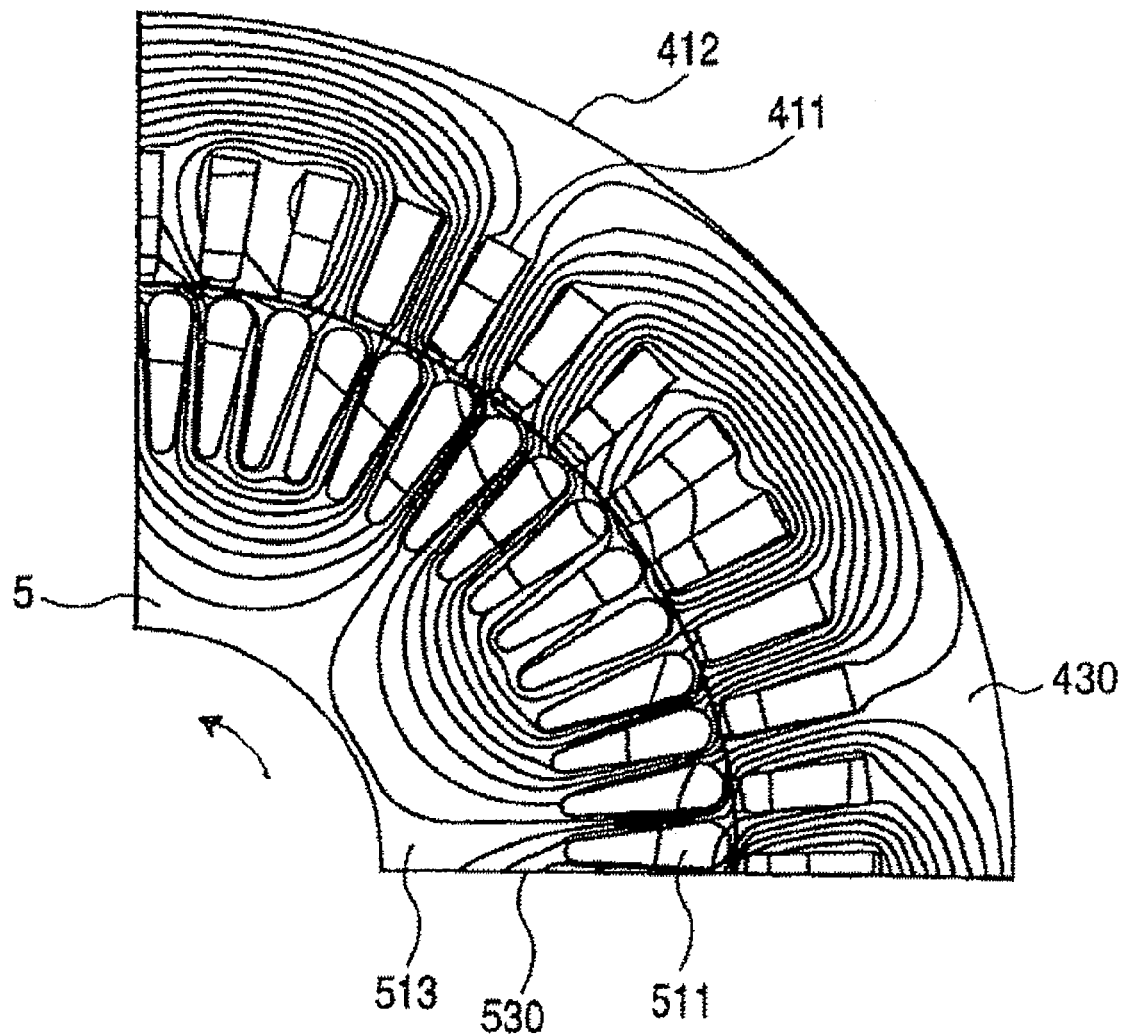
FIG. 6 is a diagram showing the condition of magnetic fluxes when the rotation speed of the rotor is lower than the rotation speed of the rotating magnetic fields generated by the stator core.

On the inner circumference of the housing 1 is provided the canal forming member 22. On the inner side of the canal forming member 22, there is fixed the stator 4, for example, by shrink fit. The stator 4 includes a stator core 412 formed of a plurality of slots 411 at equal intervals in a circumferential direction and a three-phase stator winding 40 wound around in each slot 411 as shown in FIG. 6. In the present embodiment, the stator is of an 8-pole-48-slot configuration and has a star-shaped wire connection. Each phase has a 2Y wire connection constituted by a pair of stator coils 413 connected to each other in parallel as shown in FIG. 4.

On the inner circumference of the stator core 412 is rotatably arranged a rotor 5 facing the stator core 412 through a minute gap. The rotor 5 is fixed to a shaft 6 and rotated together with the shaft 6. The shaft 6 is rotatably supported at the both sides thereof by ball bearings 7a and 7b serving as shaft bearings provided in the housing 1 and the cover 2, respectively. Of the ball bearings 7a and 7b, the ball bearing 7a on the side of the cover 2 is fixed by a fixing plate 8 having a substantially rectangular shape as shown in FIG. 3. The ball bearing 7b on the side of the bottom of the housing 1 is fixed to a concave portion provided in the bottom of the housing 1. Therefore, the rotor 5 can rotate relative to the stator 4. To an end of the shaft 6 on the side of the cover 2 is attached a pulley 12 through a sleeve 9 and a spacer 10 with a nut 11. The rotation power of the shaft 6 is output to outside or is input from outside through the pulley 12. The outer circumference of the sleeve 9 and the inner circumference of the pulley 12 are cone-shaped to some extent. Therefore, the pulley 12 and the shaft 6 are integrated by the fastening force of the nut 11, so that they can be rotated integrally.

The rotor 5 is a squirrel cage-type rotor, which includes conductor bars 511 extending in the direction of rotation axis are provided at equal intervals in the circumferential direction along the whole circumference. Each conductor bar 511 is short-circuited by a pair of short-circuit rings 512 provided on both the ends thereof. The conductor bars 511 are embedded in a rotor core 513 made of a magnetic material. FIG. 2 shows a cross-sectional structure cut on a plane perpendicular to the rotation axis in order to clearly indicate the relationship between the rotor core 513 and the conductor bars 511, with the short-circuit ring 512 on the side of the pulley 12 and the shaft 6 being not shown.

The rotor core 513 includes a lamination of steel plates, which is formed by punching or etching 0.05 mm to 1 mm thick magnetic steel plates and laminating such magnetic steel plates. As shown in FIGS. 2 and 3, cavities 514 having a substantially sectorial shape are provided in the rotor core 513 on the inner circumference side thereof at equal intervals in the circumferential direction in order to reduce the weight of the rotor. On the outer circumference side, there is provided a plurality of spaces in which the respective conductor bars 511 are arranged. The rotor core 513 has the conductor bars 511 on the side of the stator and a rotor yoke 530 for making magnetic circuits inside the conductor bars 511, respectively.

In the present embodiment, the stator includes an 8-pole stator winding so that the thickness in the radial direction of the magnetic circuit formed in the rotor yoke 530 can be reduced as compared with 2-pole and 4-pole induction type electric motors. Although increasing the number of poles to more than 8 enables the above-mentioned thickness to be decreased, there arises a problem that when the number of poles is 12 or more, the power and efficiency of the rotating electrical machine are decreased. Therefore, it is preferred that the rotating electrical machine for running vehicles also taking into consideration the function of starting the engine has 6-poles to 10-poles, with 8-poles or 10-poles being particularly advantageous.

The conductor bars 511 and the short-circuit rings 512 of the rotor 5 are each made of aluminum and is formed by die casting such that they are integrated with the rotor core 513. The short-circuit rings 512 arranged at both the ends of the rotor core 513 are provided so as to protrude from the rotor core 513 toward both the ends in the axial direction. The conductor bars 511 and the short-circuit rings 512 may be composed of, for example, copper. In this case, they may be formed by die casting. Instead of die casting, brazing or friction stir welding may be used to join and fix the conductor bars and the short-circuit rings 512 in order to increase productivity and cope with higher harmonic waves.

On the side of the bottom of the housing 1, there are provided a detection rotor 132 for detecting the position of the rotor and a rotation sensor 13. The rotation sensor 13 detects a tooth of the detection rotor 132 and outputs an electric signal for detecting the position of the rotor 5 or the rotation speed of the rotor 5. A resolver may be used as the rotation sensor 13.

Next, the operation of the induction type electric motor in the present invention is explained referring to FIGS. 1 to 6.

First of all, explanation is made on power running operation of the rotating electrical machine that functions as a motor for driving wheels and engine. FIG. 4 is a diagram showing a system for illustrating electric connection. For example, a high voltage secondary battery 612 adapted to 100 V to 600 V is electrically connected to a DC terminal of an inverter device 620. An AC terminal of the inverter device 620 is electrically connected to a stator winding 40. As described later, each phase of the stator winding 40 has a stator coil 413 connected in parallel.

Figure 5:
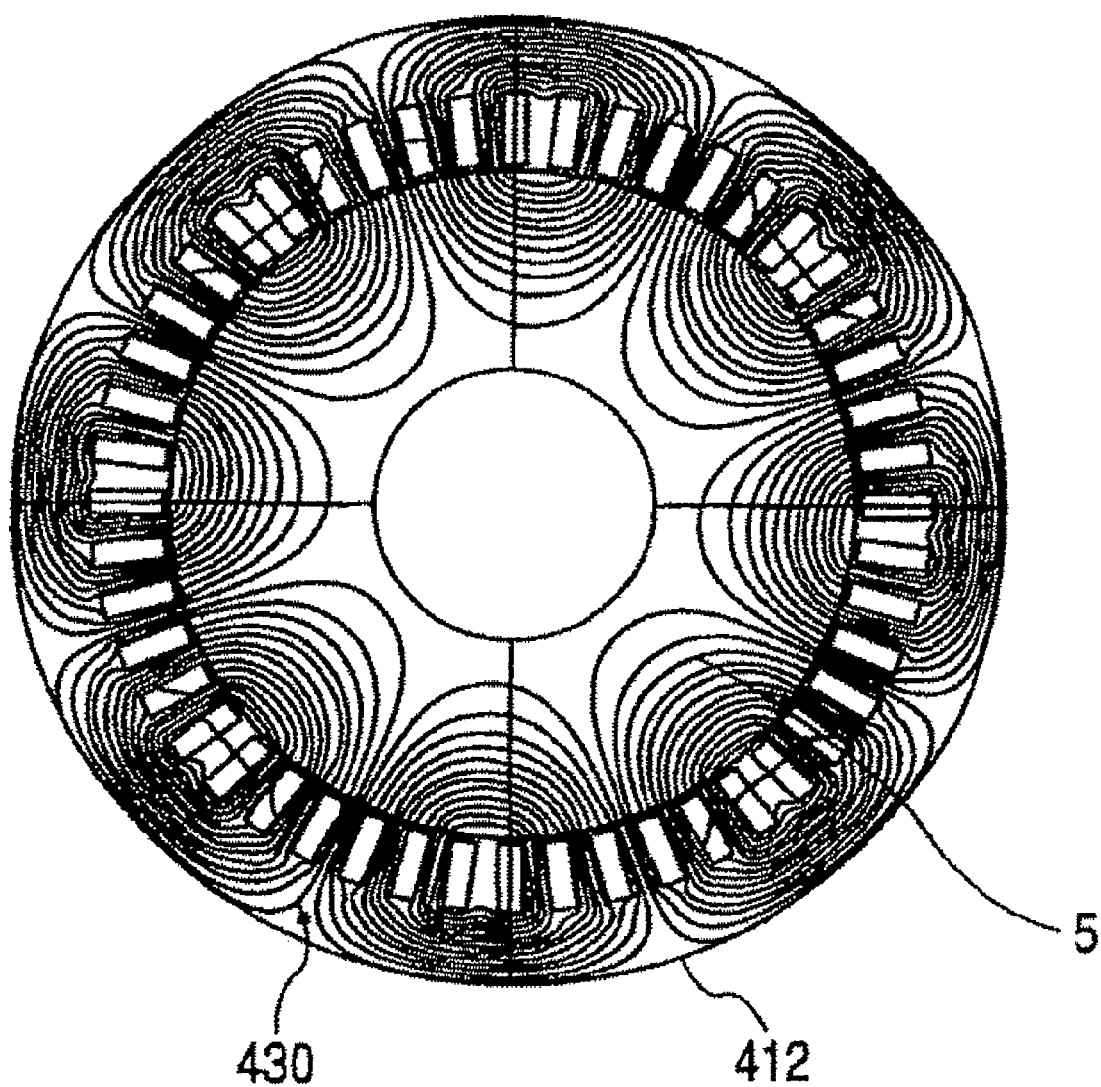
FIG. 5 is a diagram showing the conditions of rotating magnetic fields generated by stator windings.

In the power running operation, DC power is supplied from the secondary battery 612 to the inverter device 620 and AC power is supplied from the inverter device 620 to each stator coil 413 of the three-phase stator winding 40 wound around the stator core 412. The AC power generates a rotating magnetic field having a rotation speed based on the frequency of the AC power in the stator core 412 and as shown in FIG. 5 the rotating magnetic field generates a magnetic flux through the rotor 5 as a magnetic path. FIG. 5 shows the state of the rotating magnetic field generated by the stator winding 40. The winding configuration of the stator winding 40 is an 8-pole distributed winding as explained in the following embodiment. FIG. 5 shows the state in which the influence of the rotor has been removed and corresponds to the result of simulation based on the assumption that a general iron core including no conductor bars is used. In a core back 430 provided on the side of the outer circumference of a slot in the stator core 412 is formed a magnetic circuit due to the rotating magnetic field. In this simulation, the stator winding 40 has a large pole number as large as 8, so that the thickness in the radial direction of the magnetic field on the side of the rotor 5 is decreased. The rotating magnetic field shown in FIG. 5 is rotated according to the frequency of the AC power supplied to the stator winding 40.

In FIG. 4, the inverter device 620 generates AC current necessary for generating a torque required for a rotating electrical machine and supplies the AC current to the stator winding 40. In a state where the rotation speed of the rotor 5 is slower than the rotation speed of the rotating magnetic field, the conductor bars 511 are interlinked with the rotating magnetic field generated in the stator core 412, so that the electric current flows in the conductor bars 511 according to the Fleming's right-hand rule. Further, the electric current that flows in the conductor bars 511 generates a rotation torque in the rotor due to Fleming's left-hand rule, so that the rotor 5 rotates. Since a difference between the rotation speed of the rotor 5 and the rotation speed of the rotating magnetic field influences the magnitude of the above-mentioned torque, it is necessary to control a difference in speed, that is, "slippage" appropriately. For this purpose, the rotation speed of the rotor 5 is detected based on the output of the rotation sensor 13 and the switch frequency of the inverter is controlled to control the frequency of the AC current to be supplied to the stator 4.

FIG. 6 shows the result of simulation that indicates the state of magnetic flux in the case where the rotation speed of the rotor 5 having the conductor bars 511 is slower than the rotation speed of the rotating magnetic field generated in the stator core 412. The rotation orientation of the rotor 5 is counterclockwise. The magnetic flux due to the stator winding 40 arranged in the slots 411 passes through the magnetic circuit including the core back 430 and the rotor yoke 530 of the rotor core 513. The magnetic flux of the rotor core 513 is shifted toward the slower side than the magnetic flux of the stator core 412 in the rotation orientation of the rotor 5. Since the pole number of the stator winding is as large as 8, the magnetic flux of the rotation yoke 530 of the rotor 5 is denser on the side of the conductor bars 511 and coarser on the side of the rotation axis.

Next, explanation is made on the case where the rotating electrical machine operates as a generator. When the rotating electrical machine operates as a generator, the rotation speed of the rotor 5 that rotates by the rotating force input from the pulley 12 is higher than the rotation speed of the rotating magnetic field generated in the stator core 412. If the rotation speed of the rotor 5 becomes higher than the rotation speed of the rotating magnetic field, the conductor bars 511 are interlinked with the rotating magnetic field, so that a braking force acts on the rotor 5. This action induces the electric power in the stator winding 40 to perform power generation. In the configuration shown in FIG. 4, if the frequency of the AC power generated by the inverter device 620 is set low and the rotation speed of the rotating magnetic field generated in the stator core 412 is set lower than the rotation speed of the rotor 5, DC power is supplied from the inverter device 620 to the secondary battery 612. Since the power generated by the rotating electrical machine is based on a difference between the rotation speed of the rotating magnetic field and the rotation speed of the rotor 5, the power to be generated can be controlled by the operation of the inverter device 620. Ignoring the loss of the rotating electrical machine and reactive power, when the rotation speed of the rotating magnetic field of the rotating electrical machine is set higher than the rotation speed of the rotor 5, power is supplied from the secondary battery 612 to the rotating electrical machine through the inverter device 620, so that the rotating electrical machine functions as a motor. When the rotation speed of the rotating magnetic field of the rotating electrical machine is set equal to the rotation speed of the rotor 5, there is no transfer of power between the secondary battery and the rotating electrical machine. When the rotation speed of the rotating magnetic field of the rotating electrical machine is set lower than the rotation speed of the rotor 5, power is supplied from the rotating electrical machine to the secondary battery 612 through the inverter device 620. However, actually, the loss of the rotating electrical machine and reactive power and so on cannot be ignored and hence there will be no supply of the power from the secondary battery 612 to the rotating electrical machine in a state where the rotation speed of the rotating magnetic field of the rotating electrical machine is slightly lower than the rotation speed of the rotor 5.

Next, explanation is made in detail on the stator 4 referring to FIG. 4 and FIGS. 7 to 13.

Figure 29:
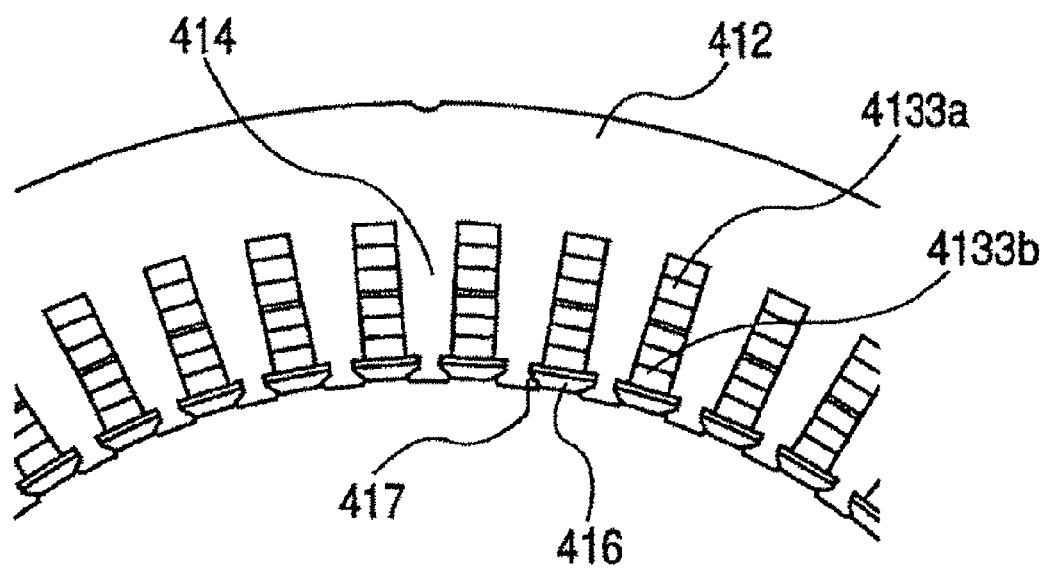
FIG. 29 is a front sectional view of the stator.

FIG. 7 is a perspective view of the stator 4 as mentioned earlier. The stator 4 shown in FIG. 7 includes the stator core 412 formed with 48 slots 411 arranged at equal intervals in the circumferential direction and a plurality of stator coils 413 that constitutes the stator winding 40 wound around the slots 411. The stator core 412 includes a lamination of steel plates, which is formed by punching or etching magnetic steel plates having a thickness of, for example, about 0.05 mm to 1 mm and laminating the formed magnetic steel plates. The stator core 412 is formed of a plurality of slots 411 arranged radially at equal intervals in the circumferential direction. In the present embodiment, the number of slots is 48. Teeth 414 are provided between any two adjacent slots 411. The teeth 414 are integrated with the circular core back 430. That is, the teeth 414 and the core back 430 are integrally formed with each other. The inner circumference side of the slot 411 is open and the stator coils 413 that constitute the stator winding 40 are inserted through the respective openings. The width of the opening of each slit in the circumferential direction is formed to be equal to or a slightly larger than the width of the slot at the position at which the coil is fitted, that is the width of the coil fitting are in each slot. Each slot is made an open slot. Each slot is adapted to be fitted with a holding member 416 as shown in FIG. 29 on the tip thereof so that the coil inserted in each slot can be prevented from moving toward the outlet side, that is, the inner circumference side of the stator. The holding member 416 is made of a nonmagnetic material such as a resin or a nonmagnetic metallic material. On both the ends in the circumferential direction of the teeth 414 on the tip side thereof, a holding groove 417 is formed so as to extend in the axial direction. The holding member 416 is adapted to be fitted in the holding groove 417 from the axial direction.

Figure 9:
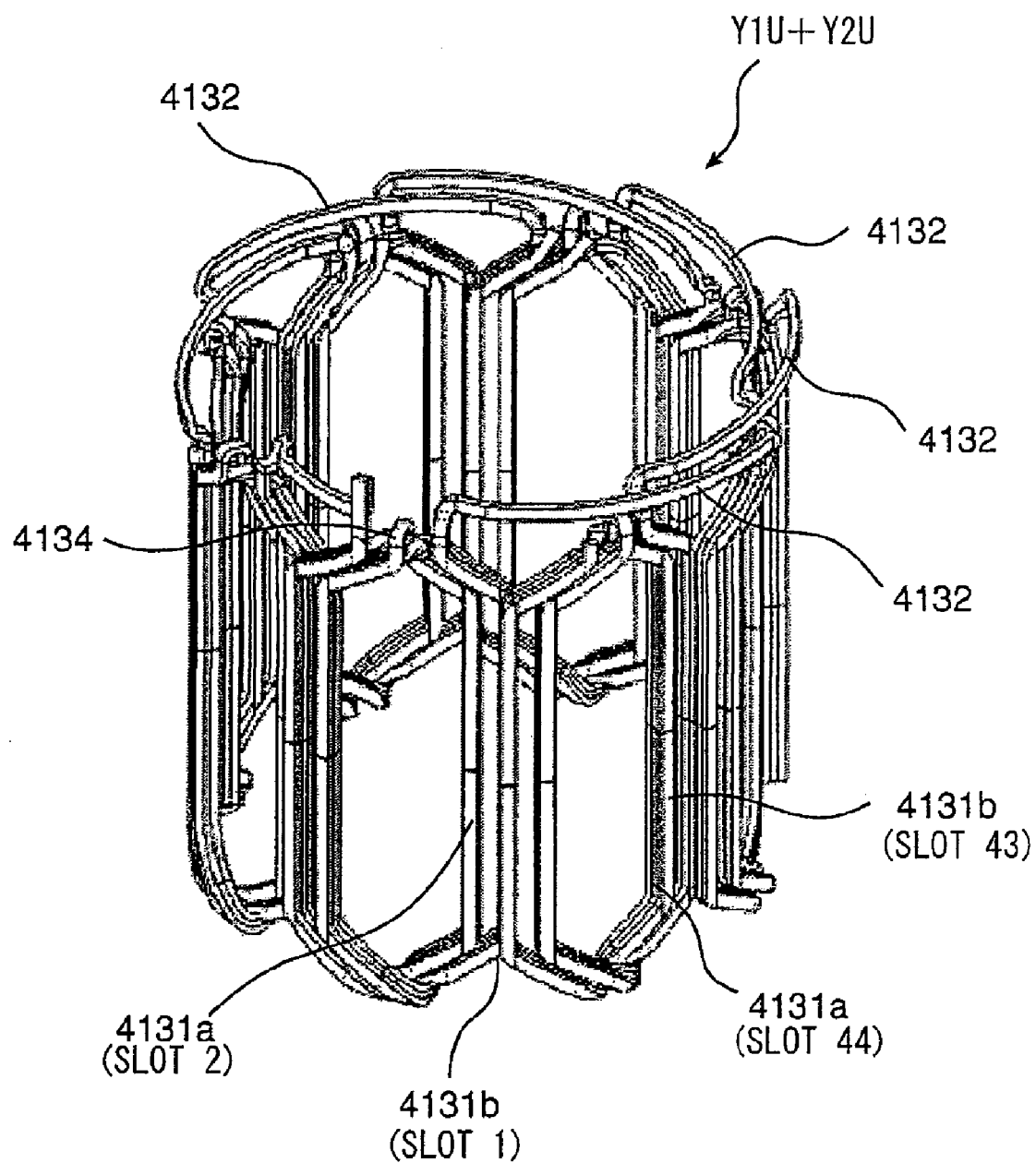
FIG. 9 is a perspective view showing a coil for a given phase.

Now, referring to FIGS. 8 and 9, explanation is made on the stator coil 413 that constitutes the stator winding 40. As shown in FIG. 4, the stator winding 40 includes six stator coils 413. FIG. 8 is a perspective view showing one (Y1U) of them. The stator coil 413 is made of a single continuous, insulation coated conductor. FIG. 9 is a perspective view showing the stator coils 413 that constitutes a given phase. The stator winding 40 according to the present invention includes windings for three phases. First, explanation is made on the winding for a given phase among them. The stator coil 413 is made of a conductor coated with an insulation film, which is a conductor, called flat rectangular wire, having a substantially rectangular cross-section and whose outer circumference is coated with an insulation film. The rectangular cross-section of the wire in a wound state is longer in the circumferential direction and shorter in the radial direction of the stator core 412. As mentioned above, the surface of the conductor of the stator coil 413 has a coating for insulation.

Before explanation is made referring to FIG. 8, connection of the stator winding 40 is explained referring to FIG. 4. The stator winding 40 in the present embodiment includes two stator coils 413 connected in a format in which winding for each phase that constitutes the stator winding 40 is connected in parallel and hence has two star wire connections. Assuming that the two star connections are wire connections Y1 and Y2, the wire connection Y1 includes a U-phase winding Y1U and a V-phase winding Y1V. On the other hand, the wire connection Y2 includes a U-phase winding Y2U and a V-phase winding Y2W. The wire connections Y1 and Y2 are connected to each other in parallel and neutral points thereof are also connected to each other.

The coil Y1U includes coils U11, U12, U13, and U14 connected in series. The coil Y2U includes coils U21, U22, U23, and U24 connected in series. The coil Y1V includes coils V11, V12, V13, and V14 connected in series. The coil Y2V includes coils V21, V22, V23, and V24 connected in series. The coil Y1W includes coils W11, W12, W13, and W14 connected in series. The coil Y2W includes coils W21, W22, W23, and W24 connected in series. As shown in FIG. 4, the coils U11 to W24 include each two sets of coils. For example, the coil U11 is a series connection of a coil 2 and a coil 1. The numbers of the coil 2 and the coil 1 indicate slot numbers of slots on the side of the rotor in which the coils are inserted. That is, the coil U11 is a series connection of the coil 2 and the coil 1. Similarly, the coil U12 is a series connection of the coil of a slot number of 38 and the coil of a slot number of 37. In a similar fashion, the coil numbers shown in FIG. 4 indicate numbers of the slots on the side of the rotor. The final coil W24 is a series connection of the coil of a slot number of 11 and the coil of a slot number of 12. Note that each of series-connected coils is inserted in adjacent slots. As explained below, this configuration is effective in that the production becomes easier and torque pulsation can be decreased. The state of each coil being wound is explained in detail later.

The coils Y1U, Y1V, Y1W, Y2U, Y2V, and Y2W have similar structures, so that the present invention is explained taking the coil Y1U as a representative example referring to FIG. 8.

Explaining the structure of the stator coil 413 taking the coil Y1U as an example, the coil Y1U includes a series connection of coils U11, U12, U13, and U14. Since each coil is arranged at an equal interval, each coil is arranged at an interval of a mechanical angle of 90°. The coil U11 includes element coils 4131a and 4131b. The element coil 4131a has a structure such that it is wound around on the rotor side of the slot 2 and the bottom side of the slot 7. More particularly, it is wound around in a pair of the slots 2 and 7 a plurality of times, for example, 3 times in the present embodiment. Since this winding around is achieved with a continuous conductor wire, it is unnecessary to perform connection working for the winding around of the coil 4131.

The element coil 4131b that constitutes the coil U11 has a structure such that it is wound around on the rotor side of the slot 1 and on the bottom side of the slot 6 three times. The element coils 4131a and 4131b have structures such that each of them is wound around between two slots. Each coil is arranged on the rotor side in one slot and on the bottom side in the other slot. The element coils 4131a and 4131b are connected in series through a coil-to-coil connection wire 4134. Also, the series connected portion is constituted by a continuous conductor wire and no special connection working is necessary. The coil 4131 that is wound around in two slots is substantially hexagonal in shape when it is fitted in the stator core 412, and at its coil ends, it is wound around such that it steps over the inner circumference side, i.e., the rotor side of one slot 411 and the outer circumference side, i.e., the bottom side of the other slot. The coil is wound around in a distributed winding method, in which the distance between the slot 2 or slot 1, which is one slot, and the slot 7 or slot 6, which is the other slot, is determined based on the number of slots and the number of poles of the stator.

As mentioned above, the element coils 4131a and 4131b are made of a continuous conductor so that the number of portions where connection works are required can be decreased. Further, the element coils 4131a and 4131b can be made of a continuous conductor inclusive of the coil-to-coil connector wire 4134 that connects them. Therefore, in the present embodiment, although the number of turns of the stator coil 413 has increased, an increase in the number of connection portions that require connection works is prevented.

The two element coils 4131a and 4131b constitute a set and the set is arranged at a plurality of positions separated in the circumferential direction at equal intervals, for example, at four positions at an interval of 90° in the present embodiment. A coil end that extends from the inner circumference side of the volute portion of one set of the element coils 4131a and 4131b and another coil end that extends from the outer circumference side of the volute portion of another set of the element coils 4131a and 4131b are connected to each other at tips of the coil ends through a bridge wire 4132. In the present embodiment, the coil end that extends from the inner circumference side of the volute portion of one set of the element coils 4131a and 4131b and the coil end that extends from the outer circumference side of the volute portion of the other set of the element coils 4131*a* and 4131*b* are wound such that they are continuous and hence the set of four pairs of the wound around portions formed so as to be adjacent are formed by coils made of a single continuous conductor. The portion of the bridge wire 4132 is provided only at one end side of the stator 4 in the axial direction and aligned across the outer circumference side and the inner circumference side of the stator core 412.

The single coil shown in FIG. 8 corresponds to a half of the stator winding for one phase. The stator winding that constitutes one phase is arranged such that the coil Y2U having the same structure as the coil Y1U is shifted from the coil Y1U by a mechanical angle of 45° in the circumferential direction as shown in FIG. 9. That is, two sets of the element coils 4131*a* and 4131*b*, which are formed coil bodies formed in the same manner, are arranged with a shift of a mechanical angle of 45° one from another. The element coil 4131*a* that constitutes the coil U11 is arranged on the rotor side of the slot 2 and the element coil 4131*b* that constitutes the coil U11 is arranged on the rotor side of the slot 1. The element coil 4131*a* that constitutes the coil U21 arranged with a shift of a mechanical angle of 45° has a structure such that it is wound around along the rotor side of the slot 44 and the bottom side of the slot 1. On the other hand, the element coil 4131*b* that constitutes the coil U21 has a structure such that it is wound around along the rotor side of the slot 43 and the bottom side of the slot 48.

By arranging the stator coils 413 formed as shown in FIG. 9 in the arrangement in which they are shifted by 15° and 30°, respectively, in the circumferential direction, the stator coils 413 that correspond to the formed coil bodies for three phases are formed. In the present embodiment, as mentioned above, the stator coils 413 for three phases can be wound around the stator core 412 in the structure that requires a reduced number of connection points for which connection works are necessary.

Figure 10:
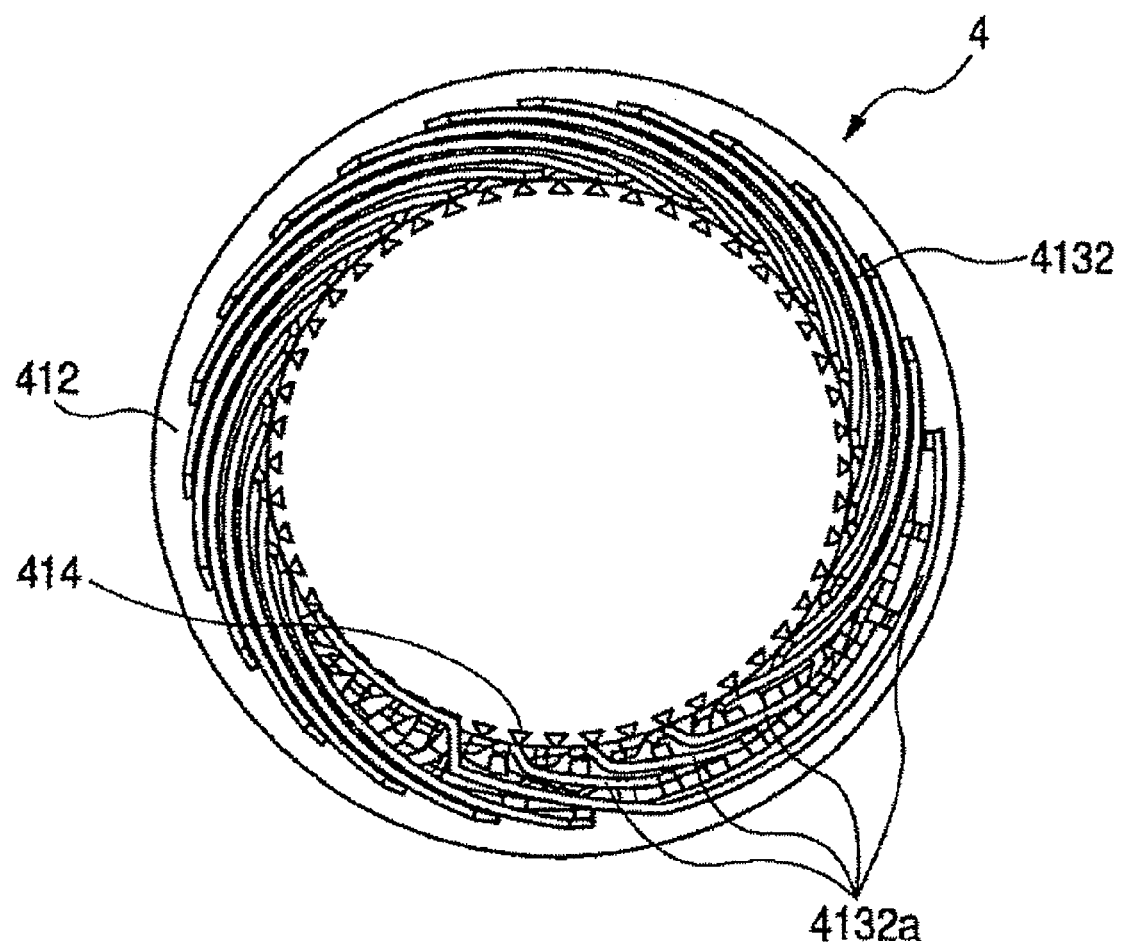
FIG. 10 is a front view of a stator.
Figure 11:
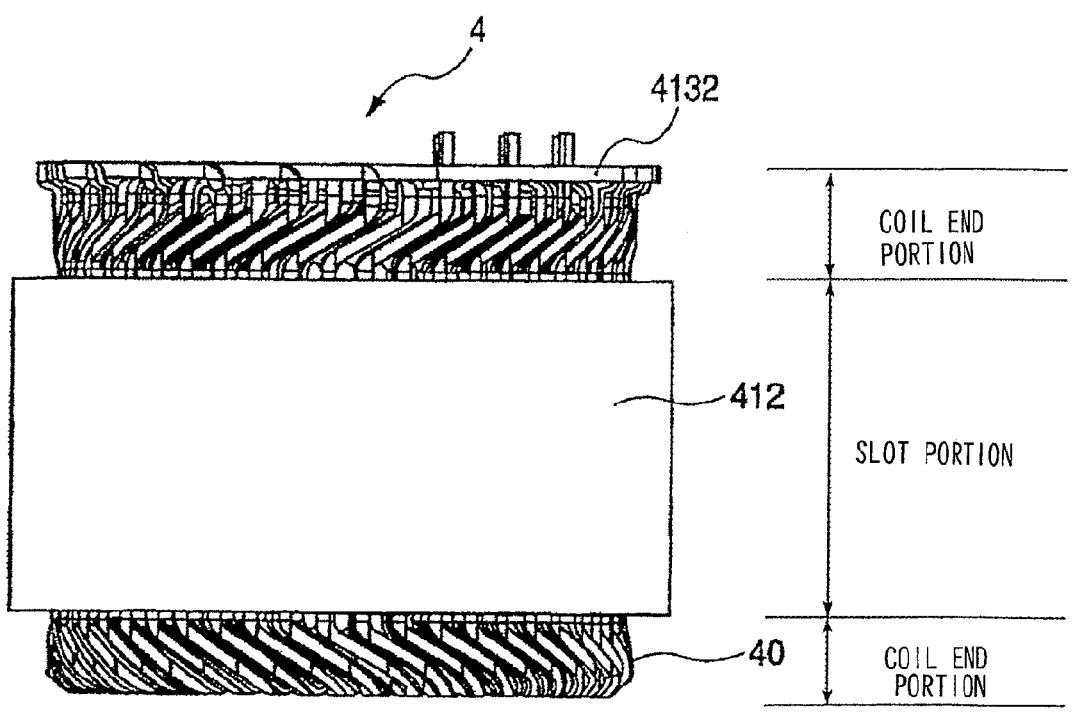
FIG. 11 is a side view of a stator.
Figure 12:
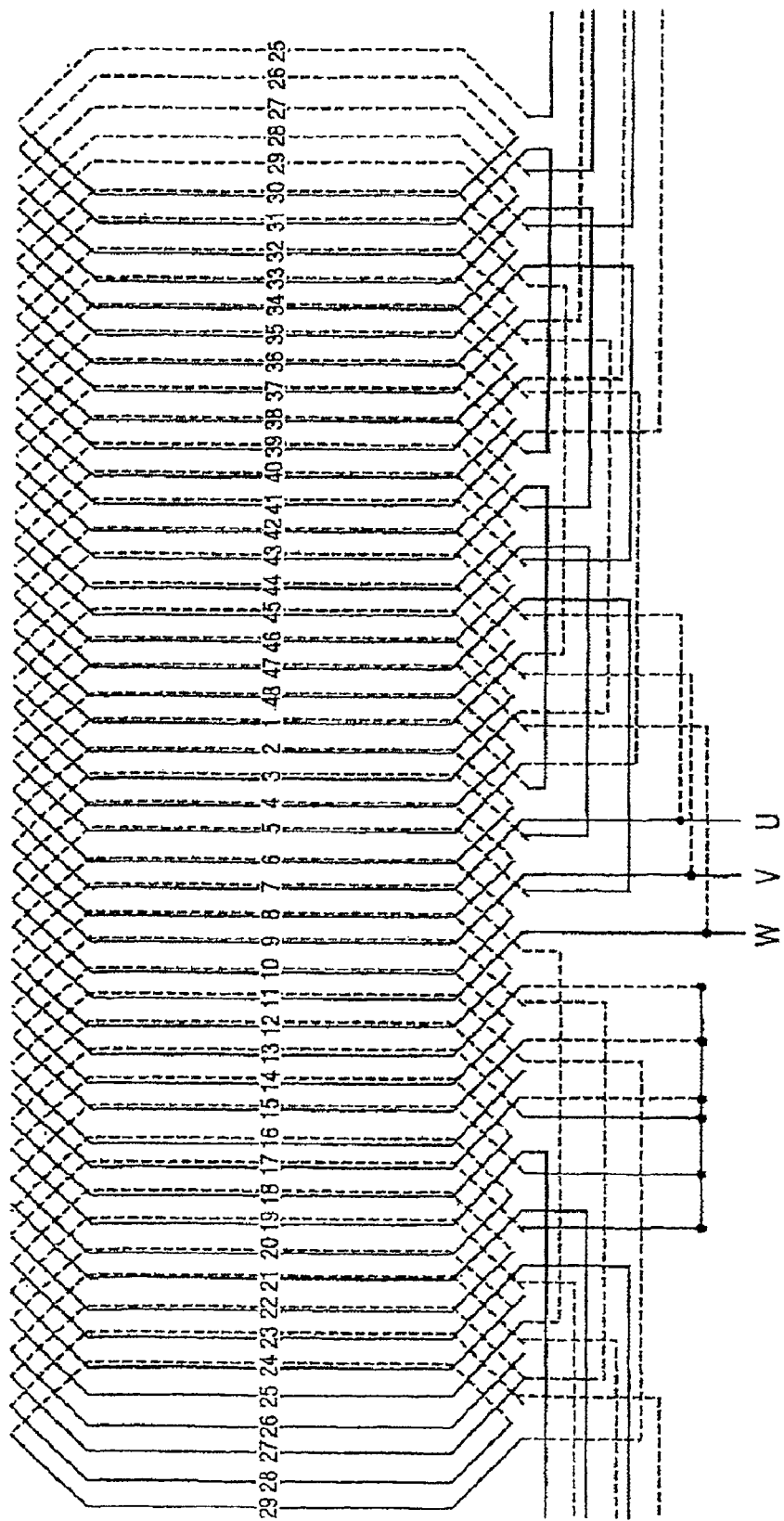
FIG. 12 is a connection wiring diagram of a stator winding.

FIG. 10 is an top view showing the stator 4. FIG. 11 is a side view showing the stator 4. FIG. 12 is a wire connection diagram illustrating the stator winding 40 of a 2Y-connection shown in FIG. 4. As shown in FIG. 10, the portion of the bridge wire 4132 in each formed coil body is arranged such that it strides over the outer circumference side and the inner circumference side of the stator core 412, so that the ridge wire 4132 in whole is configured to be substantially in a volute form. In the portions that serve as neutral points of star connections, the bridge wire 4132 does not form a continuous coil so that it is necessary to connect the terminals of each coil to the bridge wire by, for example, TIG welding. Note that the bridge wires that serve as neutral points are arranged such that they stride over the outer circumference side and the inner circumference side of the stator core 412. With this structure, the stator coils 413 can be arranged in regular patterns so that the space can be used efficiently. As a result, the rotating electrical machine can be downsized.

Figure 13:
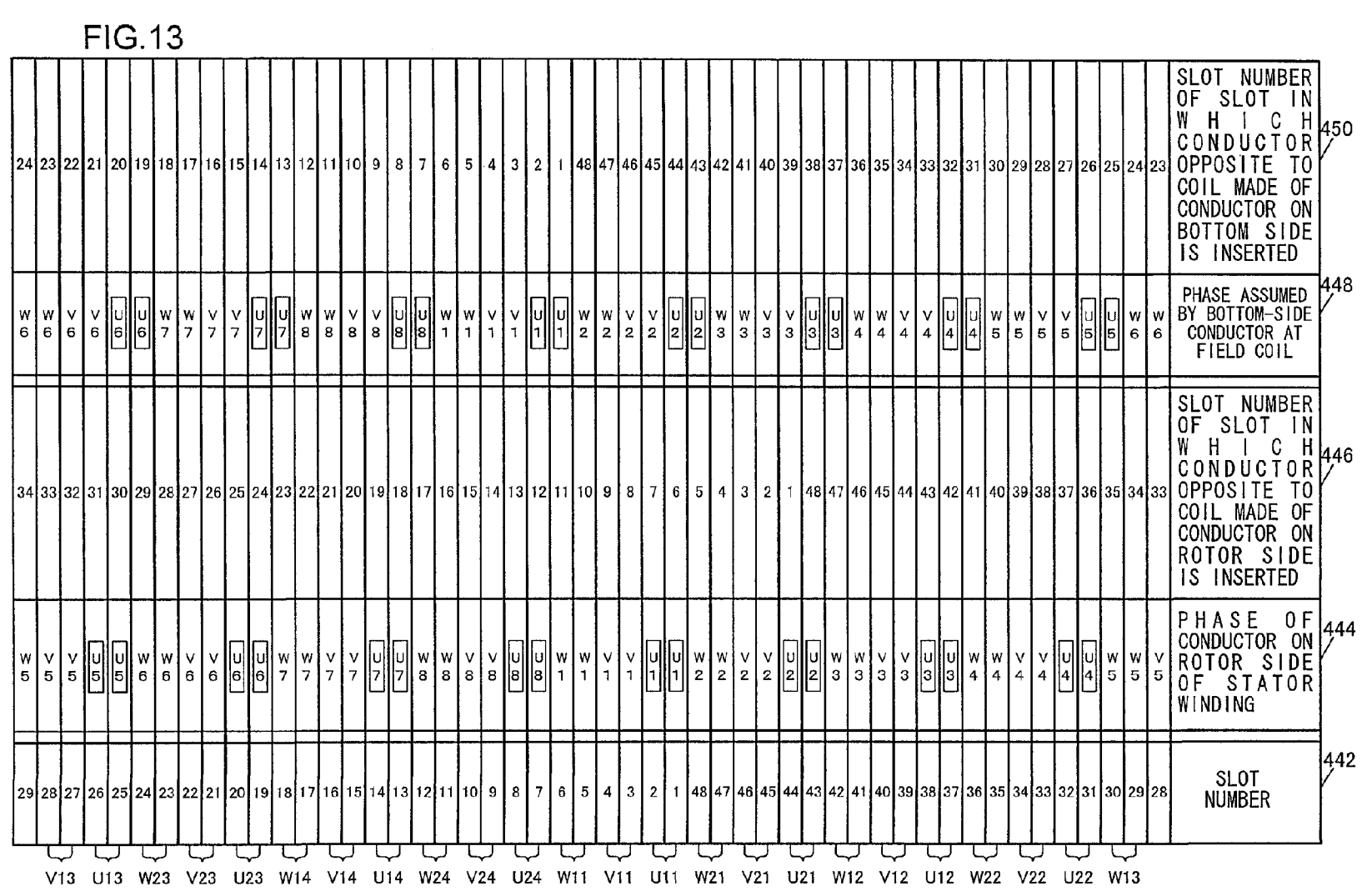

FIG. 13 shows the relationship between the slot number of a stator and the coil that constitute the stator coil, illustrating the layout of the slots and the wound around portions of the stator coils 413 that constitutes the stator winding 40. In FIG. 13, the numbers in the row 442 indicate slot numbers that are assigned to 48 slots in order taking a predetermined slot as a reference. Each of the coils U11 to W24 that constitute the stator coils 413 in FIG. 4 are constituted by the wound around portions of the coils to which the slot numbers of the slots arranged on the rotor side are assigned. These relationships are described in the lower part of the row 442 in relation to the slots. For example, a coil W13 corresponds to slot numbers 29 and 30 in the row 442. This means that the coil W13 is constituted by a series connection of the wound around portion of the element coil arranged on the rotor side of the slot with a slot number of 29 and the wound around portion of the element coil arranged on the rotor side of the slot with a slot number of 30. That is, in FIG. 4, the two element coils that constitute the coil W13 are indicated by the coil numbers 29 and 30. The slot numbers in the row 442 in FIG. 13 corresponding to a coil U22 are 31 and 32. This means that the coil U22 is constituted by a series connection of the wound around portion of the element coil arranged on the rotor side of the slot with a slot number of 31 and the wound around portion of the element coil arranged on the rotor side of the slot with a slot number of 32. This relationship is also seen between the coil U22 shown in FIG. 4 and the coil numbers 31 and 32. Referring to the coil U11 explained in FIG. 8, the slot numbers are 1 and 2. This means that the coil U11 is constituted by a series connection of the wound around portion of the element coil arranged on the rotor side of the slot with a slot number of 1 and the wound around portion of the element coil arranged on the rotor side of the slot with a slot number of 2. This is also seen from FIG. 4, in which the two element coils that constitute the coil U11 have the coil numbers 1 and 2.

Row 444 in FIG. 13 shows the phases of the coils inserted on the rotor side in slots with numbers shown in the row 442. The slot numbers in row 442 for the coil U11 are 1 and 2. This indicates that the coil U11 is constituted by the wound around portions of the coils arranged in slots with slot numbers of 1 and 2, respectively, connected in series as mentioned above. Both the components of the coil U11 are designated "U1" in the row 444. This means that the coil U11 is arranged at the first position of U-phase, that is, at the reference position of U-phase in the stator coil 413. Both the components of the coil U21 are designated "U2" in the row 444. This means that the coil U21 is arranged at the second position of U-phase, that is, at a position of 45° by mechanical angle from the reference position of U-phase in the stator coil. Similarly, both the components of the coil U12 are designated "U3" in the row 444. This means that the coil U12 is arranged at the third position of U-phase, that is, at a position of 90° by mechanical angle from the reference position of U-phase in the stator coil. This is as explained above referring to FIG. 8.

When the coil U11 is taken as a reference, the coil V11 is shifted by a mechanical angle of 15°. Therefore, if the coil V11, which is at a position shift by a mechanical angle of 15° from the reference position of the coil U11, is taken as a reference, the coil V21 designated "V2" in the row 444 is at a position shift by a mechanical angle of 45° from the position of the coil V11. Hereinafter, all the coils of V-phase are based on the coil V11 as a reference; they are shifted by 15° with respect to the coils of U-phase. Similarly, the coil W11 is shifted by a mechanical angle of 30° from the position of the coil U11, so that all the coils of W-phase are shifted by 30° with respect to the coils of U-phase.

Next, explanation is made on the row 446. In the present embodiment, the wound around coil 4131 is configured to be wound around through two slots. That is, the element coil 4131*a* of the coil U11 shown in FIG. 8 is wound around through the slots 2 and 7. The element coil 4131*a* is arranged on the rotor side in the slot with a slot number of 2 and on the back side of the slot in the slot with a slot number of 7. In FIG. 13, seeing the column corresponding to the row 442 in which a slot number of 2 is described, a number of 7 is described in the row 446 of that column. This means that the element coil 4131*a* of the coil U11 is wound around between the slot with a slot number of 2 and the slot with a slot number of 7. Similarly, for other rows in FIG. 13, the rows 442 and 446 show one and the other of the wound around coils.

The row 448 shows the phases of the coil positioned on the back side (bottom side) of the slot with the number shown in the row 442 and the order in the arrangement of the coil in that phase. The row 450 shows the other slot in which the coil described in the row 448 is wound around. For example, "V2" is described in the column 448 corresponding to a slot number of 2 in the row 442. This means that the coil arranged on the back side (bottom side) of the slot with a slot number of 2 in the row 442 is the second coil of V-phase. The number "45" described in the row 450 indicates that the coil arranged on the back side of the slot with a slot number of 2 is wound around through the slot with a slot number of "45" and the slot with a slot number of "2". Seeing the column corresponding to the row 442 in which a slot number of 45 is described, the number of "2" is described in the row 446 of that column. This indicates that the coil wound around through the slot with a slot number of 45 and the slot with a slot number of 2 is the coil arranged at the second position of W-phase.

The final wire connection state of the stator winding 40 thus connected is shown in FIG. 12. While the wound around portion of the coil 4131 in FIG. 12 is expressed by only a single turn, there are actually three turns. In FIG. 12, the number indicated at the center of the wound around portion of the coil 4131 is a slot number. The coil portion in broken line is a coil portion on the inner circumference side in the slot 411, that is, a coil portion positioned on the opening side of the slot. On the other hand, the coil portion indicated in solid line is a coil portion that is positioned on the outer side, that is, on the bottom side of the slot. Intersection points of wires indicated with dots are portions where connection work such as welding is required. As will be apparent from FIG. 12, there are only nine portions that require connection by welding.

In the configuration shown in FIGS. 4 and 13, a plurality of conductors is arranged side by side in the radial direction in each slot and the conductors form coils in a form such that they are wound around through two slots. Since the going-around coil is made of a continuous wire, an increase in the number of connection points can be suppressed although the number of turns is increased in the present embodiment. In the circumferential direction, only one wire is inserted in each slot and this structure is easy to manufacture as explained below. In addition, the coil has a shape such that it is wider in the circumferential direction and thinner in the radial direction, so that eddy current generated in the conductor in the slot due to leaked magnetic flux is suppressed. This increases the efficiency of the rotating electrical machine and suppresses heat generation.

Since the portion of the bridge wire 4132 is positioned substantially on the same plane on one end side of the stator 4 in the axial direction as shown in FIG. 11, the coil end can be shortened. As mentioned above, in the present embodiment, the bridge wire is arranged on the outside of the coil end in the direction of rotation and the arrangement is in an orderly fashion in whole, so that the rotating electrical machine can be downsized. In addition, reliability with respect to electrical insulation and so on can be secured. In particular, it is a recent trend that the rotating electrical machines for driving automobiles use high voltages, mostly above 100 V, and in some cases as high as 400 V or 600 V. Therefore, the reliability of insulation between the stator coils is important.

In the above-mentioned embodiment, the element coil 4131a wound around a plurality of times and the element coil 4131b wound around a plurality of times are connected via the coil-to-coil connector wire 4134. The bridge wire is arranged outside the coil-to-coil connector wire 4134 and is in an orderly fashion in whole. Similarly to the above-mentioned, this enables downsizing the rotating electrical machine in whole. Also, the reliability with respect to electrical insulation and so on can be secured.

Although the rotating electrical machine according to the present embodiment is of a relatively small size so as to be applied to motors for driving automobiles, it can give a relatively high power and has a structure that leads to improvement of productivity. Since not only a conductor having a circular cross-section but also a conductor having a substantially rectangular cross-section can be used as a conductor of the stator winding to increase the space factor of the conductor in the slot, the efficiency of the rotating electrical machine increases. If a conductor having a substantially rectangular cross-section is used in a conventional rotating electrical machine, there are many portions at which electrical connection has to be made after the conductor is inserted into the slots in the stator. This causes a problem from the viewpoint of productivity. In the present embodiment, coils formed by continuously winding a conductor insulated on the surface thereof can be inserted into slots, so that there are few electrically connected portions, so that productivity can be improved.

Also, in the present embodiment, continuously wound coils can be efficiently inserted into the slots to increase the productivity of the rotating electrical machine by inserting one side that constitutes each of a plurality of wound around portions of the coil into slots on the back side thereof, adjusting a distance between the other side of each of the wound around portions of the coil and the one side of each of the wound around portions of the coil to a predetermined distance, and then inserting the other side of each of the wound around portions of the coil in the rotor side of the slot.

In the present embodiment, the lap winding portion of the continuously wound coil is made of a continuous wire and arranged such that one of the coils that constitute the lap winding portion is inserted into one slot and the other of such coils is inserted into another slot separated at a predetermined distance from the one slot. The lap winding portion is arranged on the inner side in the radial direction in the one slot and on the outer side in the radial direction in the other slot. That is, the continuously wound coil is configured such that the wire is wound around, making a transition from the inner side to the outer side, or from the outer side to the inner side in the slot. With this arrangement, the continuously wound coil can be regularly arranged. As a result, the number of turns of the coil can be increased whereas an increase in the number of electrical connection points, which normally increase corresponding to the number of turns of the coil, can be suppressed. Further, an increase in the size of the rotating electrical machine due to the turn number increase can be suppressed.

In the present embodiment, the stator is configured such that a plurality of conductors that constitute the coil is arranged in a row in the radial direction with respect to the rotation axis in each slot. With this structure, the step of inserting the continuously wound coil into the slot can be made relatively simple to increase the productivity of the rotating electrical machine. Since the coils are arranged such that current of the same phase flows in the same orientation in slots juxtaposed in the circumferential direction, a rotating electrical machine having a structure capable of improving the productivity thereof can be provided. Winding wires of the same phase arranged in adjacent slots are connected in series. Stator coils each include the series connected winding wires as unit winding wires. By electrically connecting the stator coils a stator winding is fabricated. This configuration is advantageous in that the electrical properties can be well balanced.

The stator winding explained in the present embodiment can be used in permanent magnet type rotating electrical machines and in induction type rotating electrical machines. As an example in which the stator winding is used in an induction type rotating electrical machine, the induction type rotating electrical machine in the following embodiment includes 8 poles. By increasing the number of poles in the induction type rotating electrical machine to 6 or more, in particular 8 or 10, the thickness in the radial direction of the magnetic path in the core back of the stator core can be decreased. Also, for the rotor, similarly by increasing the number of poles to 6 or more, in particular 8 or 10, the thickness in the radial direction of the magnetic path in the rotor yoke can be decreased. In the case of an induction motor, an increase in the number of poles results in a decrease in efficiency due to the relationship with the squirrel-cage type conductor of the rotor. Therefore, 6 poles to 10 poles are preferred for use in the driving system of automobiles, with 8 poles to 10 poles being better and 8 poles being very well. The rotating electrical machine used in the driving system of automobiles means a rotating electrical machine that generates torque for starting the engine after stop or for running the vehicle together with the engine, or for running the vehicle by the torque of its own.

Figure 14:
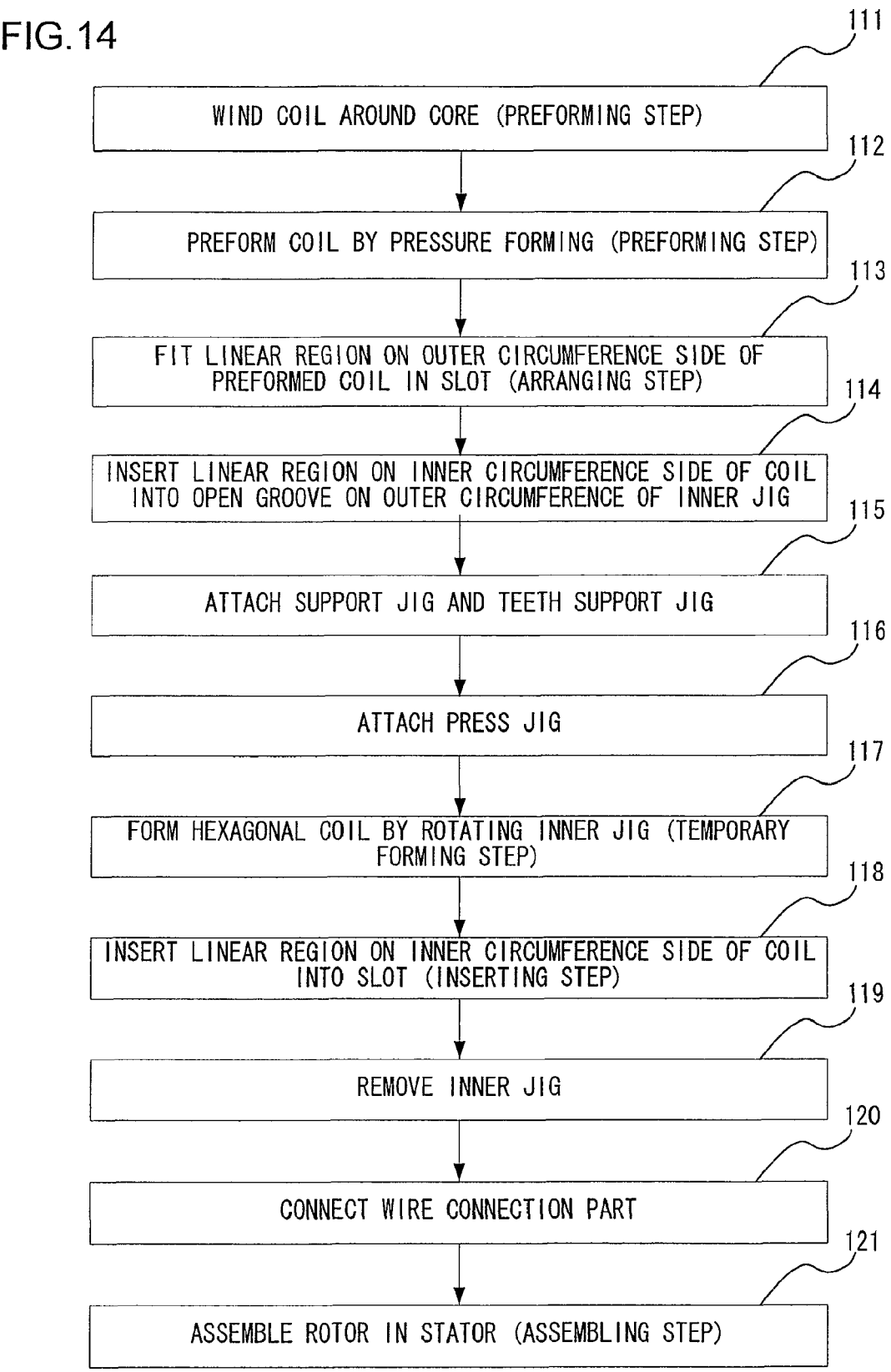
FIG. 14 is a flowchart showing a manufacturing process.
Figure 15A:
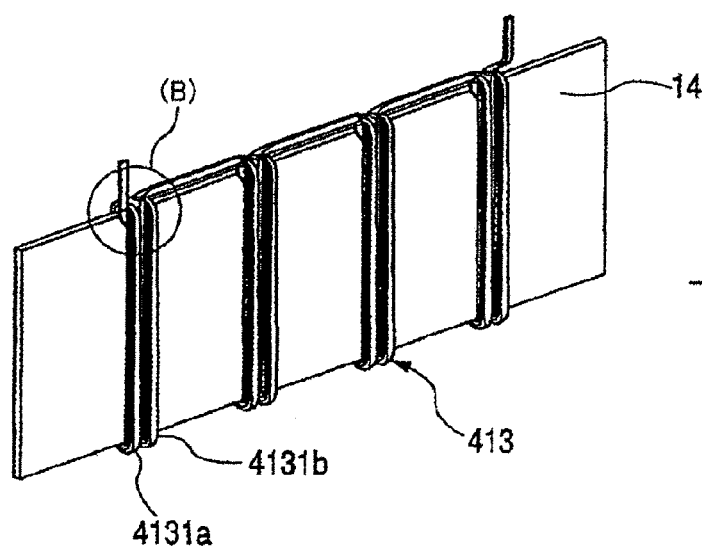
FIG. 15A is a diagram illustrating a method of forming an ellipse-like coil.
Figure 15B:
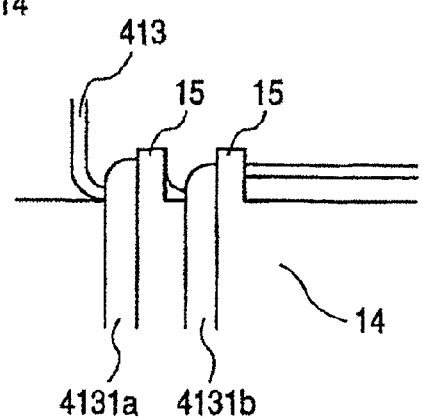
FIG. 15B is an enlarged view of the part indicated by a symbol (B) in FIG. 15A.
Figure 16:
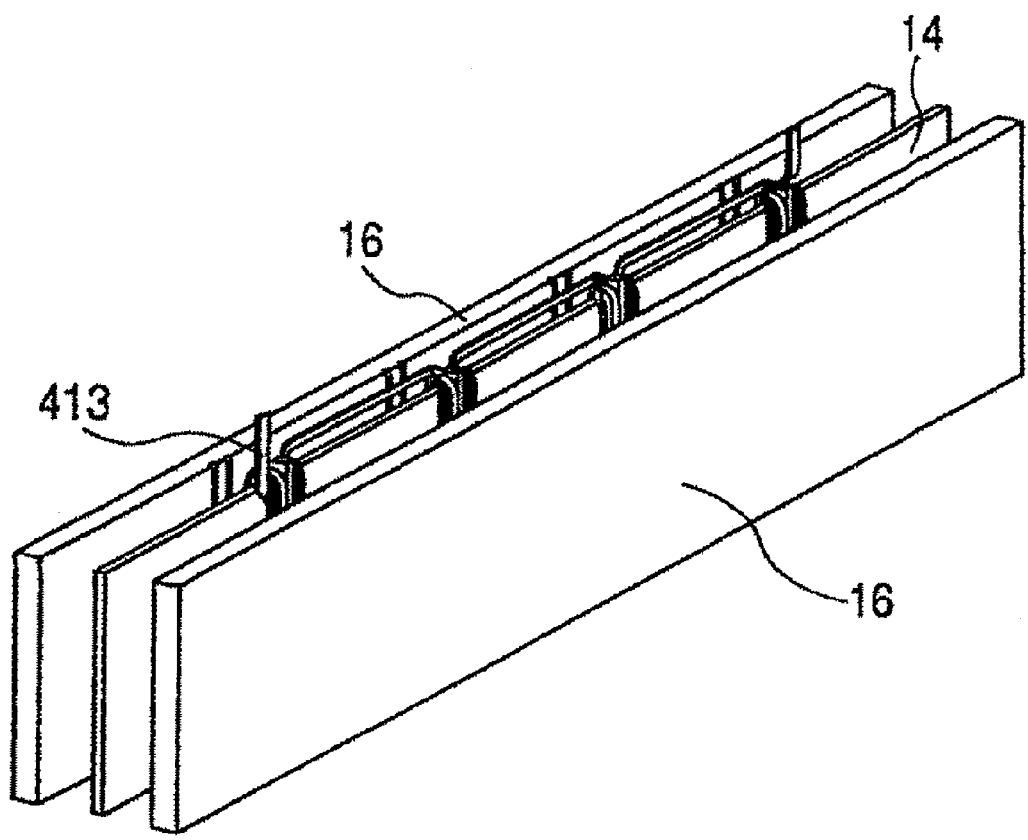
FIG. 16 is a perspective view in a state where the ellipse-like coil is compression formed
Figure 17:
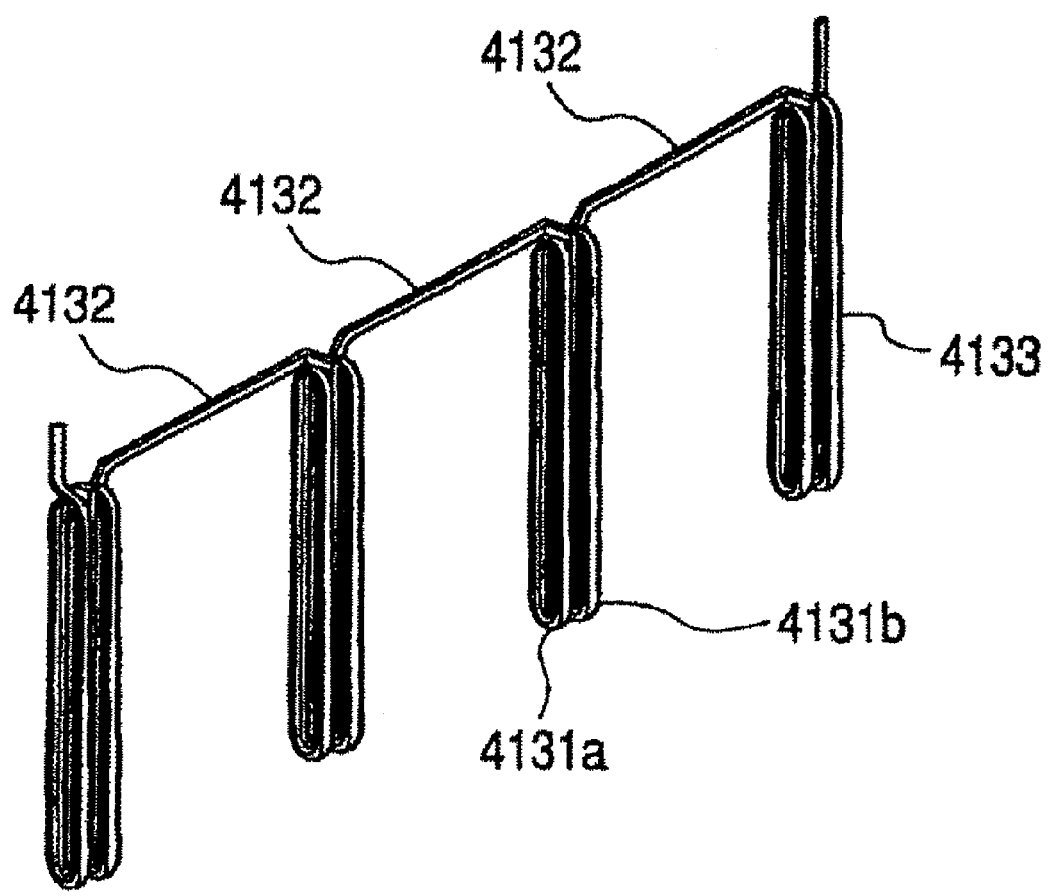
FIG. 17 is a perspective view of a preformed coil.
Figure 18A:
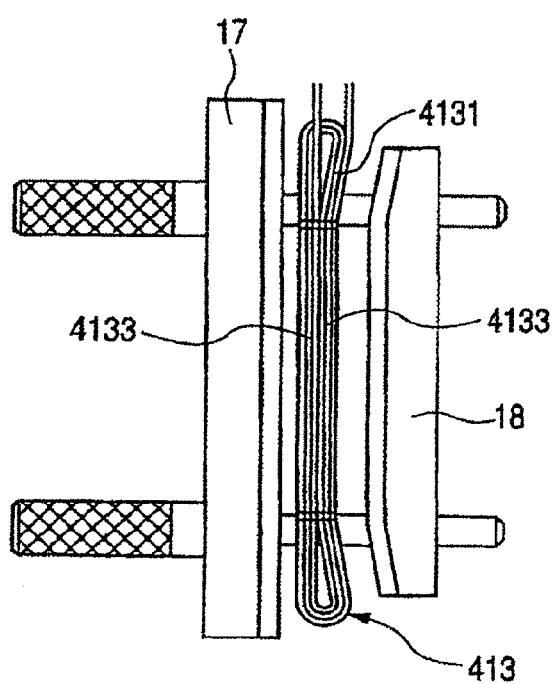
FIG. 18A is a diagram showing an example of the forming using a punch and a die.
Figure 18B:
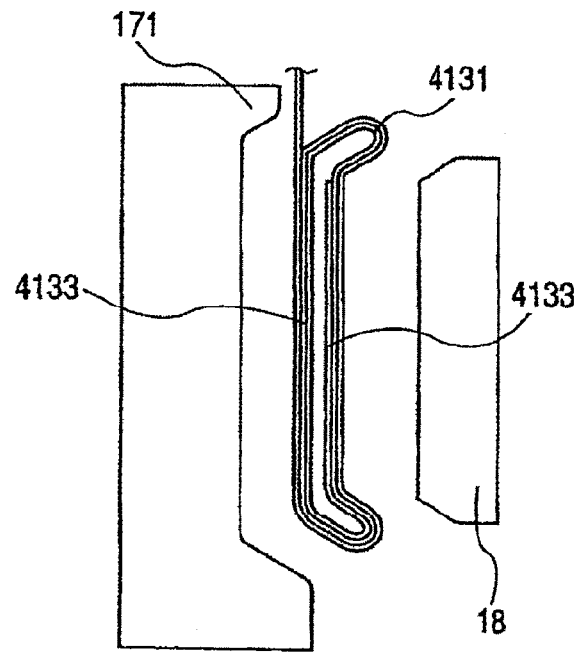
FIG. 18B is a diagram showing an alternative example of the forming using a punch and a die.
Figure 19:
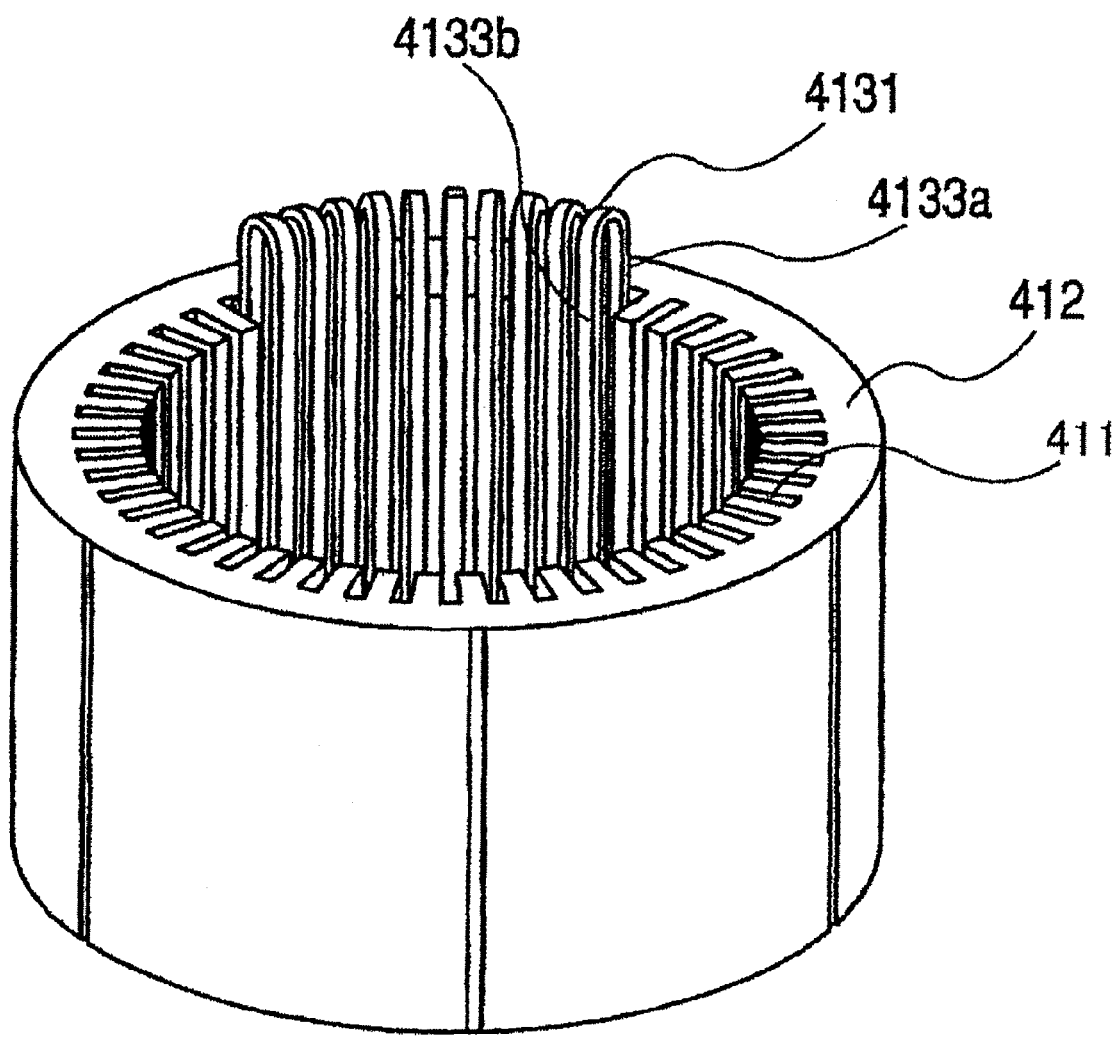
FIG. 19 is a perspective view showing a state in which the preformed coil is fitted in a slot of the stator core.
Figure 20:
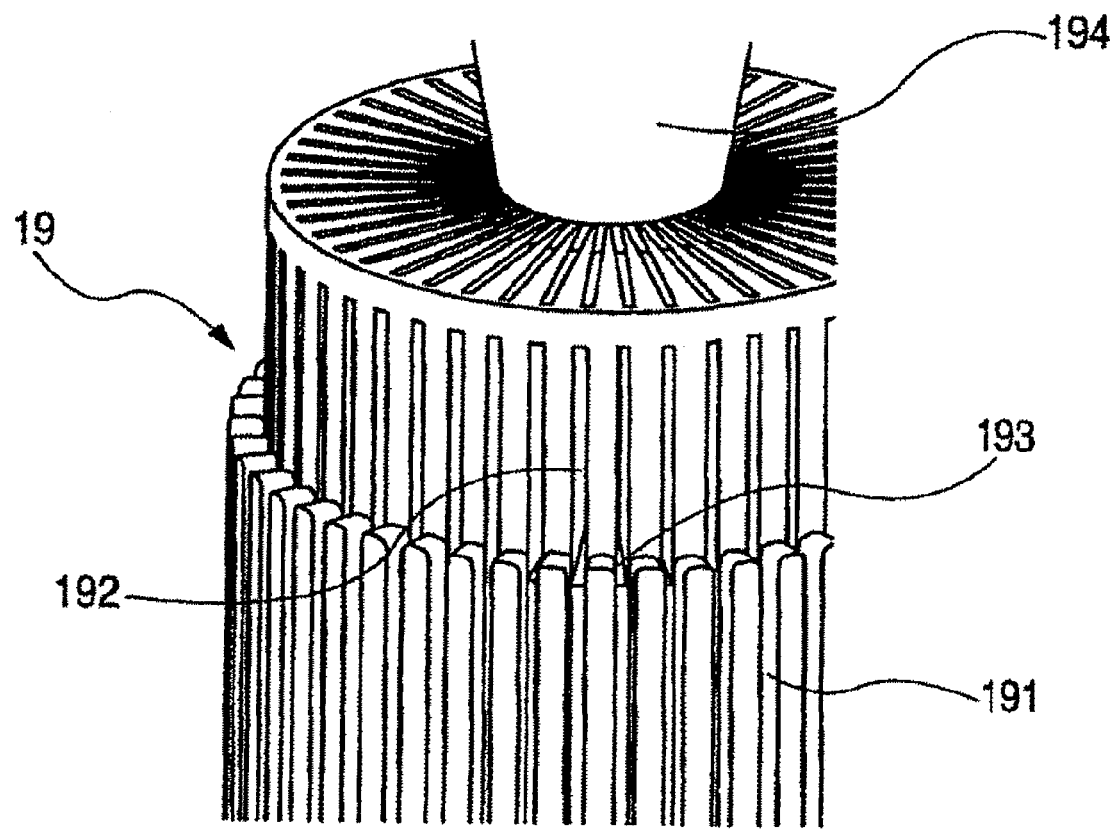
FIG. 20 is a perspective view illustrating a state in which the pushing part of an inner jig is retracted.
Figure 21:
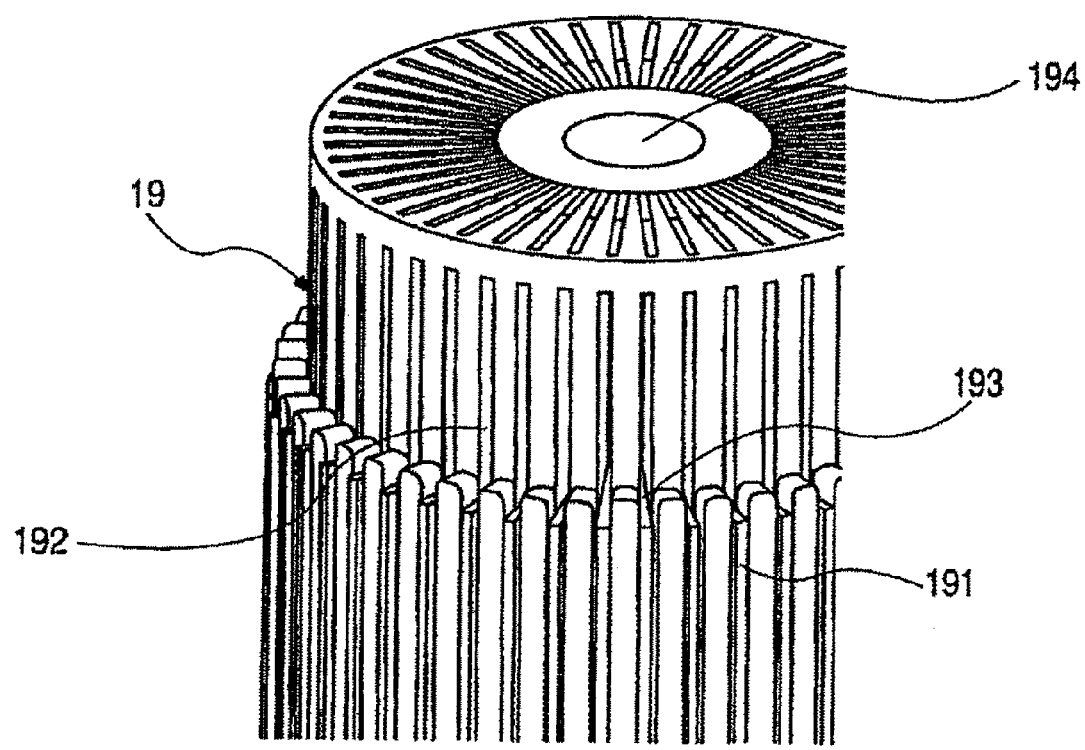
FIG. 21 is a perspective view illustrating a state in which the pushing part of the inner jig used in the first embodiment is protruded.
Figure 22:
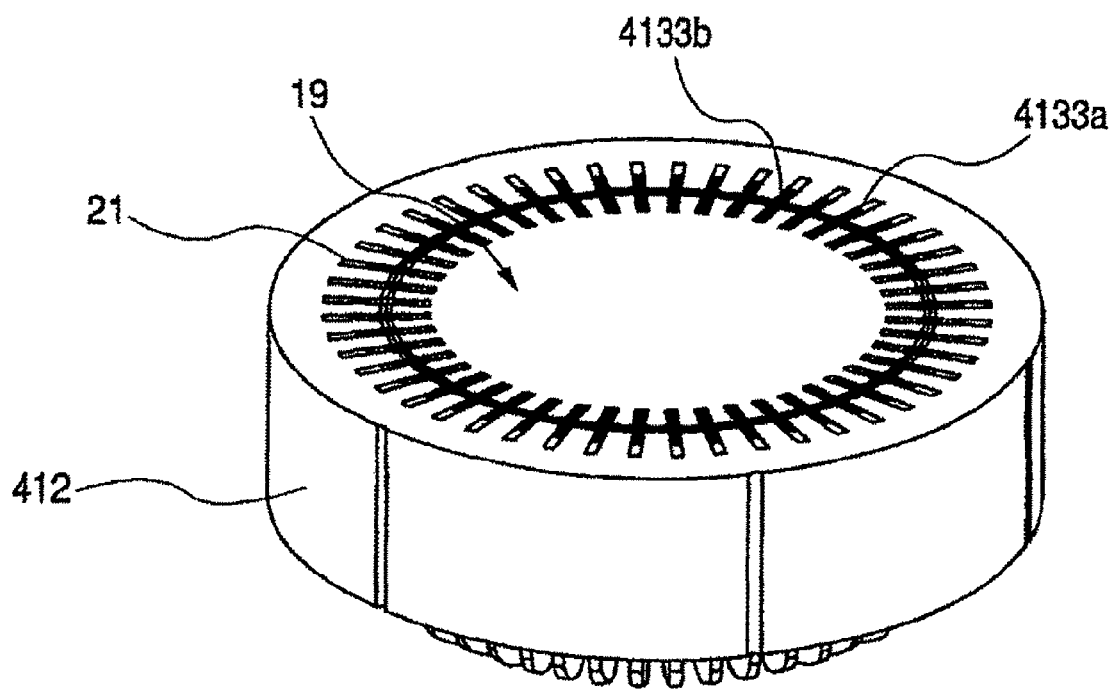
FIG. 22 is a sectional perspective view of a state in which the top part (in the figure) of the stator core fitted with a teeth support jig has been cut off.
Figure 23A:
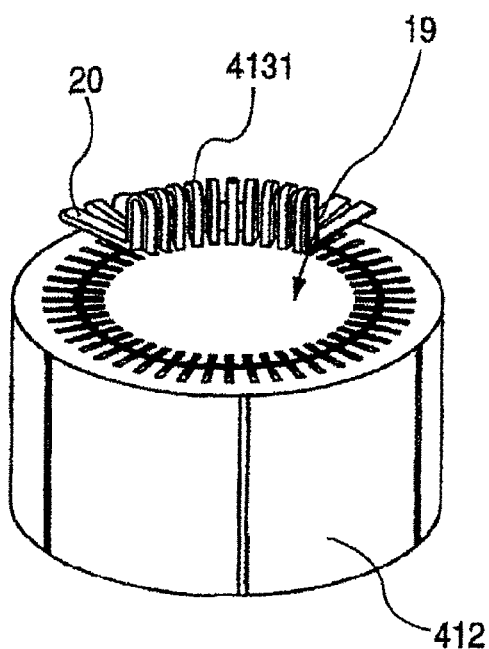
FIG. 23A is a diagram a state in which the preformed coil is fitted in a slot of the stator core, and an inner jig and a support jig are fitted.
Figure 23B:
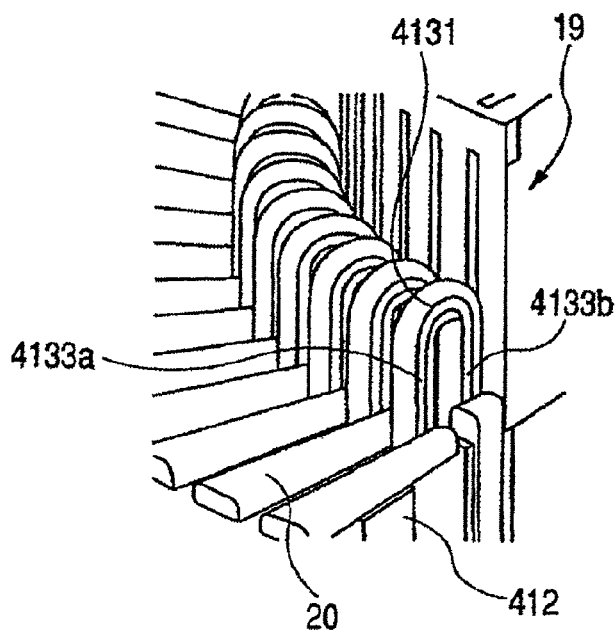
FIG. 23B is diagram showing main parts in detail.
Figure 24:
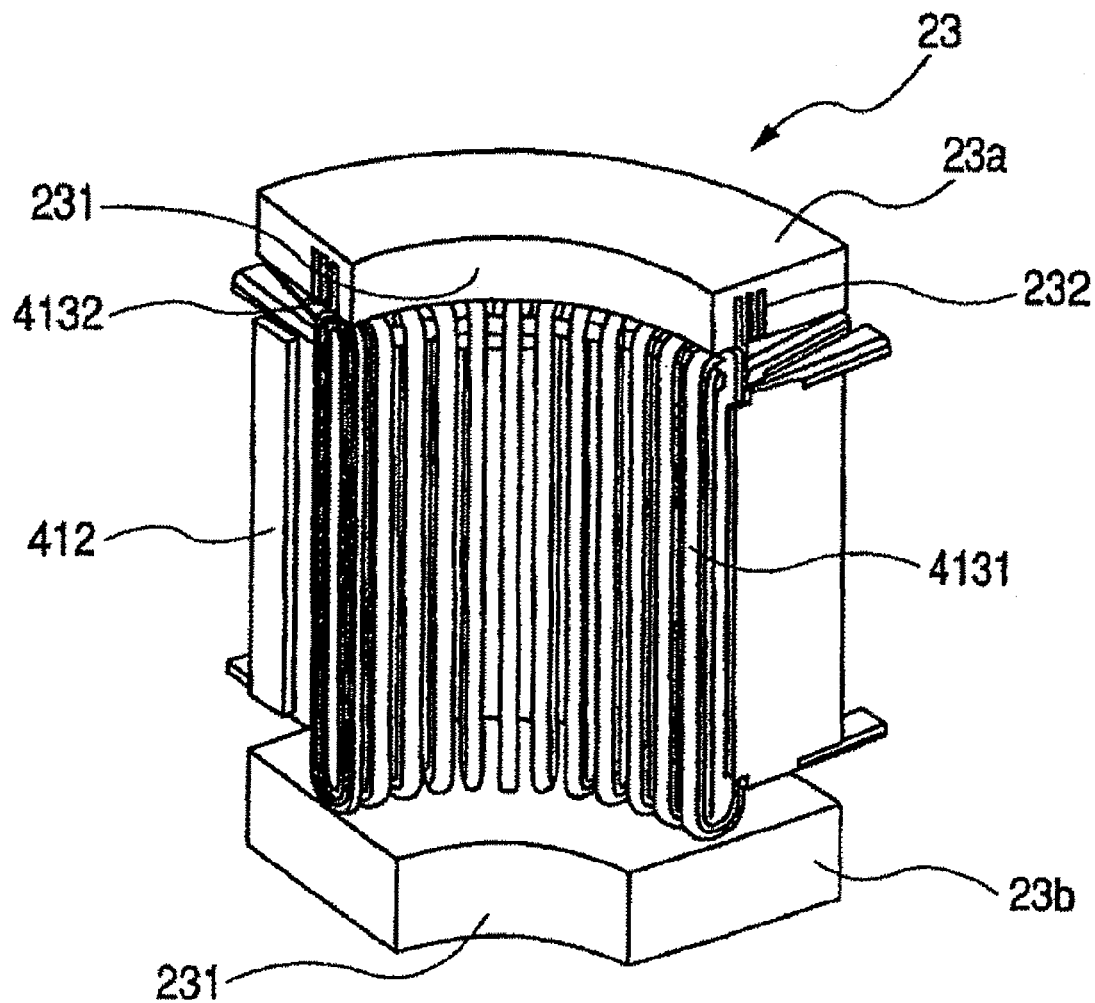
FIG. 24 is a partial sectional perspective view showing a state in which a pressing jig is fitted.
Figure 25:
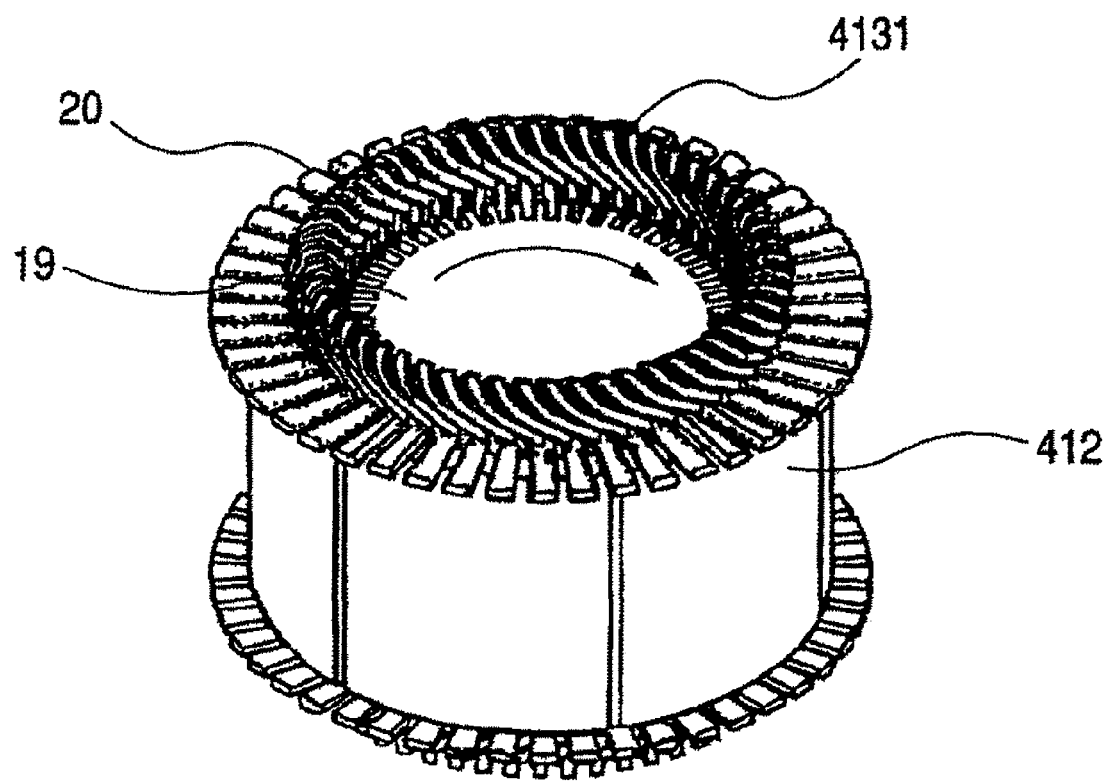
FIG. 25 is a perspective view of the stator having subjected to temporary forming.
Figure 26:
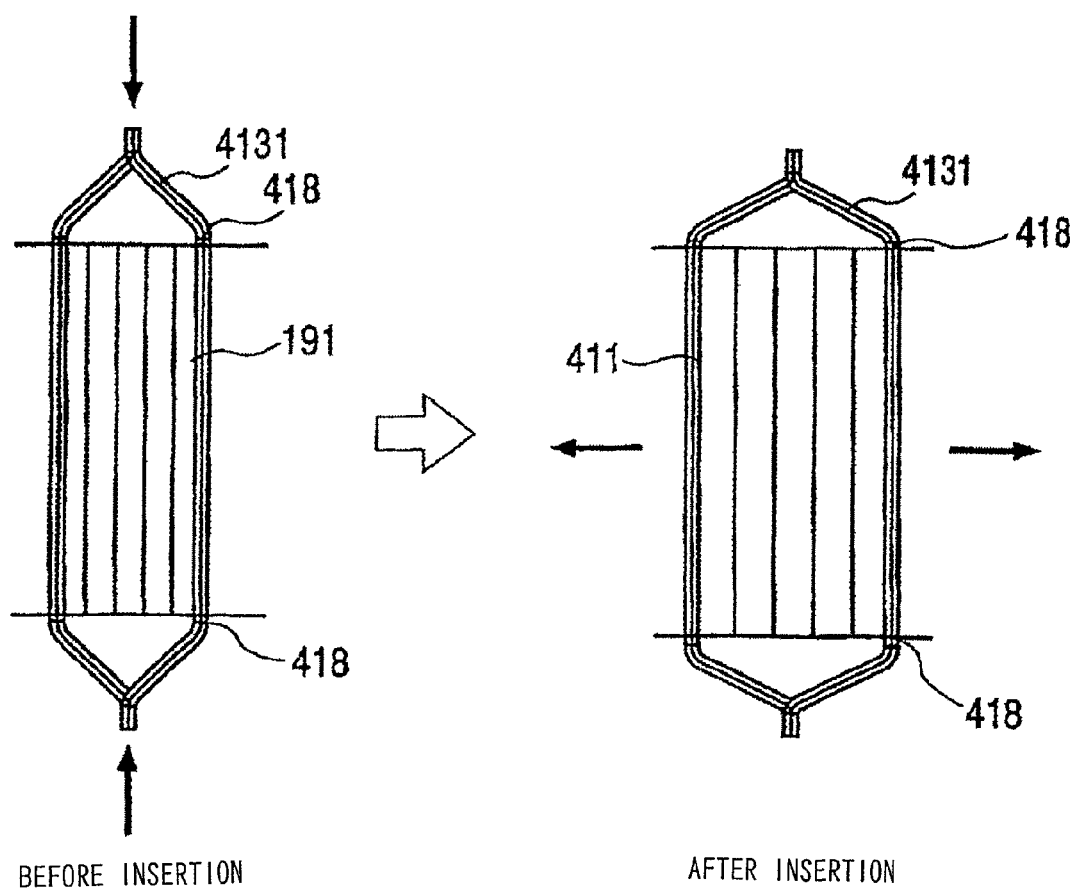
FIG. 26 is a diagram showing deformation of a wound around portion of a coil in an insertion step.
Figure 27:
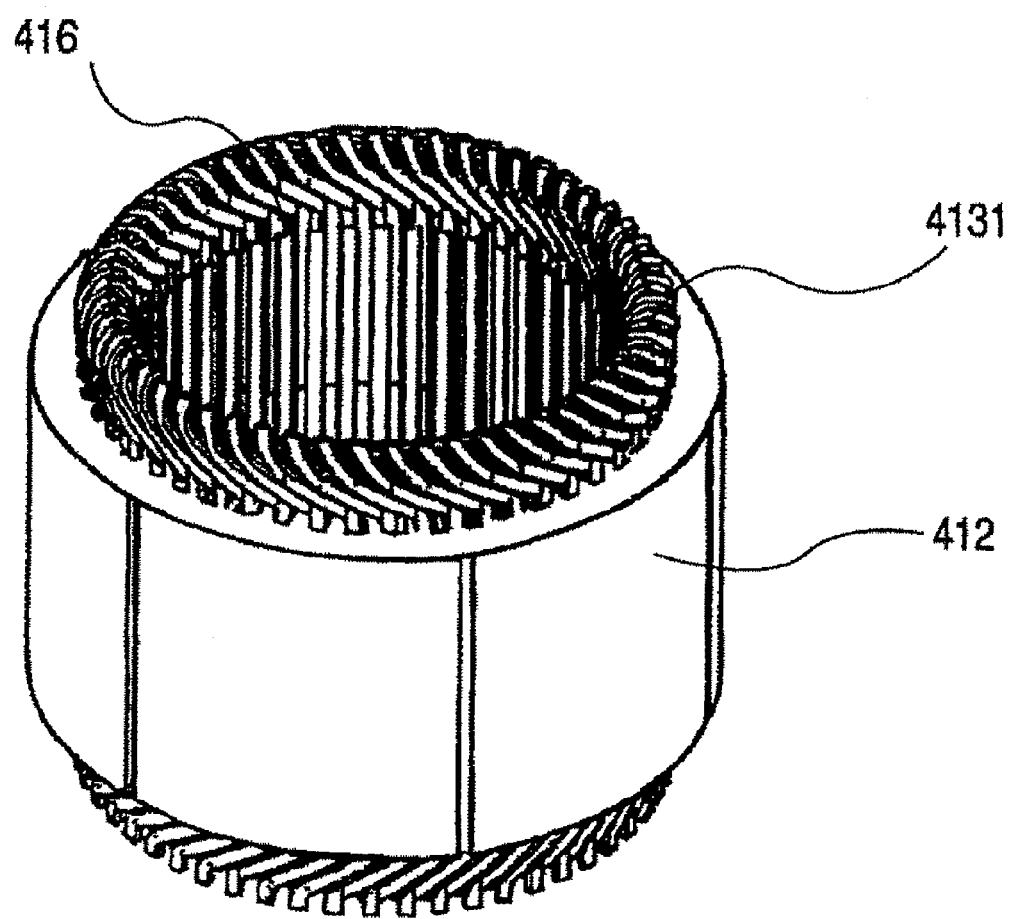
FIG. 27 is a perspective view showing a state in which the coil is inserted in a slot of the stator.

Now, a method of producing a rotating electrical machine is explained referring to FIGS. 14 to 27. One feature of the present embodiment is in a method of inserting a coil into a slot of the stator. This method is explained below. FIG. 14 is a flowchart illustrating the production process according to the present embodiment. FIG. 15A is a perspective view showing a cored bar 14 in a state where a wire is wound around it. FIG. 15B is an enlarged view of a portion (B) in FIG. 15A. FIG. 16 is a perspective view showing the coil wound around the cored bar 14 in a state where it is further press-formed. FIG. 17 is a perspective view showing a preformed coil. FIGS. 18A and 18B are side views of the preformed coil, further deformed. FIG. 19 is a perspective view showing the preformed coil in a state where it is fitted in a slot in the stator core. FIG. 20 is a perspective view illustrating a state in which an extruding part of an inner jig is retracted. FIG. 21 is a perspective view illustrating a state where the extruding part of the inner jig is protruding. FIG. 22 is a cross-section perspective view illustrating the stator core on which a teeth support jig is mounted, with the top part being shown to be cut off. FIG. 23A is a perspective view illustrating a state in which the preformed coil is fitted in a slot in the stator core and the inner jig and the support jig are mounted. FIG. 23B is a partial cross-sectional enlarged view of FIG. 23A. FIG. 24 is a partial cross-sectional perspective view illustrating a state where a pressing jig is mounted. FIG. 25 is a perspective view of the stator having subjected to temporary forming. FIG. 26 is a diagram showing deformation of the wound around portion of the coil in the insertion step. FIG. 27 is a perspective view illustrating a state where the coil is inserted into a slot in the stator core.

In the production method according to the present embodiment, first a wire having insulated on the surface thereof, for example, an enameled wire is wound around the cored bar 14 a plurality of times to form the element coil 4131a and the element coil 4131b. The cored bar 14 is in the form of a thin flat plate having round corners. There are provided four pairs of pack pins 15 at equal intervals, each pair consisting of two adjacent pack pins 15 as shown in FIG. 15B.

Here, an insulation coated wire is wound around a plurality of times (3 times in the present embodiment) such that it is engaged with one side of the pack pin 15 on one end of the cored bar 14 in the longer side direction to make the element coils 4131a and 4131b volute. Thereafter, the insulation coated wire is engaged with a side of adjacent pack pin 15 and wound around a plurality of times (3 times in the present embodiment). Thus, a pair of element coils 4131a and 4131b is formed. Since both the wires in the pair of element coils 4131a and 4131b thus formed have been wound round from the inner circumference side to the outer circumference side, the two element coils 4131a and 4131b are continuous from the outer circumference side of the volute portion to the inner circumference side of the volute portion in adjacent wound around portion.

The coil terminal on the winding finish side in the pair of element coils 4131a and 4131b is on the outer circumference side of the volute portion that is wound around. The terminal portion of the stator coil 413 on the outer circumference side is extended along a thin side surface on the side of the longer side of the cored bar 14 on which the pack pin 15 is provided in a length of slot pitch×11, which length corresponds to a length in which the pair of element coils 4131a and 4131b is shifted by a mechanical angle of 90° in the circumferential direction, to engage with a next pack pin 15, and the insulation coated wire is wound around in a similar fashion. That is, four pairs of adjacent pack pins 15 are provided, with one pair being provided for each length required for the pair of element coils 4131a and 4131b to be shifted by a mechanical angle of 90° in the circumferential direction. By repeating a similar work four times to form four pairs of such wound around portions, the stator coil 413 wound around the cored bar 14 is formed as shown in FIG. 15A.

Now, as shown in step 112 in the flowchart in FIG. 14, the stator coil 413 is press-formed to complete preforming. Note that steps 111 and 112 in the flowchart in FIG. 14 are the preforming steps. In order to press-form the stator coil 413 wound around the cored bar 14, first, the cored bar 14 is held between two blocks 16 for pressing having a substantially the same shape as that of the cored bar 14 from both side of the cored bar 14 in the thickness direction to remove bulge on both sides of the stator coil 413 as shown in FIG. 16. In order to make it easier to perform subsequent forming, a self-fusing wire is used as the stator coil 413 is used, which can be advantageously integrated and fixed by energization. It is also possible to arrange an insulation paper around a region to be inserted in the slot in the wound around portion of the stator coil 413 and integrally fix the stator coil 413 with the insulation paper when the stator coil 413 is fixed by energization. By integrating the stator coil 413 and the insulation paper in this manner, subsequent forming of the stator coil 413 can be made easier and damages of the coating on the surface of the coil upon insertion into the slot 411 can be avoided.

Next, the stator core 413 wound around the cored bar 14 is removed from the cored bar 14. In order to remove the stator core 413 from the cored bar 14, the pack pins 15 may be adapted to be detachable, the cored bar 14 may be divided in the height direction so that the distance in the height direction can be decreased after the winding, or the pack pins 15 may be adapted to be able to retract into the cored bar 14. As shown in FIG. 17, the stator coil 413 removed from the pack pins 14 includes four pairs of ellipse-like element coils 4131a and 4131b, each pair including a pair of linear regions 4133 that form a pair of sides wound around in a volute form a plurality of times (3 times in the present embodiment). The pair of wound around portions is continuous through the bridge wire 4132.

Figure 54:
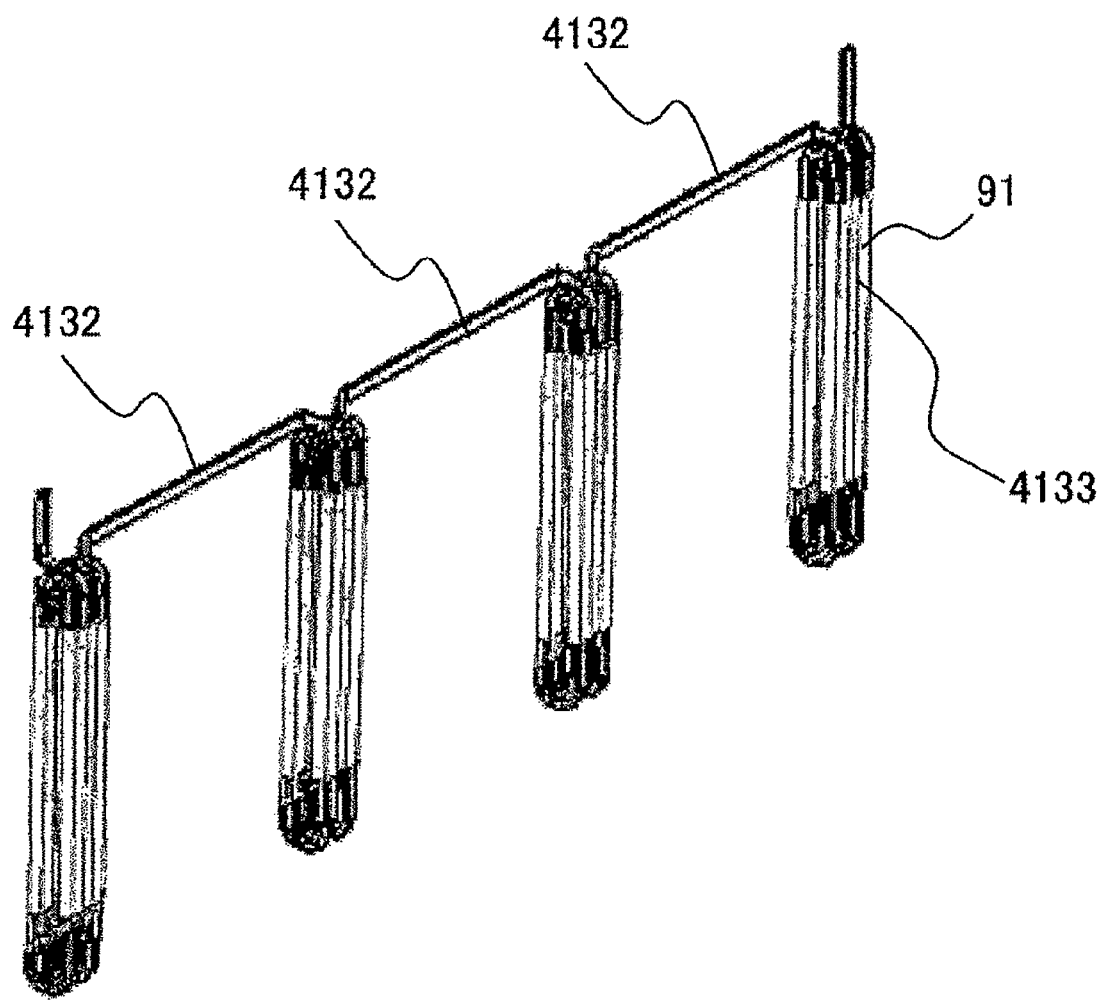
FIG. 54 is a diagram showing an eight continuous original form coils of a flat wire with insulating paper attached to the slot insertion region.

As shown in FIG. 54, an insulation paper may be fixed to an original form coil by wrapping the region to be inserted in the slot of the original form coil with the insulation paper 90 and energizing the coil again to heat it. Also there is a method that uses a wire having no self-fusing layer. It is also possible to wrap the region to be inserted in the slot of an original form coil with a film of resin such as PET instead of the insulation paper 90 and melting the overlapped portions of the film by, for example, ultrasonic bonding to fix the wire in the region to be inserted in the slot and the insulation.

Then the linear region 4133 in the wound around portions 4131 formed into ellipse-like shapes are pressed from the side as shown in FIG. 18A. A device used upon pressing includes a flat die 17 on one hand and a substantially trapezoidal punch 18 on the other hand. Therefore, the ellipse-like wound around portions 4131 in the stator coil 413 are held between the die 17 and the punch 18 so that it is formed in a substantially P-form with a side surface thereof on one end on the coil end side being yielded. In this manner, by forming the ellipse-like wound around portion 4131 in the stator coil 413 into a substantially P-form and arranging the yielded side after the forming on the outer circumference side of the stator core 412, the stator coil is prevented from protruding on the inner circumference side, so that it does not disturb the insertion of the rotor 5.

An alternative device for preventing the stator coil 413 from protruding on the inner circumference as shown in FIG. 18 may be possible. The device shown in FIG. 18B includes a die 171 formed of a groove that is longer than the punch 18 in the longitudinal direction and has a substantially trapezoidal depression similarly to the punch 18. The die 171 and the punch 18 hold therebetween the stator coil 413. As a result, the ellipse-like wound around portion 4131 in the stator coil 413 is formed into a substantially C-form in cross-section such that both the end sides bridging the linear regions 4133 in the wound around portion, that is, the coil ends are deformed toward one direction side. By arranging the deformed side of the formed wound round portion 4131 on the outer circumference side of the stator core 412, the stator coil 413 is prevented from protruding on the inner circumference side more reliably than the device shown in FIG. 18A. This makes it possible to decrease the height of the coil end.

In the preforming step 112, fitting of the insulation material illustrated in FIGS. 61A to 67B is performed. The fitting of the insulation material may be performed after the cored bar 14 is removed as shown in FIG. 17 and before the pressing as shown in FIG. 18. Also, the fitting of the insulation material may be performed after the pressing.

By the above-mentioned operations, the preforming step 112 for the stator coil 413 is completed. Then, as illustrated in step 113 in the flowchart shown in FIG. 14, an arranging step is performed in which outer circumference side linear regions 4133a of the preformed wound around portions 4131 are arranged in the circumferential direction such that each outer circumference side linear region 4133a of the preformed wound around portion 4131 is inserted into the slot 411 in the stator core 412. Since the pairs of element coils 4131a and 4131b are connected to each other through the bridge wire 4132, it is necessary to arrange the outer circumference side linear regions 4133a while deforming the bridge wire. A series of these operations constitute the arranging step. FIG. 19 shows a state where one side of the wound around portion 4131, for example, the outer circumference side linear region 4133a is inserted into the slot 411 in the stator core 412. Note that FIG. 19 shows a state where only a portion of the coils 4131 is inserted in the slots 411 with the portion of the bridge wire 4132 being omitted for making it easier to understand.

In the arranging step 113, the outer circumference side linear region 4133a is inserted such that the protruding portion deformed as shown in FIG. 18A or FIG. 18B faces the outer circumference side. The preformed continuous stator coil 413 is inserted into slot 411 as follows. That is, the outer circumference side linear region 4133a in the pair of adjacent wound element coils 4131a and 4131b is inserted into adjacent slots 411 and the outer circumference side linear region of another pair of the element coils 4131a and 4131b made continuous through the bridge wire 4132 is inserted into the slot 411 shifted by a mechanical angle of 90°. In other slots 411, the outer circumference side linear regions 4133a in the preformed continuous wound around portions 4131 are inserted from the axial direction. In this manner, the outer circumference side linear regions 4133a in the stator coils 413 for three-phases are all inserted into the slots 411.

The portion of the bridge wire 4132 that connects the pair of the element coils 4131a and 4131b is arranged as formed in a volute form such that it strides over the outer circumference side and the inner circumference side of the stator core 412 as shown in FIG. 7. In order to prepare the inserting step to be performed later, it is desirable to form the portion of the bridge wire into a convex form such as a substantially V-form or a substantially U-form in the axial direction.

Next, as shown in the step 114 in the flowchart shown in FIG. 14, an inner jig 19 is mounted on the other side in the wound around portion 4131, for example, the inner circumference side linear region 4133b from the axial direction of the stator core 412. The steps 113 and 114 in the flowchart shown in FIG. 14 are arranging steps. Details of the inner jig 19 are explained referring to FIGS. 20 and 21.

As shown in FIG. 20, the inner jig 19 is provided with the same number of outer circumference side open grooves 191 as the number of the slots 411 in the stator core 412. The outer circumference side open grooves 191 face the slots 411. The width of the outer circumference side open groove 191 in the circumferential direction is smaller or equal to the width of the inner circumference side opening of the slot 411 in the circumferential direction. The length of the outer circumference side open groove 191 in the axial direction is larger than the length of the slot 411 in the axial direction. On the bottom of each outer circumference side groove 191 is formed as lit 192, from which an extrusion member 193 is inserted movably in the direction of inner and outer circumferences, that is, radially. On the inner circumference side of each extrusion member 193, an expansion member 194 is provided movably in the axial direction. The expansion member 194 is provided with a taper portion having a continuously diminishing diameter in the direction in which it is inserted. When the expansion member 194 is in the inner circumference of each extrusion member 193, the extrusion member 193 is extruded from the slit 192 due to cam action by the taper portion the inner jig 19 is inserted from the axial direction of the stator core 412 such that the inner circumference side linear region 4133b in each wound round portion 4131 is inserted into each outer circumference side open groove 191 of the inner jig 19 thus configured. FIGS. 23A and 23B show a state where the inner jig 19 is inserted from the axial direction of the stator core 412. To make it easy to understand, FIG. 23A shows a state where only some coils 4131 are inserted into the slots 411 and the detailed shape of the inner jig 19 and the portion of the bridge wire 4132 are omitted. As clearly shown in FIG. 23B as mentioned above, the size of the inner jig 19 axial direction is longer than the size of the slot 411 in the stator core 412 in the axial direction. That is, the length of the outer circumference side open groove 191 in the axial direction is larger than the length of the slot 411 in the axial direction.

Next, as indicated in step 115 in the flowchart shown in FIG. 14, a support member 20 and a teeth support jig 21 are mounted on the stator core 412. First, a substantially rod-shaped teeth support jig 21 is inserted along the slot 411 in a gap between the bottom of each slot 411 and the outer circumference side linear region 4133a in the wound around portion 4131 from the axial direction of the stator core 412. FIG. 22 is a diagram showing the stator core 412 with the top side being shown in cross-section. As shown in FIG. 22, a pair of the teeth support jig 21 and the outer circumference side linear region 4133a of the coil 4131 is inserted in all of the slots 411. When a force in the direction of the rotation direction of the stator core 412 is applied to the outer circumference side linear region 4133a of the coil 4131, a force to tilt the teeth 414 in the circumferential direction is exerted. However, since the teeth support jig 21 is inserted in all of the slots 411, the teeth 414 cannot be tilted in the circumferential direction. Therefore, even if the force in the rotation direction of the stator core 412 is applied to the outer circumference linear region 4133a of the coil 4131 in the temporary forming step to be performed later, the tilting of the teeth 414 can be prevented.

Further, as shown in FIG. 23A, at all positions corresponding to each tooth 414 on both ends in the axial direction of the stator core 412, a rod-shaped support member 20 slightly tapered toward the inner circumference is mounted between any two adjacent outer circumference side linear regions 4133a from the outer circumference side. As shown in FIG. 23B, the support member 20 is made of approximately the same height in the axial direction as that of the inner jig 19 in the state of being mounted. Both sides in the circumferential direction on a side opposite to the contact surface with the stator core 412 are made hog-backed so as to form a gentle curve.

Next, as indicated in step 116 in the flowchart shown in FIG. 14, a pressing jig 23 is mounted on the stator core 412. The pressing jig 23 is configured as shown in FIG. 24 such that it is capable of being mounted on both ends in the axial direction of the stator core 412 as shown in FIG. 24 and is capable of pressing both ends bridging the linear regions 4133 of the wound around portion 4131 to each other, that is, the top of the coil ends from both the ends thereof from the axial direction of the stator core 412. Therefore, the pressing jig 23 is constituted by a pressing jig 23a on the side where the bridge wire 4132 is provided and a pressing jig 23b on the opposite side. The pressing jigs 23a and 23b assume each a ring shape having a hole 231 through which the inner jig 19 can be inserted on the inner circumference thereof. In the pressing jig 23a on the side in which the bridge wire 4132 is provided is formed grooves 232 conforming to the shape of the bridge wire 4132. By inserting the bridge wires in the grooves 232, a pressing force can be applied to the top of the coil end while adjusting the shape of the bridge wire 4132.

Next, as indicated in step 117 in the flowchart shown in FIG. 14, the inner jig 19 is rotated with respect to the stator core 412 to expand the both ends of the wound around portion 413. As a result, the wound around portion 4131 that has been made in an ellipse-like form is formed into a substantially hexagonal shape. This work is the temporary forming step. On the outer circumference of the stator core 412 is provided with a plurality of grooves for welding magnetic steel plates. In the grooves, fixing members are fixed and while pressing in this state the top of the coil end by the pressing jig 23 from both ends in the axial direction of the stator core 412, the inner jig 19 is rotated clockwise by a predetermined angle. As a result, the inner circumference side linear region 4133b in the wound round portion 4131 overlaps the outer circumference side linear region 4133a in the other wound around portion 4131 so that they align in a row in the radial direction. In the present embodiment, the inner circumference side linear region 4133b in the wound round portion 4131 is rotated by an angle corresponding to a shift over five slots 411 in the stator core 412. That is, the slot 411 of the stator core 412 and the outer circumference side open grooves 191 of the inner jig 19 are opposite to each other after rotation, so that the inner circumference side linear region 4133b of the coil 4131 that is inserted in the slot 411 distant by five slots overlap on the inside of the outer circumference side linear region 4133a of the hexagonally formed coil 4131. In the present embodiment, the inner jig 19 is rotated with respect to the stator core 412. However, the stator core 412 may be rotated with respect to the inner jig 19.

According to the fitting of the insulation paper as explained referring to FIGS. 61A to 67B, it can be achieved to adapt the coil to have properties such that the coil in whole has sufficient flexibility when the coil is deformed from the wound form to a form that is suitable for being inserted into the slot whereas the region to be inserted in the slot is fixed so that the coil will not loosen for inserting the deformed coil into the slot. This is advantageous for the process in step 117. Firmly fixed core slot insertion portion and secured flexibility of the coil end portion can give rise to a motor that has high reliability. The lubricity of the surface of the material of the coil improves the workability upon assembling the coils into the core.

FIG. 25 shows a state in which all the wound around portions 4131 are aligned with widening from each other, that is, a state in which they are formed into a substantially hexagonal shape. However, in order to make it easier to understand, the detailed shape of the inner jig 19, the bridge wire 4132, and the pressing jig 23 have been omitted in the drawing. The bridge wire 4132 does not change its form and the bridge wire 4132 in whole is rotated while retaining its shape even if the wound around portion 4131 is deformed into a substantially hexagonal shape since the bridge wires 4132 each connect the top portions of the coil ends. That is, the pressing jigs 23a and 23b in each of which the bridge wire 4132 is inserted are rotated following the inner jig 19.

In the present invention, the coil is formed into a hexagonal shape by pressing the wound around portion 4131 with the pressing jig 23 as mentioned above, so that the stress exerted when the wound around portion 4131 is deformed can be dispersed. As a result, the forming becomes easier and insulation coatings such as varnish applied on the surface of the stator core 413 can be prevented from being damaged. Further, it is also possible to decrease the length of the coil end in the axial direction.

Next, as shown in step 118 in the flowchart shown in FIG. 14, the inner circumference side linear region 4133b in the wound around portion 4131b is inserted into the slot 411 in the stator core 412. This work is an inserting step. After the temporary forming step has been completed and before the inserting step is performed, first the support member 20 and the teeth support jig 21 are removed. Thereafter, the expansion member 194 of the inner jig 19 is inserted along the inner circumference of each extruding member 193 to extrude the extruding member 193 from the slit 192 as shown in FIG. 21. As a result, the inner circumference side linear region 4133b is inserted into the slot 411 in the stator core 412. In this case, the width of the slot 411 in the circumferential direction is equal to or larger than the width of the outer circumference side open groove 191 and the length in the axial direction of each linear region 4133 of the wound around portions 4131 is larger than the length in the axial direction of the slot 411 in the stator core 412, so that the wound around portions 4131 can be prevented from being caught on the tip of the teeth 414 of the stator core 412. As a result, in a state where the stator coil 413 is inserted in the slot 411 in the stator core 412, an extension portion 418 that extends from the slot 411 in the stator core 412 in a continuous direction extends on both the sides of the slot 411 in the axial direction as shown in FIG. 26.

Since the slots 411 are formed in a radial pattern, it is necessary to broaden a space between a pair of the linear regions 4133 in the wound around portion 4131 as shown in FIG. 26. Therefore, similarly to the temporary forming step, the insertion of the stator core 413 can be made easier and the length in the axial direction of the coil ends can be made smaller by inserting the inner circumference side linear region 4133b while pressing the top of the coil end from both the ends in the axial direction of the stator core 412 with the pressing jig 23. It is necessary to increase the length of the bridge wire 4132 in the radial direction according as the distance between the pairs of the linear regions 4133 is increased. The length in the radial direction of the bridge wire 4132 can be increased so as to be substantially in the same plane instead of assuming by deforming the bridge wire 4132 which has been preformed to have a shape such as a substantially V-form or a substantially U-form in the axial direction in the arranging step.

Figure 28:
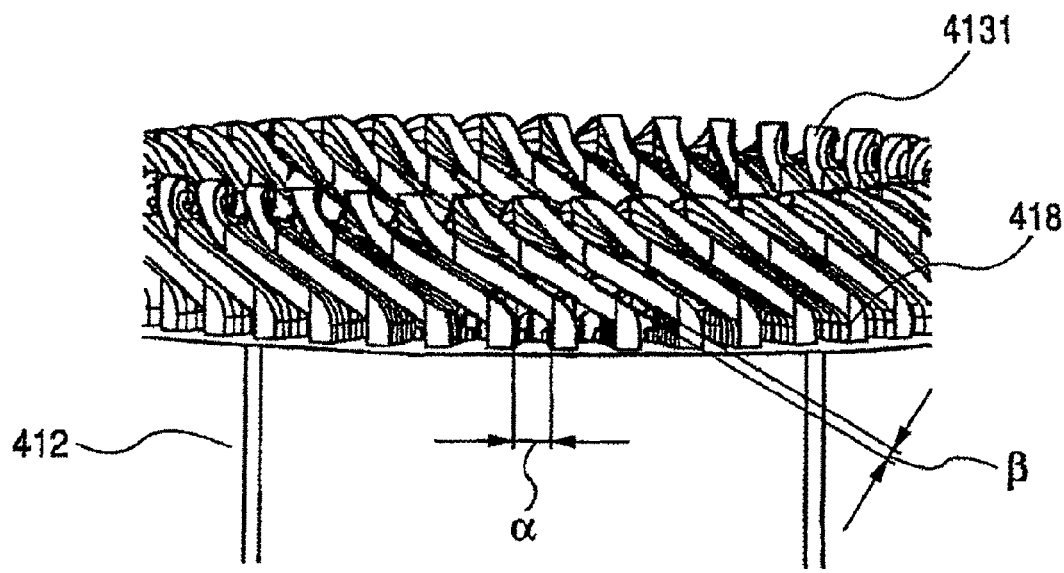
FIG. 28 is a perspective view showing the coil end of the stator in an enlarged view.

Next, as shown in step 119 in the flowchart shown in FIG. 14, the pressing jig 23 and the inner jig 19 is removed from the inner circumference of the stator core 412 and then each holding member 416 is mounted from the axial direction of the stator core 412 in each holding groove 417 provided on both sides in the circumferential direction on the top side of each tooth 414 in the stator core 412. FIGS. 27 and 28 show the stator core 412 from which the pressing jig 23 and the inner jig 19 have been removed. FIG. 29 is a front cross-section of the stator 4. Also, in FIGS. 27 and 28, the portion of the bridge wire 4132 has been omitted for easier understanding. In the present embodiment, the temporary forming step and the inserting step are performed while pressing the tops of the coil ends in the wound around portion 4131 with the pressing jig 23. Accordingly, as will be apparent from FIG. 28, a width β of the space between coils 4131 at the coil end inclined with respect to the axial direction of the stator core 412 is smaller than a width α of the space between the linear regions 4133 of the coil 4131. In this manner, the length in the axial direction of the coil end can be decreased in the present embodiment.

The holding member 416 has a length in the axial direction that is substantially equal to that of the length in the axial direction of the stator core 412. The cross-section of the holding member 416 is substantially trapezoidal with the side on the inner circumference side being short. On the other hand, each holding groove 417 is formed so as to have a shape that matches to the holding member 416. Therefore, when a force is exerted on the stator coil 413 to cause it to be pulled toward the inner circumference side, the holding member 416 and the holding groove 417 can be contacted at an area as large as possible.

Next, as shown in step 120 in the flowchart shown in FIG. 14, in order to connect terminals of each stator coil 413 as shown in FIGS. 4 and 12, four bridge wires 4132a that are provided separately and are not continuous to the stator coil 413 as shown in FIG. 10, are used to connect the terminals of each stator coil 413 by welding such as TIG welding. This work corresponds to a connecting step. The separately provided bridge wires 4132a are aligned such that they stride over the outer circumference side and the inner circumference side of the stator core 412, so that the bridge wires 4132 in whole are arranged in a substantially volute form.

By the above-mentioned operations, the stator 4 is completed. Then, as shown in step 121 in the flowchart shown in FIG. 14, the stator 4 is fixed in the housing 1 to which each component is assembled and the rotor 5 is rotatably supported on the inner circumference side of the stator 4 via bearings, e.g., ball bearings 7a and 7b. In this manner a rotating electrical machine is produced. This work is a fitting step, which is a step of assembling a rotating electrical machine.

The fourth embodiment has been explained as mentioned above. The fourth embodiment has the following advantageous effects.

An insulation coated conductor is formed into a continuous coil and the resultant coil is arranged inside the stator. The continuous coil is inserted in the slots of the stator by inserting one side of each turn that constitutes the coil into each slot 411 in the stator 4 through an opening of each slot 411 and another side of each turn that constitute the coil into each slot 411 in the stator 4 through an opening of each slot 411. Then the coil terminals are electrically connected, and the rotor 5 is rotatably fitted in the inside of the stator 4 to produce a rotating electrical machine. According to this production method, the continuously wound coil is fitted in the slots, so that connection points that require electrical connection works can be reduced, resulting in an improvement in productivity. The turn of the coil may be made once or a plurality of times. Since a plurality of turns is particularly effective, there is adopted in the embodiment a configuration in which the wound around portion with the number of turns being plural is inserted into each slot. As mentioned above, even if the wound around portion is of a single turn, the number of connection points that require connection works for the whole stator winding can be decreased.

The production method for a rotating electrical machine according to the fourth embodiment includes a preforming step in which a continuous coil is wound around a plurality of times in a volute form including a pair of linear regions facing each other; an arranging step in which a plurality of the wound around portions is arranged such that the respective linear regions in the preformed coil are positioned on an inner circumference side and on an outer circumference side, respectively; a temporary forming step in which the linear regions on the inner circumference side and the outer circumference side in the wound around portions of the coil are relatively rotated; an inserting step in which the coil is inserted into the slot such that the linear region on the outer circumference side in the temporary formed coil is positioned on a bottom side of the slot and the linear region on the inner circumference side of the preformed coil is positioned on a coil insertion portion side; a connecting step in which terminal portions of the coil are connected to respective positions according to uses; and a fitting step in which the rotor is rotatably fitted in the stator via bearings. As mentioned above, since the number of connection points does not increase regardless of the number of turns of the wound around portion, the coil can be wound around the stator core with ease by reducing the number of connection points as much as possible. As a result, the number of man-hour for connection and the insulation operation can be decreased and the reliability of strength can be achieved. In addition, since the wire is wound around such that it astride over from the inner circumference to the outer circumference at the coil end, the coil ends extending from different slots are not aligned in the axial direction in the stator core but in the circumferential direction such that they do not interfere with each other. This allows for a decrease in the axial length of the coil end, which in turn results in a decrease in the rotating electrical machine. The above arrangement also allows for improvement in cooling efficiency or heat dissipation properties of the coil. In addition, because the wire is continuously wound around, the number of coils in the slot can be increased, so that the loss ascribable to higher harmonics can be decreased. Also, since the coils can be fitted to the stator core with ease, the manufacture of the rotating electrical machine can be automated, which allows for mass-production.

Also, when the temporary forming is performed in the production method for a rotating electrical machine according to the fourth embodiment, the linear regions on the inner circumference side and the outer circumference side of the wound around portion are relatively rotated in a state in which support jigs are inserted on both ends of the linear regions before the temporary forming step is performed so that both the ends of the linear regions of the coil are positioned distant from the slots when the preforming step is performed. As a result, the curved portions of the coil can be prevented from being caught by the tip of teeth of the stator core in the inserting step, so that the linear regions of the coil can be easily inserted into the slot.

In the production method for a rotating electrical machine according to the fourth embodiment, the linear regions of different wound around portions are formed as overlapping each other in the inner circumference and outer circumference in the temporary forming step. As a result, the linear regions can be inserted into slots with ease. Further, since the coils are aligned in the radial direction, the space factor of the coil in the slot can be increased. In particular, in the present embodiment, coils having a substantially rectangular cross-section are used, so that the space factor of the coil in the slot can be further increased. Accordingly, high output and good rotation properties can be obtained.

In the production method for a rotating electrical machine according to the fourth embodiment, a plurality of pairs of the wound around portions arranged in the circumferential direction in the preforming step is formed continuous through the bridge wire. As a result, the wound around portions can be arranged efficiently for each phase, so that the number of connection points can be decreased.

In the production method for a rotating electrical machine according to the fourth embodiment, the bridge wire is formed in the preforming step so that it is provided only on one side in the axial direction of the stator. As a result, the length of the bridge wire can be reduced as compared with the construction in which the bridge wire is arranged on both the ends in the axial direction of the stator.

In the production method for a rotating electrical machine according to the fourth embodiment, the bridge wire is formed into a volute form so as to step over the outer circumference side and the inner circumference side of the stator core in the preforming step. As a result, portions at which the bridge wire overlaps in the axial direction of the stator can be reduced as much as possible, so that the length of the stator in the axial direction can be reduced.

In the production method for a rotating electrical machine according to the fourth embodiment, the bridge wire is formed so as to be substantially on the same plane in the axial direction of the stator, so that the length of the stator in the axial direction can be further decreased.

In the production method for a rotating electrical machine according to the fourth embodiment, the linear region on the outer circumference side is arranged in the slot in the stator core in the arranging step, and in the temporary forming step, the temporary forming is performed by relative rotation between the linear region on the inner circumference side in the coil and the slot. As a result, a work such as taking out the temporary formed coil from the jig and arranging it again in the stator core is no longer necessary. Accordingly, the workability can be increased and the production step can be shortened.

In the production method for a rotating electrical machine according to the fourth embodiment, a teeth support jig is inserted between the bottom of each slot and the coil before the temporary forming is performed, and the temporary forming is performed in this state. As a result, a force in the rotation direction is applied to the coil upon temporary forming so that a force is exerted to tilt the teeth in the circumferential direction. However, since the teeth support jig is inserted in all the slots, the teeth cannot be tilted in the circumferential direction. Accordingly, even if a force in the rotation direction is applied to the coil, the tilting of the teeth can be prevented.

In the production method for a rotating electrical machine according to the fourth embodiment, the inner jig includes the same number of outer circumference open grooves as the number of slots so as to oppose the coil insertion portions and extrusion portions that can move from the bottom of the outer circumference open groove to the inner and outer circumference. The inserting step is performed by protruding the extrusion portion. As a result, the inner jig may be left to be arranged in the stator core from the temporary forming step through the inserting step. As mentioned above, the present embodiment makes it possible to reduce man-hour as much as possible by minimizing the number of times of taking out and putting in of the jig. The same inner jig can be used even if the inner and outer diameters of the stator core are changed.

In the production method for a rotating electrical machine according to the fourth embodiment, a holding member having an insulating function is fixed to the coil insertion portion in the slot before the connecting step is performed after the inserting step. As a result, if a magnetic flux is generated between the coil and the rotor, the coil can be prevented from coming off from the slot.

In the production method for a rotating electrical machine according to the fourth embodiment, the temporary forming step and the inserting step are performed while pressing both the end portions connecting the linear regions of the coil. As a result, the stress exerted on the coil in the temporary forming step and the inserting step can be dispersed, so that the forming can be performed with ease and the insulation coating such as varnish applied on the surface of the coil can be prevented from being damaged. Further, the length in the axial direction of the coil end can be reduced.

In the production method for a rotating electrical machine according to the fourth embodiment, a pair of wound around portions is formed such that they are arranged adjacent to each other by using a continuous coil in the preforming step. As a result, the wound around portions that are adjacent to each other are inserted into adjacent slots, so that the number of slots can be increased as compared with the case where the adjacent wound around portions are inserted into the same slot. This enables compound waveform obtained from electromotive forces of respective phases can be made a smooth one, so that torque pulsation and noises can be reduced. An increased slot number results in a decrease in eddy current loss due to higher harmonics. Further, the wound around portions of the coil become more distant from each other in the circumferential direction, so that heat dissipation properties can be improved.

In the production method for a rotating electrical machine according to the fourth embodiment, both the end sides connecting the linear regions to each other in the wound around portion are formed into a substantially P-form in the preforming step, and in the arranging step, the linear regions are arranged such that the convex portion of the substantially P-form is on the outer circumference side of the stator. As a result, the coil will not protrude toward the inner circumference side, so that it will not block insertion of the rotor in the attaching step. Both the end sides connecting the linear regions in the wound around portion to each other are deformed in one direction, and in the arranging step, the coil is arranged so that the deformed direction is on the outer circumference side of the stator. With this configuration, protrusion of the coil toward the inner circumference side can be prevented reliably.

In the production method for a rotating electrical machine according to the fourth embodiment, the wires are integrally fixed to each other after the preforming is performed. As a result, the wires of the coil will not separate from each other and can be inserted into slots with ease in subsequent steps. When the wound around portions of the preformed coils are formed into hexagonal shapes, the laminated coils can be deformed integrally, so that the formability of coils can be improved.

In the production method for a rotating electrical machine according to the fourth embodiment, the cross-section of the wire is made substantially rectangular such that it is longer in the circumferential direction of the stator core and shorter in the radial direction. As a result, the number of coils in the slot can be increased as much as possible and in addition, the effect of reducing the loss due to higher harmonics can be increased. From the viewpoint of space, the length of the side that protrudes toward the coil end side is decreased, so that the amount of protrusion of the coil end can be decreased. Further, although it is difficult to perform forming of coils by deforming coil after coil if the coil thickness is small, the forming of coils can be performed easily in the present embodiment since the coils have been lap wound.

In the production method for a rotating electrical machine according to the fourth embodiment, the bridge wire connects the terminals that are drawn toward the outer circumference side of the wound around portions to each other, so that the bridge wire and the wound around portions do not intersect each other. Therefore, the length in the axial direction of the stator can be decreased.

In the production method for a rotating electrical machine according to the fourth embodiment, each slot is an open slot that has a coil insertion portion having a width in the circumferential direction substantially equal to or larger than the width in the circumferential direction of the portion in which the coil is fitted. As a result, the coil can be easily inserted from the slot insertion portion and the space factor of the coil in the slot is not decreased.

Fifth Embodiment

Figure 30:
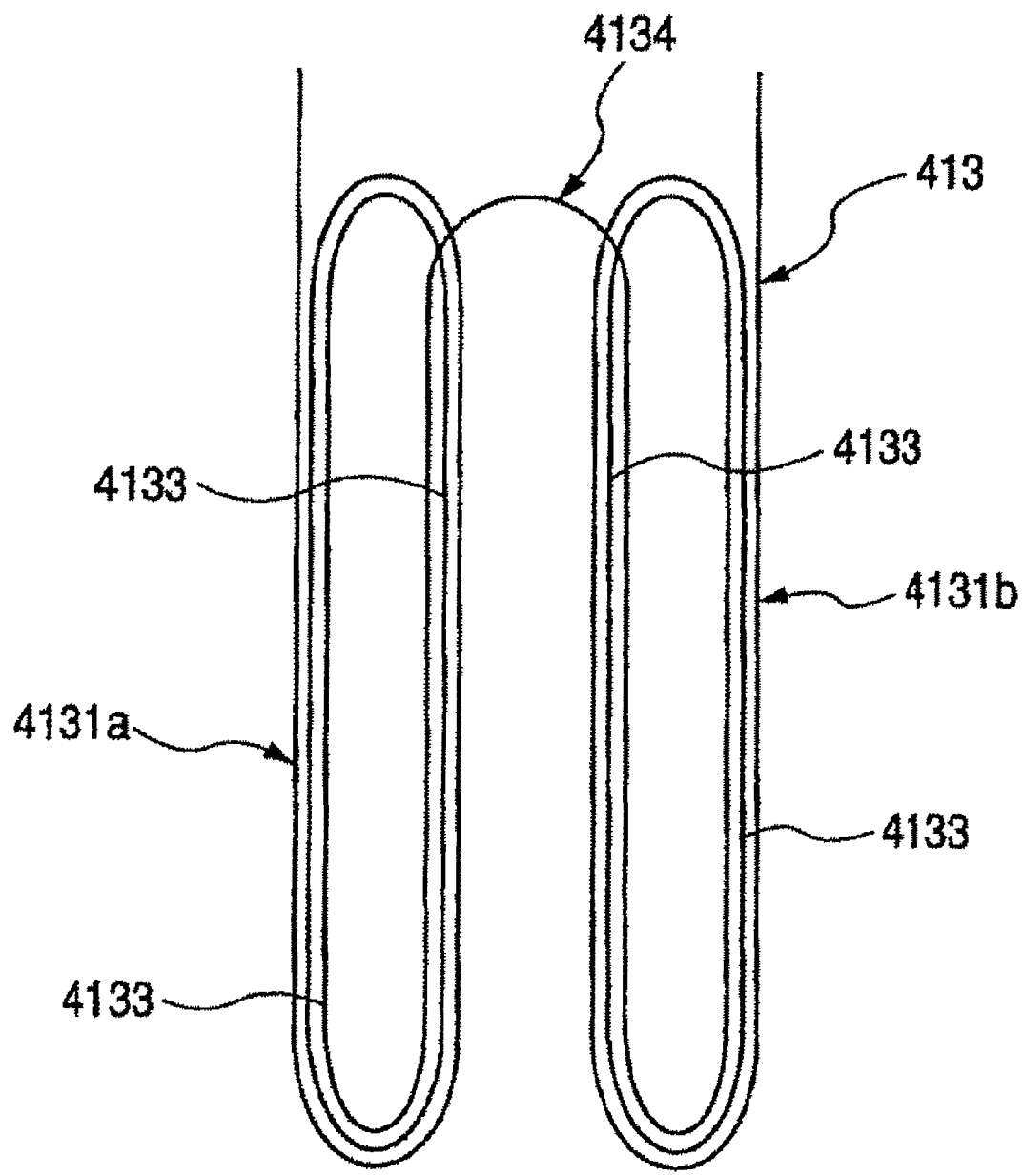
FIG. 30 is a simplified view of paired windings of the wound around portion in the coil of a fifth embodiment.
Figure 31A:
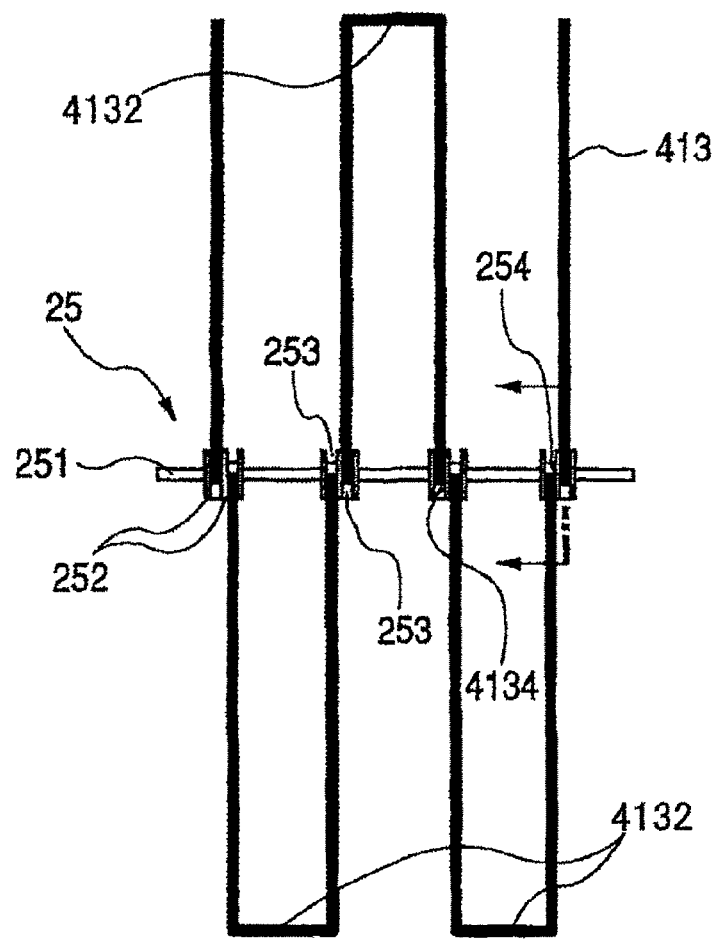
FIG. 31A is a diagram illustrating a method of preforming according to the fifth embodiment.
Figure 31B:
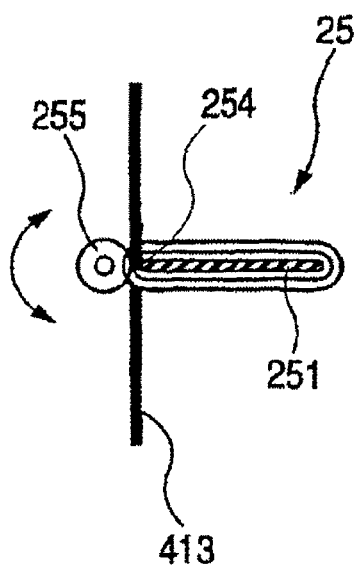
FIG. 31B is a diagram seen from A-A side of FIG. 31A.
Figure 32:
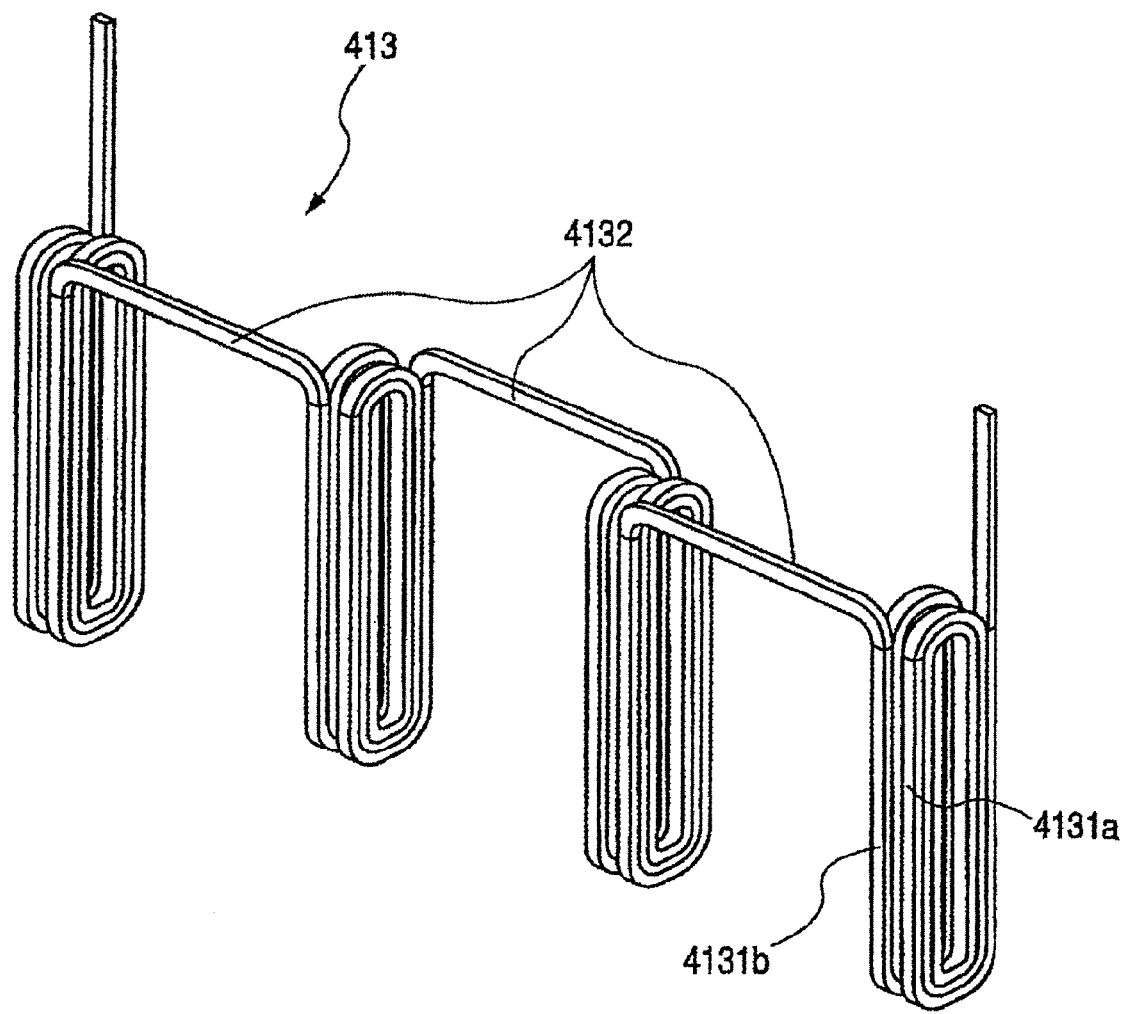
FIG. 32 is a perspective view of the coil formed by the preforming method according to the fifth embodiment.

Next, a fifth embodiment of the present invention is explained referring to FIGS. 30 to 32. FIG. 30 is a simplified view of a pair of windings of the wound around part in the coil of the fifth embodiment. FIGS. 31A and 31B are diagrams illustrating the preforming method according to the fifth embodiment. FIG. 31A is a front view illustrating the state in which preforming is performed. FIG. 31B is a diagram seen from A-A side of FIG. 31A. FIG. 32 is a perspective view of the coil formed by the preforming method according to the fifth embodiment. The parts common to those in the fourth embodiment are expressed by the same names and the same reference numerals.

The fourth embodiment and the fifth embodiment are different as to how a pair of element coils 4131a and 4131b, which are portions of the stator coil 413 wound around in a volute form, are formed. Therefore, the preforming step is different between them. However, the other steps are the same as those in the fourth embodiment and their explanation is omitted. In this case, it is preferred that the fitting of the insulation paper explained referring to FIGS. 61a to 67B is performed upon the preforming. In the fourth embodiment, the first element coil 4131a is wound around such that the coil terminal of the starting side of winding is on the inner side and winding is done towards the outer side. Then, the coil extending to the outer side is extended to the inner side of the second element coil 4131b. Further, the second element coil is wound around to form a coil form on towards the outer side. That is, the coil-to-coil connector wire 413 for connecting the first and second element coils 4131a and 4131b to each other is arranged so as to be directed from the outer side to the inner side. Therefore, there occurs a portion in which the wires of the coil intersect each other.

In contrast, in the fifth embodiment, the winding is started on the outer side of the first element coil 4131a and the first element coil 4131a is wound around so as to form a coil form towards the inner side. Then, the coil extending to the inner side is extended to the inner side of the second element coil 4131b. Further, the second element coil 4131b is wound around so as to form a coil form towards the outer winding side. That is, the coil-to-coil connector wire 4134 for connecting the first element coil 4131a and the second element coil 4131b to each other connects the inner winding sides thereof, so that there will occur no intersection of wires of the coil. This type of winding is called α-winding. The coil end can be further simplified by adopting this winding, so that the length in the axial direction of the stator 4 can be decreased. In FIG. 30, only a pair of element coils 4131a and 4131b is shown although actually four pairs of wound around portions is formed using a continuous wire as shown in FIG. 32.

Next, explanation is made on a preforming step in which such a pair of the above-mentioned wound around portions is preformed.

In the production method for a rotating electrical machine according to the fifth embodiment, first a continuous coil is formed so as to have a substantially U-shaped concavity and convexity as shown in FIG. 31A. On this occasion, the length between the tops of the concavity and convexity, that is, the vertical length in FIG. 31A is the same as a sum of the lengths of the pair of element coils 4131a and 4131b. The length of the tops of the concavity and convexity that finally constitutes the bridge wire 4132, that is, the length in the horizontal direction in FIG. 31A is adjusted to be equal to the length of the bridge wire 4132. Further, all substantially intermediate positions between the tops of the concavities and the convexities are each bent in advance in the form of a crank by a length of cross-section of the coil to form the coil-to-coil connector wire 4134.

Next, the coil formed into a concavity and convex form is fitted in an α-winding forming jig 25 having an ellipse-like forming groove 253 in the outer circumference thereof. The α-winding forming jig 25 has a plurality of partitions 252 detachably provided to a plate-like member 251. The partitions 252 define the plurality of forming grooves 253. The forming grooves 253 are arranged such that adjacent two constitute a pair. A pair of adjacent forming grooves 253 is provided at four positions in the longitudinal direction of the plate-like member 251 at an interval of the length of the bridge wire 4132. The partition 252 between the pair of adjacent forming groves 253 is provided with an insertion groove 254 that allows a single coil to be inserted. The insertion groove 254 is positioned on one end in the direction of the longer axis of the ellipse-like shape. Although detailed explanation is omitted herein, the plate-like member 251 is retractable.

The coil-to-coil connector portion 4134 is inserted in the insertion groove 254 for the α-winding forming jig 25 thus constructed. FIGS. 31A and 31B show a state in which the coil-to-coil connection portion 4134 of the coil has been inserted in the insertion groove 254.

Each of the forming grooves 253 includes a roller 255 as shown in FIG. 31B. The coil is wound around while being pressed by the roller 255 provided in each forming groove 253 against the forming groove 253 to form a wound around portion. The rollers 255 provided in pair on the adjacent forming grooves 253 move around in different directions, respectively.

Next, all the partitions 252 present on both sides of each forming groove 253 are removed and the plate-like members 251 are retracted to remove the formed coil from the α-winding forming jig 25. In this manner, the coil shown in FIG. 32 is formed. Further, by performing the work of step 112 in FIG. 14 in the same manner as in the first embodiment, the preforming step is completed. Other steps than the preforming step are performed in the same manner as those in the fourth embodiment.

As mentioned above, in the fifth embodiment, a pair of wound around portions is formed so as to be connected to each other at terminals thereof on the inner winding sides in the preforming step. As a result, the coil-to-coil connector wire for joining the pairs of the wound around portions 4131 with each other is joined on the inner winding sides, so that there will occur no intersection between portions of the wires of the coil. Accordingly, the coil ends can be further simplified and the length in the axial direction of the stator can be decreased.

In the production method for a rotating electrical machine according to the fifth embodiment, the concavity and convexity are formed in advance in the preforming step and in this state, the tops of the concavity and convexity are wound around along the forming mold. As a result, the pair of the wound around portions that are continuous at the terminals on the inner winding side can be easily formed and further automation of the production can be achieved.

Sixth Embodiment

Figure 33:
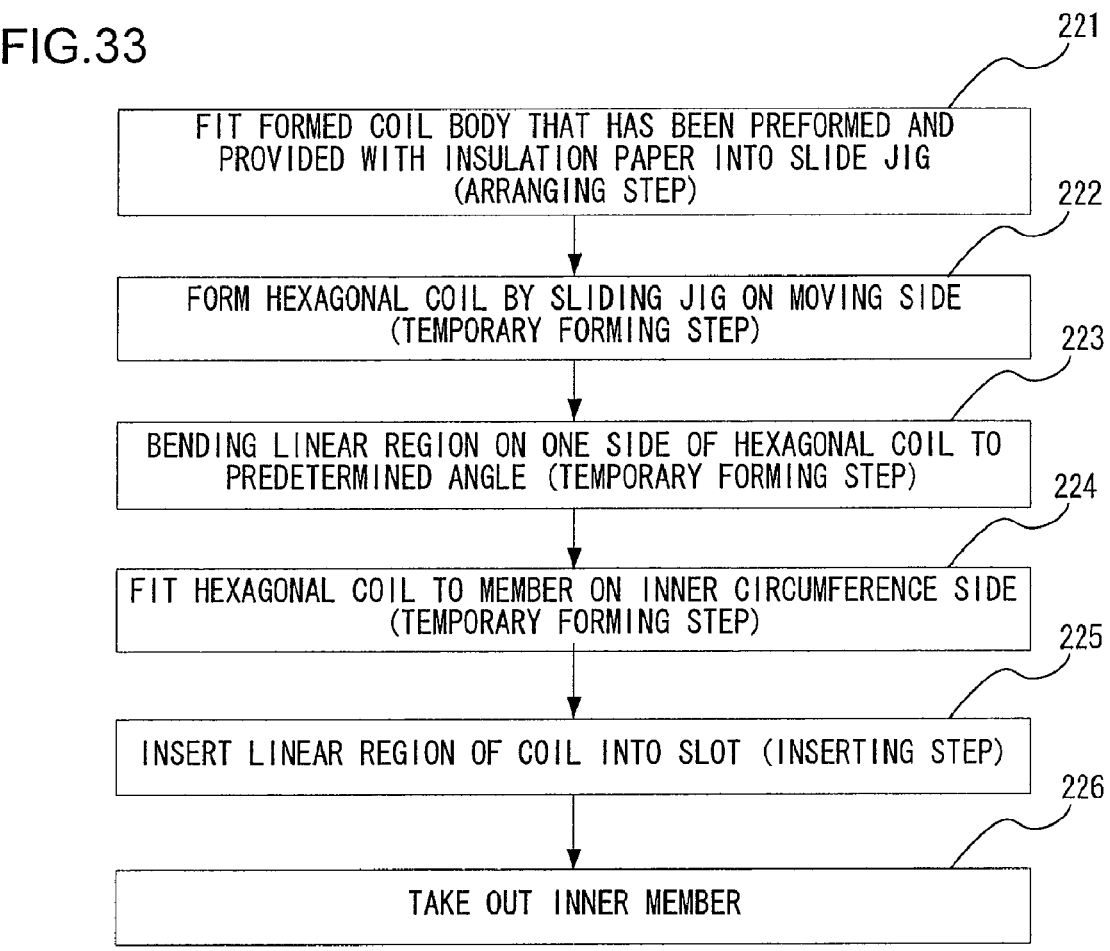
FIG. 33 is a flowchart illustrating manufacturing process from the arranging step to the inserting step, which are the features of a sixth embodiment.
Figure 34:
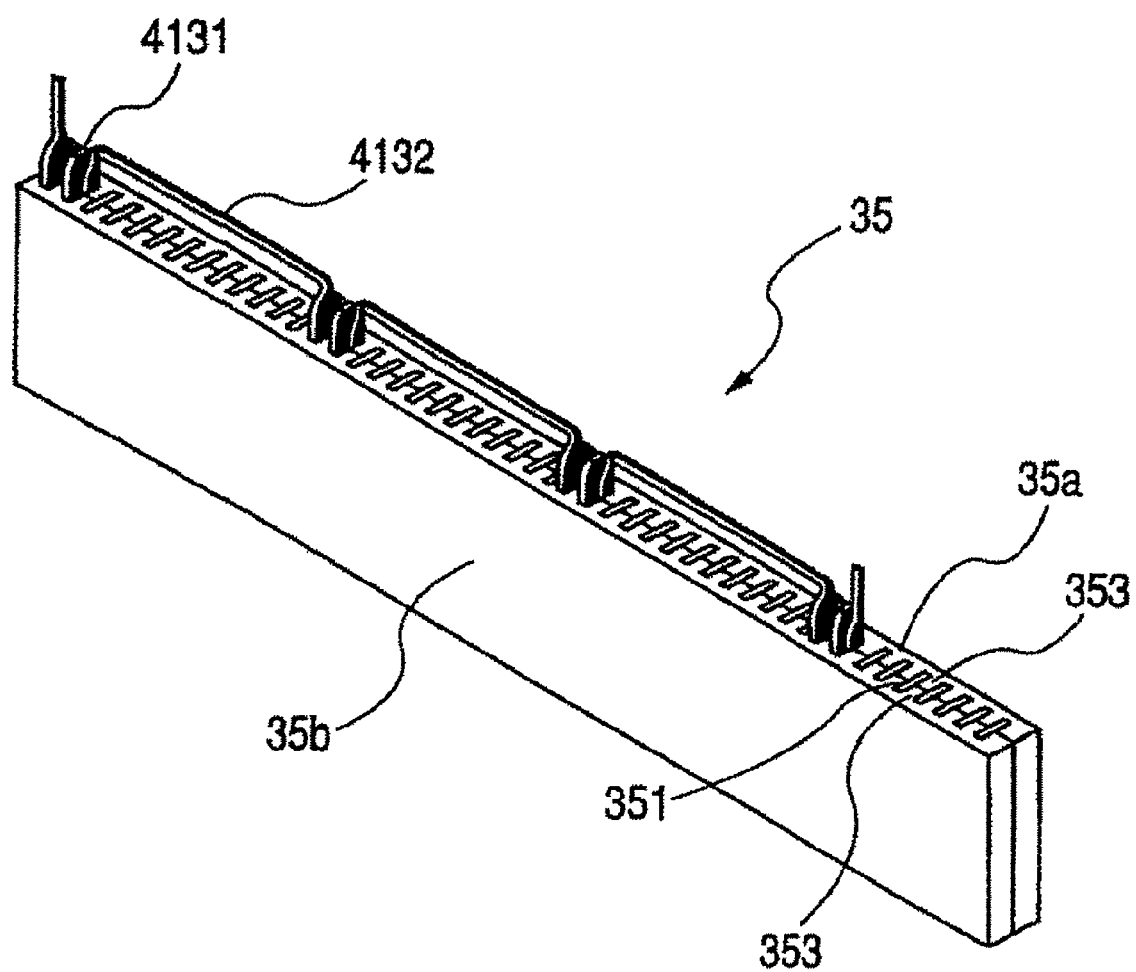
FIG. 34 is a perspective view illustrating a state in which the coil is arranged on a sliding jig used in the sixth embodiment.
Figure 35:
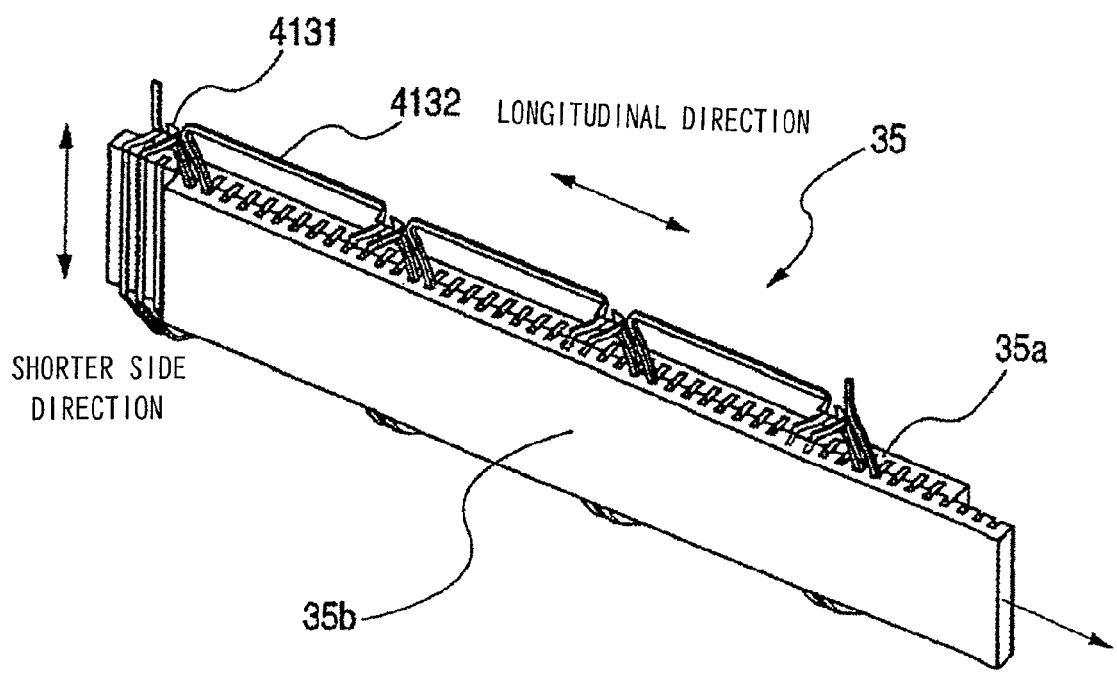
FIG. 35 is a perspective view illustrating a state in which the sliding jig used in the sixth embodiment is slid to form the wound around portions of the coils into substantially hexagonal shapes.
Figure 36:
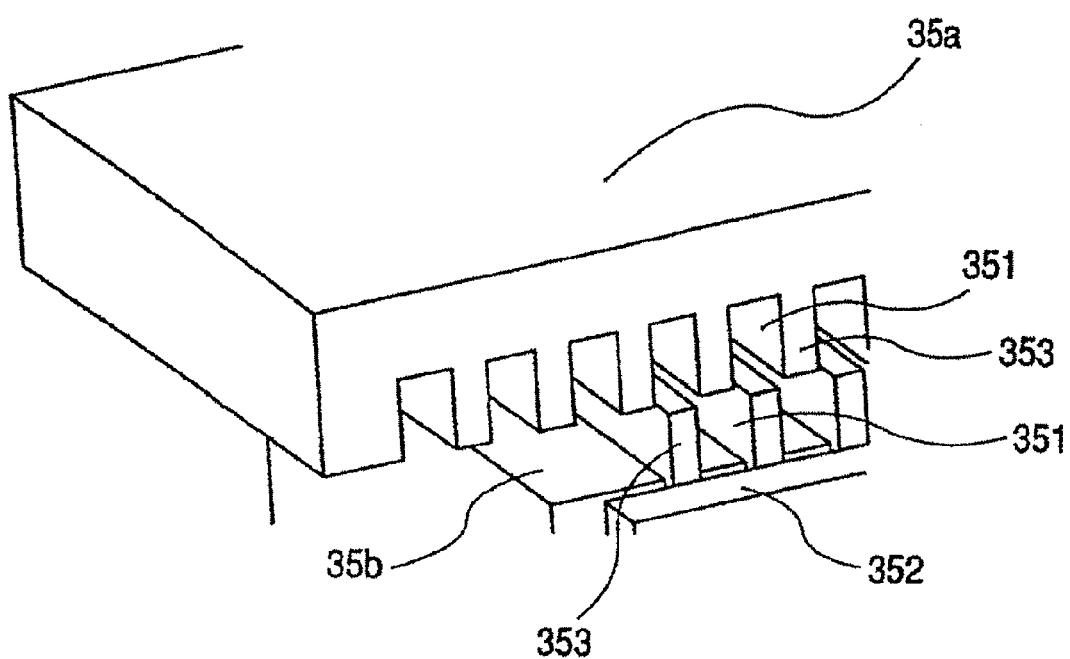
FIG. 36 is an enlarged perspective view showing fixation grooves of the sliding jig used in the sixth embodiment.
Figure 37:
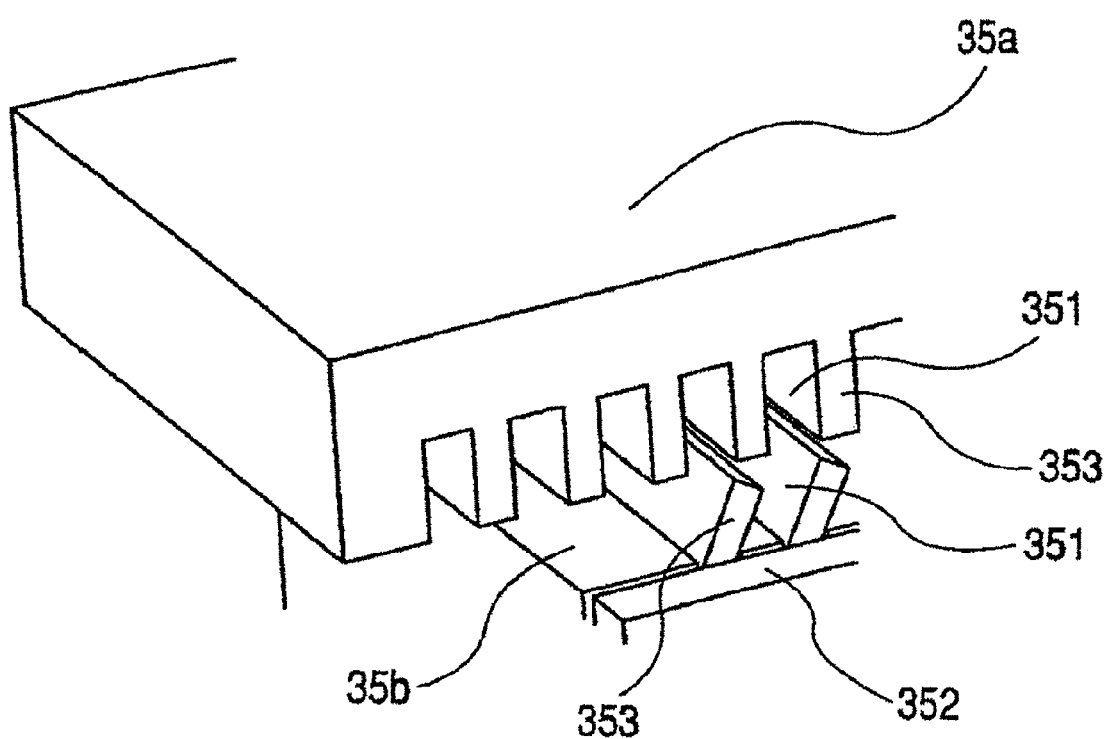
FIG. 37 is a perspective view showing a state in which grooves in one of the halves of the jig in FIG. 36 are slanted.
Figure 38:
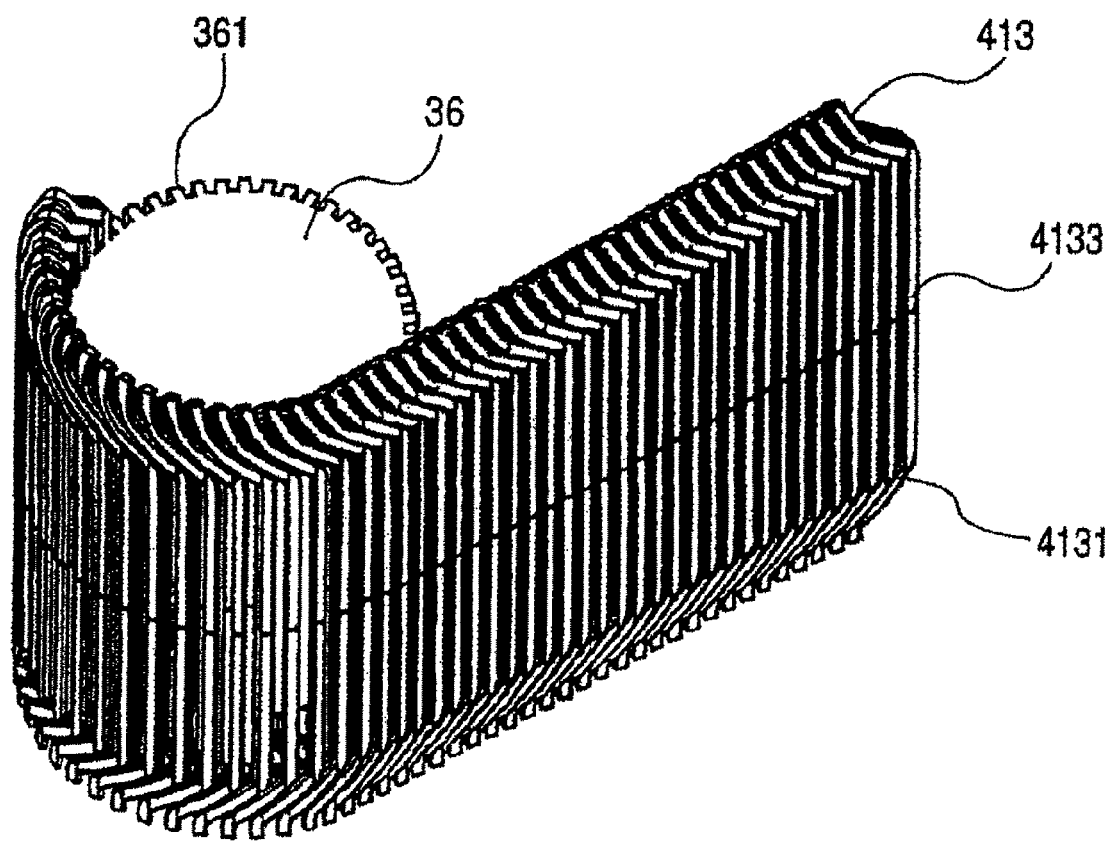
FIG. 38 is a perspective view showing a state in which the substantially hexagonal formed coils are wound around the inner jig in the sixth embodiment.
Figure 39:
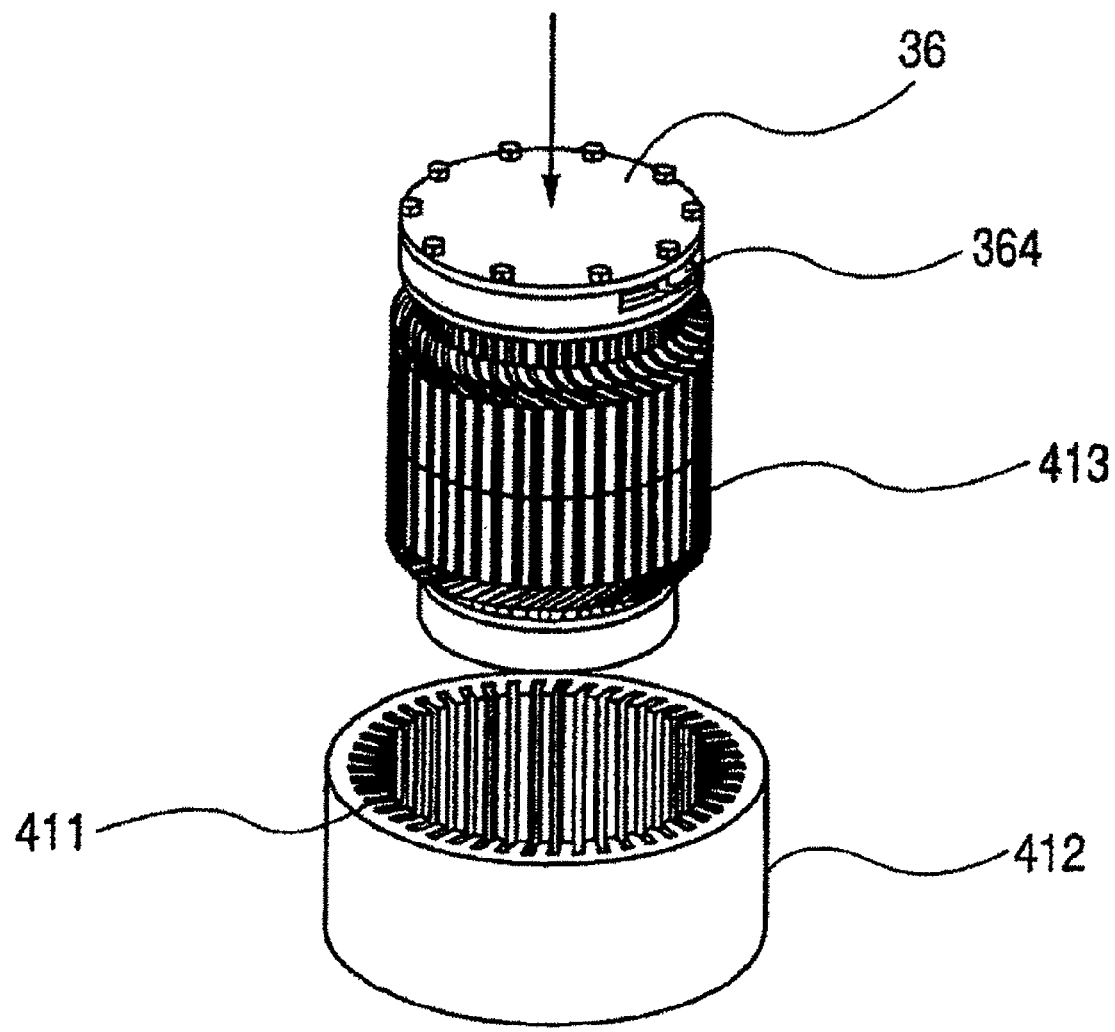
FIG. 39 is a perspective view showing a state in which the inner jig with the coils fitted therearound is placed into the stator core.
Figure 40:
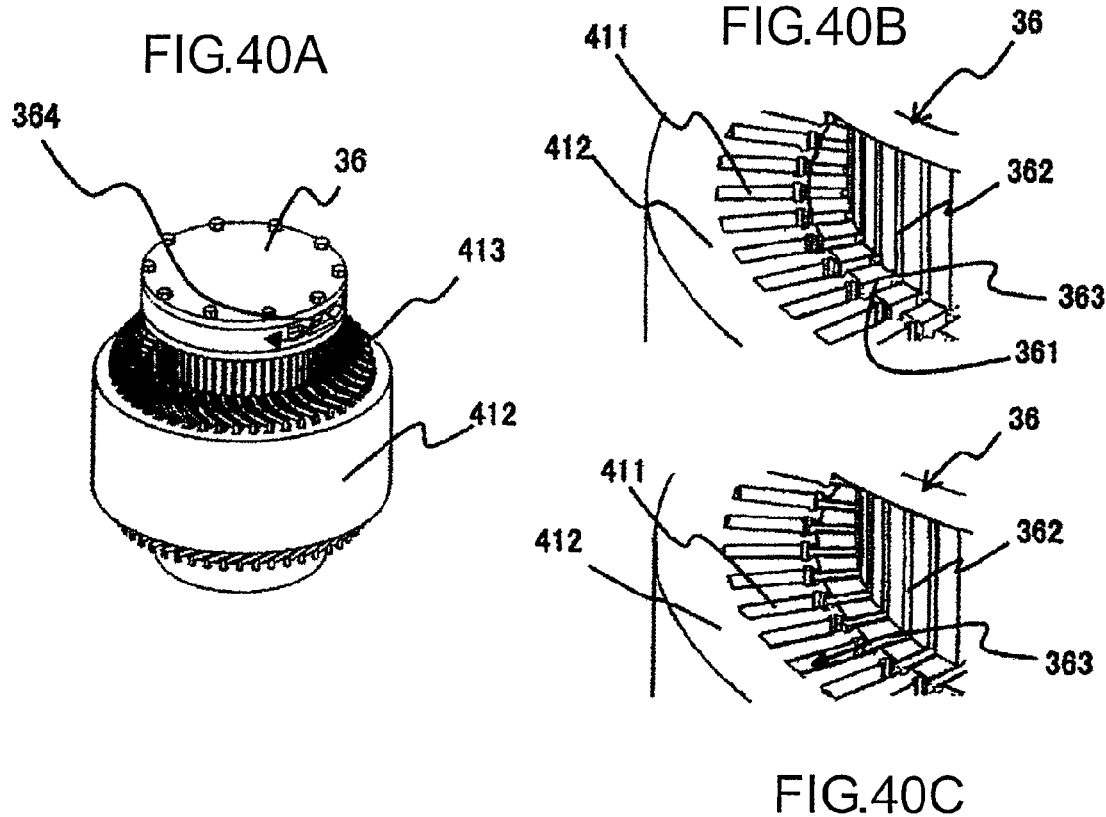
FIG. 40A is a perspective view showing a state in which the insertion step in the sixth embodiment has been performed.
FIG. 40B is a diagram showing a state in which the extruding member is retracted from the slit in the insertion step.
FIG. 40C is a diagram showing a state in which the extruding member is protruding from the slit in the insertion step in the sixth embodiment.
Figure 41:
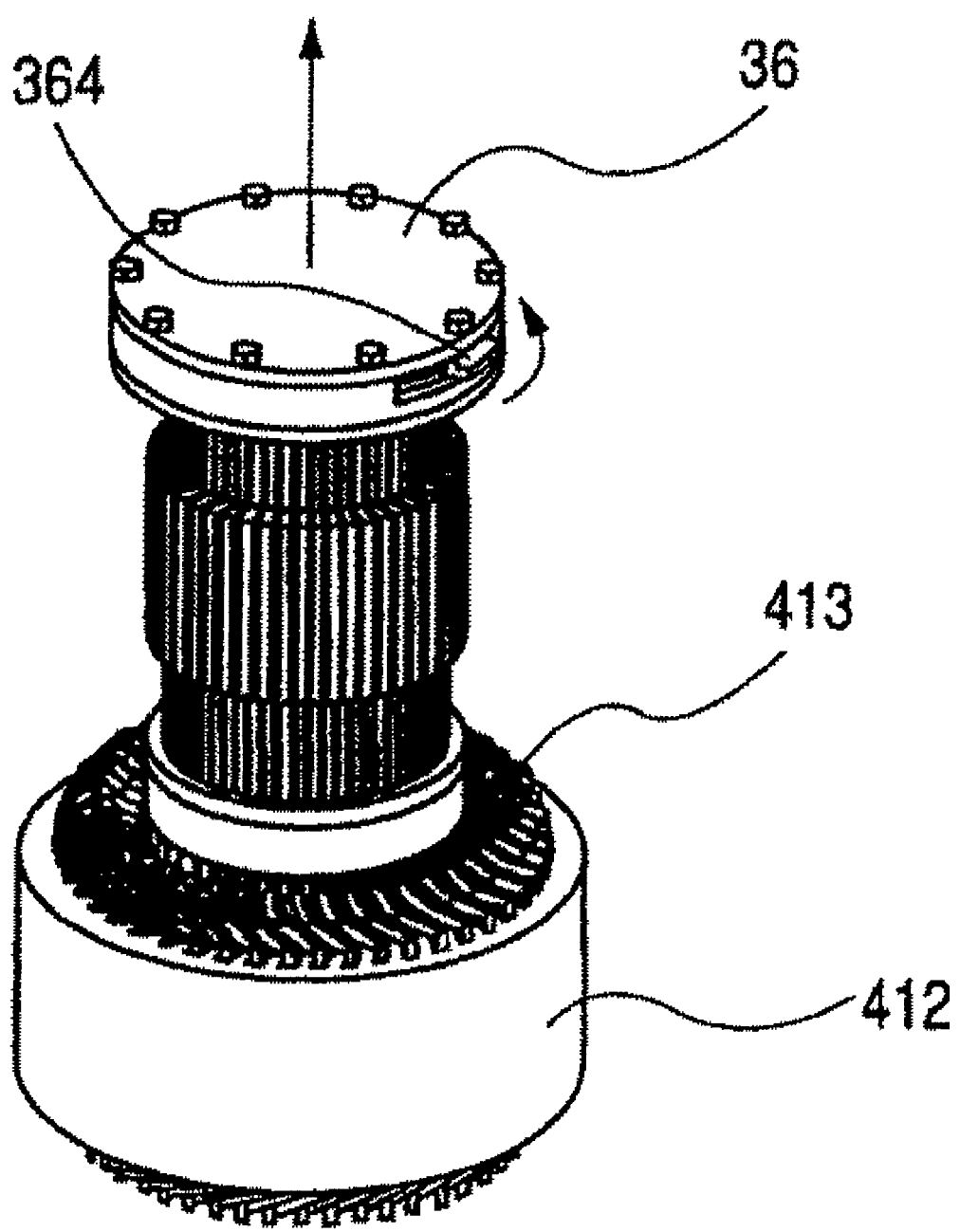
FIG. 41 is a perspective view showing a state in which the inner jig is being withdrawn in the sixth embodiment.

Next, referring to FIGS. 33 to 41, explanation is made on the production method for a rotating electrical machine according to a sixth embodiment of the present invention. FIG. 33 is a flow chart illustrating a manufacturing process from the arranging step to the inserting step, which are the features of the present embodiment. FIG. 34 is a perspective view illustrating a state in which the coil is arranged on a sliding jig. FIG. 35 is a perspective view illustrating a state in which the sliding jig is slid to form the wound around portions of the coils into substantially hexagonal shapes. FIG. 36 is an enlarged perspective view showing fixation grooves of the sliding jig. FIG. 37 is a perspective view showing a state in which grooves in one of the halves of the jig in FIG. 36 are slanted. FIG. 38 is a perspective view showing a state in which the substantially hexagonal formed coils are wrapped around the inner jig. FIG. 39 is a perspective view showing a state in which the inner jig with the coils fitted therearound is arranged in the stator core. FIGS. 40A to 40C are each a perspective view illustrating a state in which the inserting step has been performed. FIG. 40A is an overall view. FIG. 40B is a diagram showing a state in which the extruding member is retracted from the slit in the insertion step. FIG. 40C is a diagram showing a state in which the extruding member is protruding from the slit in the insertion step. FIG. 41 is a perspective view showing a state in which the inner jig is being withdrawn. The parts common to those in other embodiments are expressed by the same names and the same reference numerals.

The present embodiment is different from the fifth embodiment in the arranging step to the inserting step. However, the other steps are the same as those in the fifth embodiment. Accordingly, the arranging step to the inserting step is explained in the present embodiment.

In the production method according to the present embodiment, the preforming step is performed in the same manner as in the fifth embodiment, that is, formed coil body extending in the longitudinal direction is fitted to the sliding jig 35 as shown in step 221 in the flowchart shown in FIG. 33. This work constitutes the arranging step. The sliding jig 35 includes separate parts, i.e., a fixed jig 35a and a movable jig 35b. The fixed jig 35a and the movable jig 35b are each formed in a substantially plate-like shape extending in the longitudinal direction. The movable jig 35b is movable along the longitudinal direction of the fixed jig 35a. The movable jig 35b moves along a guide 352 as shown in FIGS. 36 and 37.

A plurality of fixation grooves 351 extending in the same direction as the shorter side of the jig is provided as fixation portions on each of the opposing surfaces of the fixed jig 35a and the movable jig 35b at equal intervals in parallel. The number of the fixation grooves 351 is the same as the number of the slots in the stator core 412. The length of each fixation groove 351 is larger than the length of each slot 411 in the stator core 412. As shown in FIGS. 36 and 37, the movable jig 35b includes fixation sections 353 that define the fixation grooves 351. The fixation sections 353 are each movable. The respective fixation sections 353 are movable simultaneously from the state in which they are perpendicular to the bottom surface of the groove as shown in FIG. 36 to the state in which they are inclined to the bottom surface of the groove as shown in FIG. 37. Although detailed explanation on the configuration of a moving mechanism that makes the fixation sections movable is omitted, each fixation section 353 can be moved by adopting a link mechanism, a cam mechanism, or the like.

The sliding jig 35 thus constructed is operated as follows. First, the sliding jig 35 is brought into a state where it is set such that all the fixation grooves 351 of the fixed jig 35a and the movable jig 35b face each other as shown in FIG. 34 and then the ellipse-like wound around portions 4131 of the preformed coil are inserted into respective fixation grooves 351 from the direction of the shorter side of the sliding jig 35. FIG. 34 shows a state in which only one formed coil body is inserted in the fixation groove 351 in order to make explanation simpler. However, for one formed coil body, four pairs of wound around portions of coils 4131 are formed by a continuous coil. Actually, wound around portions of the coil 4131 is inserted in all the fixation grooves 351.

Next, as shown in step 222 in the flowchart shown in FIG. 33, the movable jig 35b is slid along the longitudinal direction with respect to the fixed jig 35a to temporarily form the wound around portions 4131 into a hexagonal shape. FIG. 35 shows a state in which the movable jig 35b is slid in the longitudinal direction with respect to the fixed jig 35a. Finally, the movable jig 35b is moved from the state shown in FIG. 34 to a position that faces the fixation groove 351 which is fifth in the fixed jig 35a. Although not shown in the figure, by sliding the movable jig 35b while pressing the top of the coil of the wound around portion of the coil 3131 in the same manner as in the fourth embodiment, the wound around portions of the coil 4131 can be formed into a substantially hexagonal shape with ease.

Next, as shown in step 223 in the flowchart shown in FIG. 33, the linear region 4133 on the side of the movable jig 35*b* in the linear regions of the 4131 that have been formed into a substantially hexagonal shape is bent so that the cross-section of it is at a predetermined angle. The step 222 and step 223 in the flowchart shown in FIG. 33 constitute the temporary forming step. The operation of bending the linear region 4133 is performed by simultaneously inclining all the fixation sections 353 of the movable jig 35*b* as shown in FIG. 37. Since the stator coil 413 is made of a flat rectangular wire having a substantially rectangular cross-section, the cross-section of the linear region 4133 of the coil 413 is inclined when the fixation sections 353 are being inclined. It is preferred that the angle of inclination is set such that when the formed coil body is made circular in the subsequent step, the cross-sections of the linear regions 4133 of the coil inserted in the fixed jig 35*a* and the movable jig 35*b*, respectively, coincide with a radial pattern.

Next, as shown in step 224 in the flowchart shown in FIG. 33, the formed coil body of which the wound round portions 4131 have been formed into a hexagonal shape is fitted into the inner jig 36. The inner jig 36, like the inner jig 19 in the first embodiment, is provided on the outer circumference thereof with the same number of outer circumference side open grooves 361 as the number of the slots 411 in the stator core 412. The width in the circumferential direction of the outer circumference side open groove 361 is smaller than or equal to the width in the circumferential direction of the inner circumference side opening of the slot 411. The length in the axial direction of the outer circumference side open groove 361 is larger than the length in the axial direction of the slot 411. As shown in FIGS. 40A to 40C, a slit 362 is formed on the bottom of each outer circumference side open groove 361 through which a plate-like extrusion member 363 is retractably provided in the direction of inner circumference side and outer circumference side, that is, in a radial pattern. Although detailed explanation on the structure is omitted, the extrusion member 363 moves to and from radially through the slit 362.

As shown in FIG. 38, the formed coil body is wrapped around the inner jig 36 so that the linear regions 4133 of the wound around portions of the coils 4131 are inserted into the outer circumference side open grooves 361, respectively. On this occasion, the linear regions 4133 inserted in the fixed jig 35*a* and the movable jig 35*b* are inserted into each outer circumference side open groove 361 in superposition one on another. Five linear regions 4133 on each end of the formed coil body extending in the longitudinal direction are inserted into the outer circumference side open grooves such that they overlap each other. The cross-section of the linear region 4133 of the coil inserted in the movable jig 35*b* and the cross-section of the linear region 4133 of the coil inserted in the fixed jig 35*a* are arranged at a predetermined angle to each other in the step 223 in the flowchart shown in FIG. 33. As a result, the cross-sections formed in a flat shape can be overlapped radially by merely winding the formed coil body extending in the longitudinal direction around the inner jig 36. With the above-mentioned operations, the temporary forming step is completed. In FIG. 38, detailed structure of the inner jig 36 and the bridge wire 4132 are omitted in order to provide a simpler explanation.

Next, as shown in step 225 in the flowchart shown in FIG. 33, each linear region 4133 of the coil is inserted in the slot 411. This work constitutes the inserting step. As shown in FIG. 39, the inner jig 36 around which the stator coil 413 has been wound in the temporary forming step is arranged on the inner side of the stator core 412. The slot 411 of the stator core 412 in the present embodiment is different from that in the fourth embodiment in that each slot 411 is inclined in one orientation along the circumferential direction. By inclining the slots 411 in the circumferential direction, the stator coil 413 formed into a circular shape can be readily inserted. Also, in FIG. 39, the bridge wire 4132 has been omitted in order to provide a simpler explanation.

Next, a lever 364 of the inner jig 36 is rotated in the circumferential direction as shown in FIG. 40A. As mentioned above, rotation of the lever 364 allows for switching between the state in which the extrusion member 363 is retracted from the slit 362 as shown in FIG. 40B and the state in which the extrusion member 363 extrudes from the slit 362 as shown in FIG. 40C. To explain more particularly, in the case where the lever 364 is in the state as shown in FIG. 40A, the extrusion member 363 is retracted from the slit 362 as shown in FIG. 40B. When the lever 364 is rotated in the direction indicated by an arrow A as shown in FIG. 40A, the extrusion member 363 protrudes from the slit 362 as shown in FIG. 40C to extrude each linear region 4133 of the coil into the slots 411 of the stator core 412. In this manner, by rotating the lever 364, the stator coils 413 are inserted into the slots 411, respectively, and by rotating the lever 364 in the direction indicated by the arrow as shown in FIG. 41, the extrusion member 363 is retracted from the slit 362 and the inner jig 36 is removed from the inner circumference of the stator core. Thereafter, the joining step and the fitting step may be performed in the same manner as in the fourth embodiment. Also, in FIGS. 40A to 40C and 41, the bridge coil 4132 has been omitted in order to provide a simpler explanation.

In the above, explanation has been made on the sixth embodiment. The production method for a rotating electrical machine according to the sixth embodiment includes a pre-forming step in which a continuous coil is wound around in a plurality of time in a coil form having a pair of linear regions facing each other; arranging step in which the linear regions of the preformed coil are separately fixed to fixation portions provided facing each other in different formation molds such that the linear regions are aligned in the axial direction; a temporary forming step in which at least one of the different formation molds to which the linear regions are fixed, respectively, is relatively moved linearly to form a formed coil body that extends in a longitudinal direction and then the formed coil body is formed in a circular pattern such that both ends in the longitudinal direction of the formed coil body overlap each other; an inserting step in which the temporary formed coil is inserted into the slot such that the linear region on an outer circumference side of the temporary formed coil is positioned on a bottom side of the slot, and the linear region on an inner circumference side of the temporary formed coil is positioned on the coil insertion portion; a connecting step in which terminal portions of the coil are connected to respective places depending on a use; and a fitting step in which the rotor is fitted in the stator so as to be relatively rotatably by a bearing. As a result, the present embodiment provides an advantageous effect that no force is exerted on the teeth of the stator core besides the advantageous effects in the fourth embodiment. Therefore, a continuous lap wound coil can be inserted in the stator core even if the teeth have narrow widths and tend to fall.

According to the production method for a rotating electrical machine according to the sixth embodiment, the linear regions in the formed coil body are wound around an inner jig provided with a plurality of outer circumference open grooves to form a circular shape in the temporary forming step. As a result, the formed coil body can be made circular along the inner circumference of the stator core. This makes the insertion work in the inserting step easier.

According to the production method for a rotating electrical machine according to the sixth embodiment, the inner jig is provided with an extrusible portion that is capable of moving inward and outward in the bottom of the groove open to outer circumference, and the inserting step is performed by protruding the extrusion portion. As a result, the number of jigs can be minimized and the number of times in which the jig moves in and out of the stator core can be minimized.

The production methods for a rotating electrical machine according to the embodiments of the present invention are as explained above. The following are explanations on other embodiments of the coil and other embodiments of the rotor.

Seventh Embodiment

Figure 42:
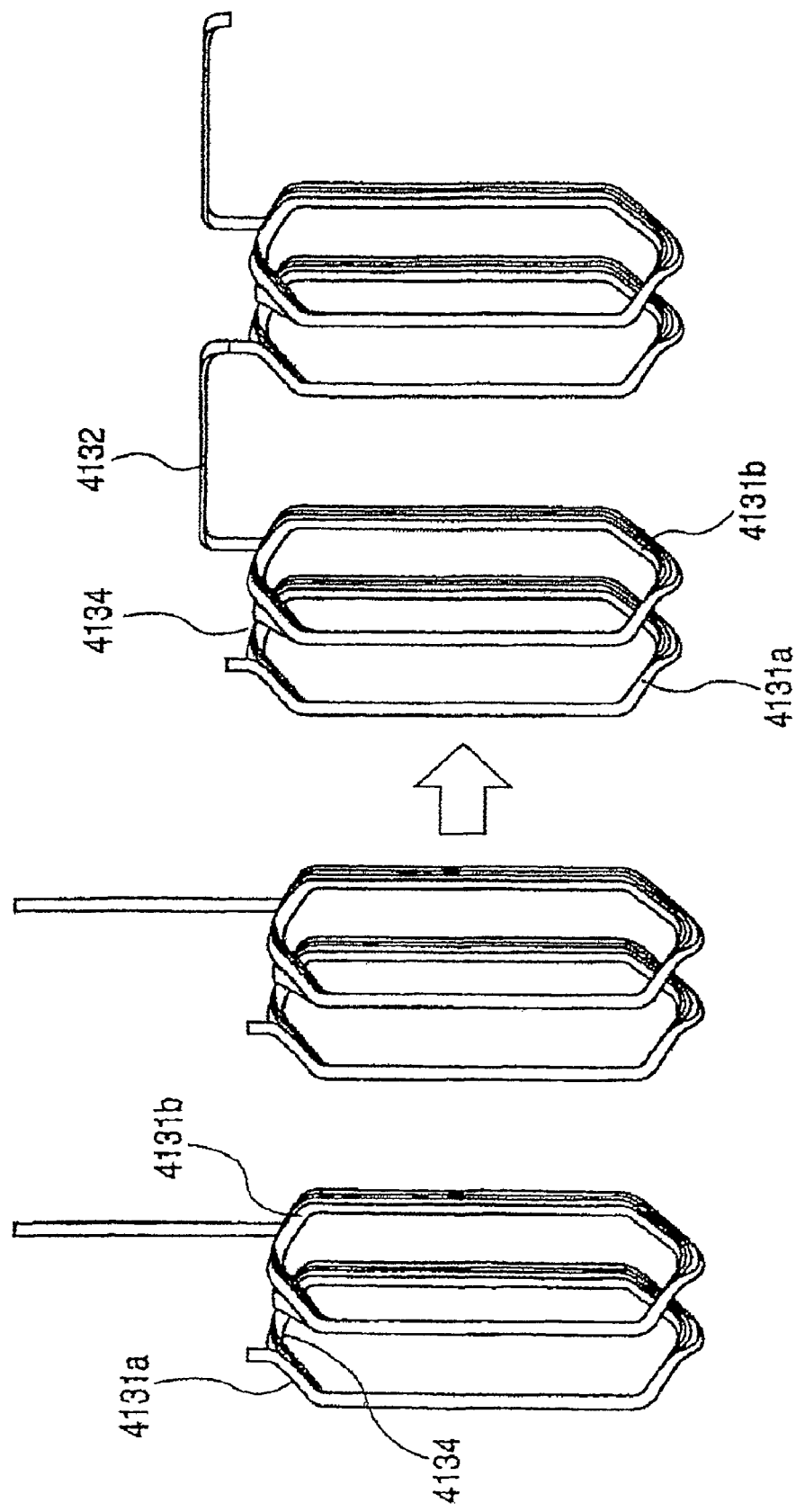
FIG. 42 is a diagram showing how to connect a bridge wire that couples the coils in a seventh embodiment.

Next, a seventh embodiment is explained referring to FIG. 42. FIG. 42 is a diagram illustrating connection of a bridge wire that connects a set of coils consisting of the element coils 4131a and 4131b, that is, a pair of coils to each other. The parts common to those in the other embodiments are expressed by the same names and the same reference numerals.

The stator coil 413 according to the fourth embodiment is constituted by four sets, i.e., four pairs of the element coils 4131a and 4131b formed with a continuous wire as shown in FIG. 8. However, in the seventh embodiment, a different stator coil 413 is formed for each pair of wound around portions and finally the pair of element coils 4131a and 4131b is connected by, for example, welding. To be concrete, one end of the coil terminals in one pair of element coils 4131a and 4131b is set longer by the length of the bridge wire 4132 than the other end, and after it is inserted into the slot 411 in the stator core 412, the bridge wire 4132 is deformed and connected to the pair of other wound around portions by, for example, TIG welding.

If the element coils are adapted to be connectable with the bridge wire 4132 afterwards, it is unnecessary to take into consideration deformation of the bridge wire 4132 upon inserting each linear region 4133 of the coil into the slot 411 in the stator core 412 while increasing the diameter of the formed coil body. As a result, although the number of connections increases more or less, freedom of arrangement of the bridge wire 4132 can be increased. Since the bridge wire 4132 is a coil terminal on one side of the wound around portions 4131, the number of parts and the number of connection points can be decreased as compared with the case where the bridge wire is constituted by a separate wire. Note that the pair of wound around portions is formed by the winding method explained in the fifth embodiment.

Eighth Embodiment

Figure 43:
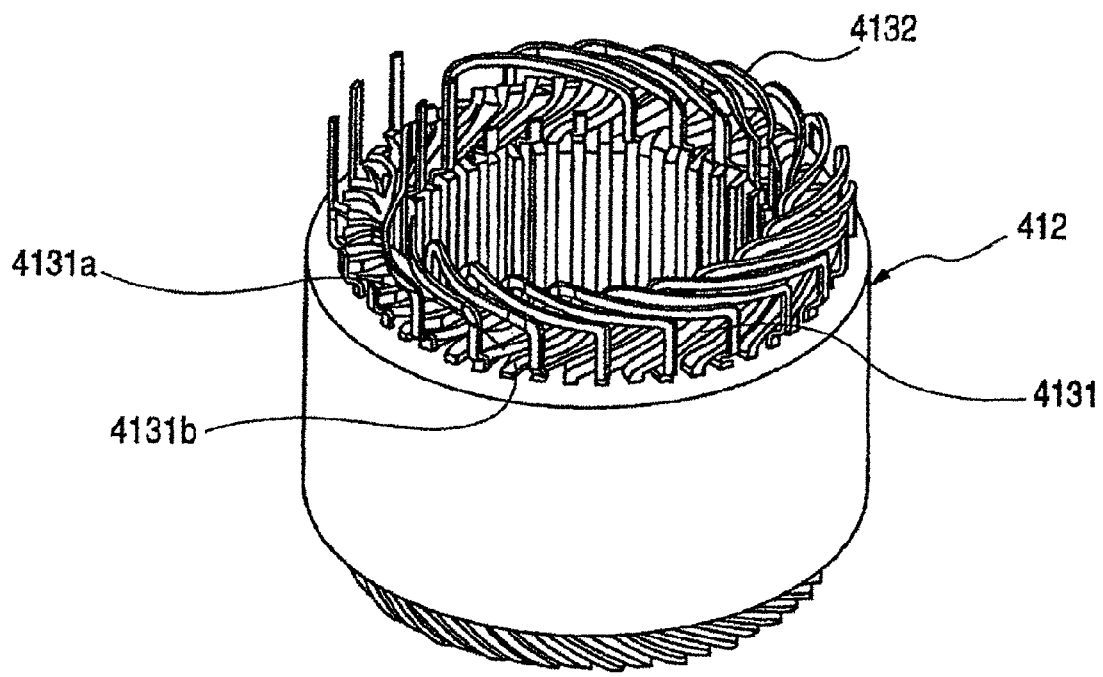
FIG. 43 is a perspective view showing a stator according to an eighth embodiment.

Next, explanation is made on an eighth embodiment of the present invention referring to FIG. 43. FIG. 43 is a perspective view of a stator according to the eighth embodiment. The parts common to those in the fourth embodiment are expressed by the same names and the same reference numerals.

The eighth embodiment is the same as the fourth embodiment except that the bridge wire 4132 is connected in a different manner and one pair of element coils 4131a and 4131b is wound around by α-winding. The other constructions are the same. The wire 4132 in the fourth embodiment is constructed such that it extends from the top of the coil end in each wound round portion 4131. However, the bridge wire 4132 in the eighth embodiment is provided so as to step over from the bottom side of the slot 411 to the coil insertion portion side in each wound around portion 4131. To be in detail, the coil terminal positioned on the bottom side of the slot 411 from among the coil terminals positioned on the outer circumference side of each wound around portion 4131 is deformed stepwise from the wound round portion 4131 toward the outer circumference side of the stator core 412 and extended to the top side of the coil end. Further, the coil terminal is extended in a substantially volute shape from the outer circumference side to the inner circumference side of the coil end in the same manner as in the fourth embodiment and is connected to the coil insertion portion side of another wound around portion 4131a. The coil insertion portion side is also deformed stepwise toward the inner circumference side of the stator core 412 in the same manner as the bottom side of the slot 411 and is connected to the top side of the coil end. Note that in FIG. 43, the bridge wire that constitutes a neutral point and the portions constituted by a continuous wire that connects formed coil bodies to each other are omitted.

As mentioned above, since the bridge wire 4132 does not extend from the top of the coil end in the eighth embodiment, the length in the axial direction of the stator 4 can be further decreased. Since the bridge wire 4132 is configured such that the longer side direction of the flat rectangular wire is directed in the axial direction of the stator 4, the bridge wire 4132 can be arranged sufficiently even when the stator core 412 has a small diameter.

The bridge wire 4132 in the eighth embodiment does not extend from the top of the coil end but extends from the slot insertion portion, so that the length of the bridge 4132 is varied to a considerable extent when the wound around portion of the coil is made substantially hexagonal. To avoid this, as explained in the fourth embodiment, it may be effective to fold the bridge wire 4132 into a substantially V-form or a substantially U-form in the axial direction or in the radial direction, or the like before the wound around portions 4131 are formed into a substantially hexagonal shape and allow for elongation of the folded bridge wire 4132 when the bridge wire 4132 is formed into a substantially hexagonal shape or when it is inserted into the slot 411 in the stator core 412. The pair of element coils 4131a and 4131b may be wound not only by the winding method explained referring to FIG. 30 but also by the winding method as in the fourth embodiment.

Ninth Embodiment

Figure 44:
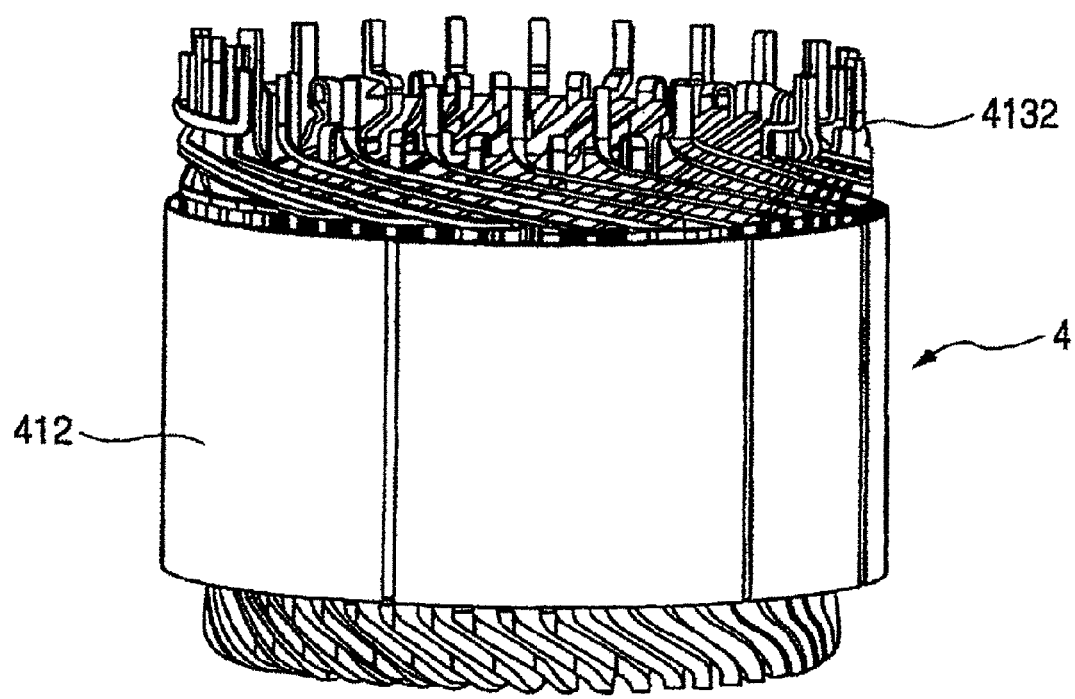
FIG. 44 is a perspective view showing a stator according to a ninth embodiment.

Next, explanation is made on a ninth embodiment of the present invention referring to FIG. 44. FIG. 44 is a perspective view of the stator according to the ninth embodiment. The parts common to those in the fourth embodiment are expressed by the same names and the same reference numerals.

The ninth embodiment is different from the eighth embodiment in the shape and arrangement of the bridge wire 4132 but is the same as the eighth embodiment in other respects. The bridge wire 4132 in the ninth embodiment is formed in a volute shape on the leading end side as compared with the top of the coil end as in the seventh embodiment whereas the bridge wire 4132 of the ninth embodiment is not in a volute shape but is formed in a spiral shape on the bottom side of the slot 411, that is, on the outer circumference side of the stator core 412 and is connected to other wound around portions 4131. The ninth embodiment is constructed such that the bridge wire 4132 is formed into a spiral shape on the outer circumference side of the stator core 412 and is connected with the coil terminal at the portion of the coil end. FIG. 44 shows the state before the coil ends are welded to each other. In actuality, however, starting from the state shown in FIG. 44, the wires protruding in the axial direction of the stator 4 are molten and joined by TIG welding or the like, so that the portions protruding in the axial direction are molten and reduced back substantially to the position of the coil end.

The ninth embodiment as mentioned above can decrease the size in the axial direction of the stator 4 more than the eighth embodiment since the bridge wires 4132 can be arranged without protruding too much from the top of the coil end in the axial direction of the stator 4 although the number of connection positions increases more or less. It is possible to constitute the bridge wire 4132 by a wire that is continuous to the wound around portions 4131 by contriving the forming method. Further, the portion that is formed into a spiral shape may be on the coil insertion side, that is, on the inner circumference side. Both the inner circumference side and the outer circumference side of the stator core 412 may each be formed into a spiral shape.

The advantageous effects of the embodiments have been explained above. However, various configurations may also be adopted in the present invention. For example, although a flat rectangular wire having a substantially rectangular cross section is adopted in the above-mentioned embodiment, the cross-section of the wire need not be a regular rectangle. For example, each side of the wire need not be of flat surface but may be of contoured surface such as seen in the case where the wire is pressed and deformed in the slot 411. The wire may have a cross-sectional shape of a substantially circular shape, a substantially ellipse-like shape, and a substantially polygonal shape other than tetragon. When a wire having a rectangular cross-section is used, the coil may be of a substantially square shape, a substantially rectangular with the side along the circumferential direction being shorter and the side along the radial direction of the stator core being longer.

In the above-mentioned embodiment, explanation has been made on an induction electrical motor as an example of a rotating electrical machine. However, the rotating electrical machine may be, for example, a magnet-type synchronous electrical motor having a permanent magnet in the circumferential direction of the rotor. When such a magnet-type synchronous electrical motor is adopted, there may be adopted a surface magnet type rotor in which a plurality of magnets is arranged on the surface of the rotor and fixed with rings made of a nonmagnetic material or a built-in magnet type rotor in which a hole extending in the axial direction is formed at a plurality of positions in the circumferential direction on the inner circumference side of the rotor and a magnet is arranged in each hole. Further, when the rotating electrical machine is used as an alternating current generator for vehicles, a Lundell rotor in which a field coil is wound around inside may be used.

In the above-mentioned embodiment, the magnetic material portion in the stator core and the rotor has been constituted by a lamination of steel plates. However, dust core obtained by compacting iron powder having an insulation coating on the surface of particles thereof may be adopted. A divided stator core constituted by a plurality of members fixed to each other may be adopted as the stator core.

In the above-mentioned embodiment, the conductor bar and the short circuit ring are made of aluminum. However, copper may be used for the purpose. When copper is used for the conductor bar and short circuit ring, the electric resistance can be more decreased than use of aluminum, so that the efficiency of the motor can be increased.

In the above-mentioned embodiment, the number of slots in the stator core is set to 48. However, the number of slots may be changed depending on the specification of the rotating electrical machine. When the number of slots is changed as stated above, the arrangement of the wound around portions of the coil must also be changed.

In the above-mentioned embodiment, a pair of wound around portions is formed using a continuous wire so that they are arranged adjacent to each other pair by pair. If it is acceptable that the number of connection points increases, the coils can be connected to each other by, for example, welding after they are inserted into the stator core. Further, the number of adjacent wound around portions is not limited to two but the number of times of winding around the wire in a volute shape may also be set freely depending on the specification of the rotating electrical machine.

In the above-mentioned embodiment, self-fusing wire is used and fixed to form a coil. However, the wires may be fixed with different members such as adhesive or adhesive tape. Further, forming is possible without fixation depending on the manner of forming.

In the above-mentioned embodiment, the coil is inserted into the slots of the stator core after an insulation paper is integrally fixed to the coil. However, the coil may be inserted into each slot after an insulation paper is arranged in each slot. On this occasion, if the insulation paper is protruded such that it is spreading out from the inner circumference side opening, the coil can be readily inserted into the slot.

In the above-mentioned embodiment, the slots are open slots. However, the inner circumference end in each tooth may be adapted so as to extend in the circumferential direction. Further, if open slots are adopted, holding members are provided. However, the holding members may be constructed by molding the inner circumference side of the teeth with resins or the like.

In the above-mentioned embodiment, the wound around portions of the coil are formed in a substantially hexagonal shape before they are inserted into the stator core. However, the wound around portions need not be hexagonal but may be like a large ellipse-like shape.

In the above-mentioned embodiment, the stator winding is made of 2Y connection format in which a pair of stator coils is connected to each other in parallel. However, the start winding may be made of a 1Y connection format in which a plurality of stator coils is connected in series. If such a 1Y connection format is adopted, the number of connection points can be further decreased.

Tenth Embodiment

Figure 45:
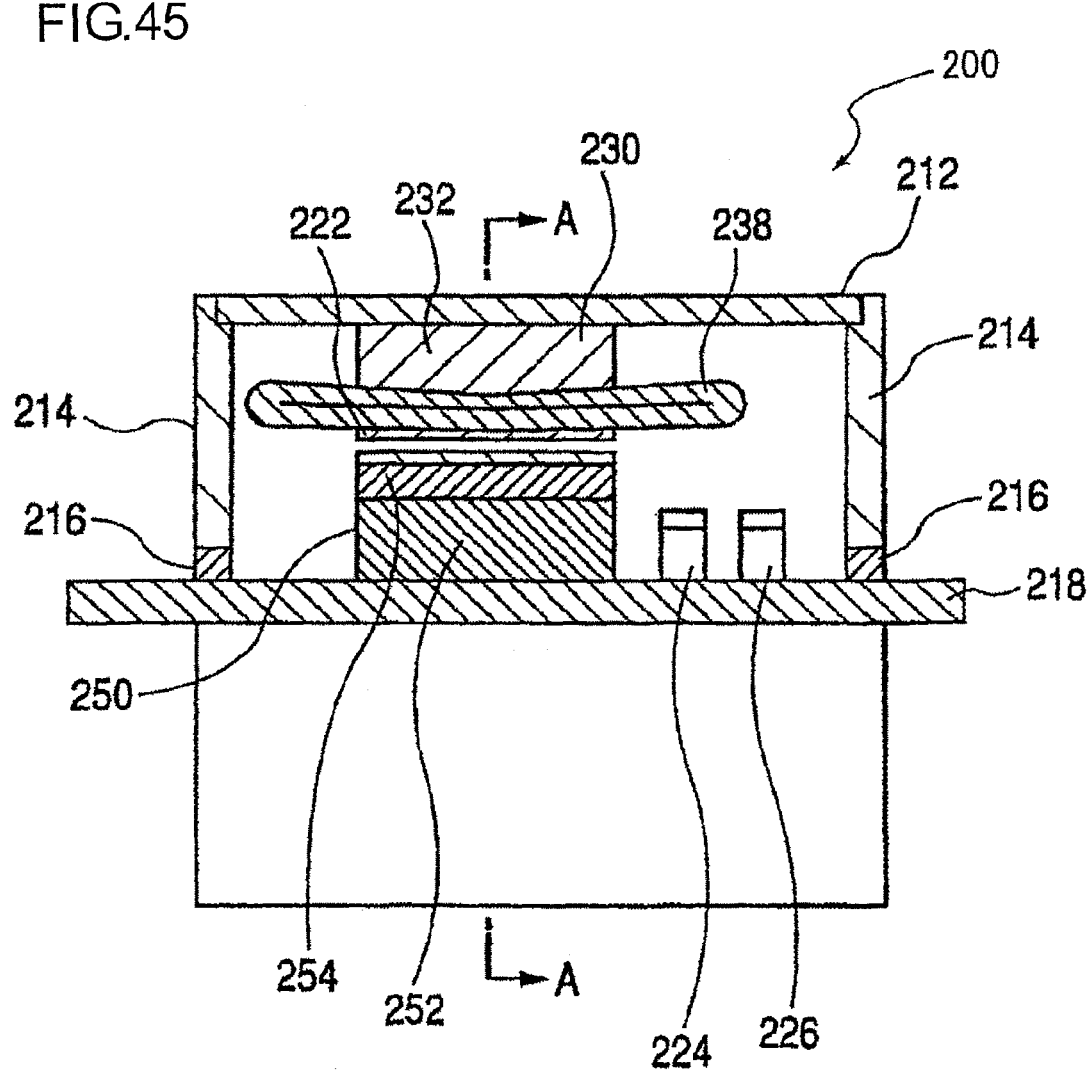
FIG. 45 is a cross-sectional view showing a permanent magnet rotating electrical machine.
Figure 46:
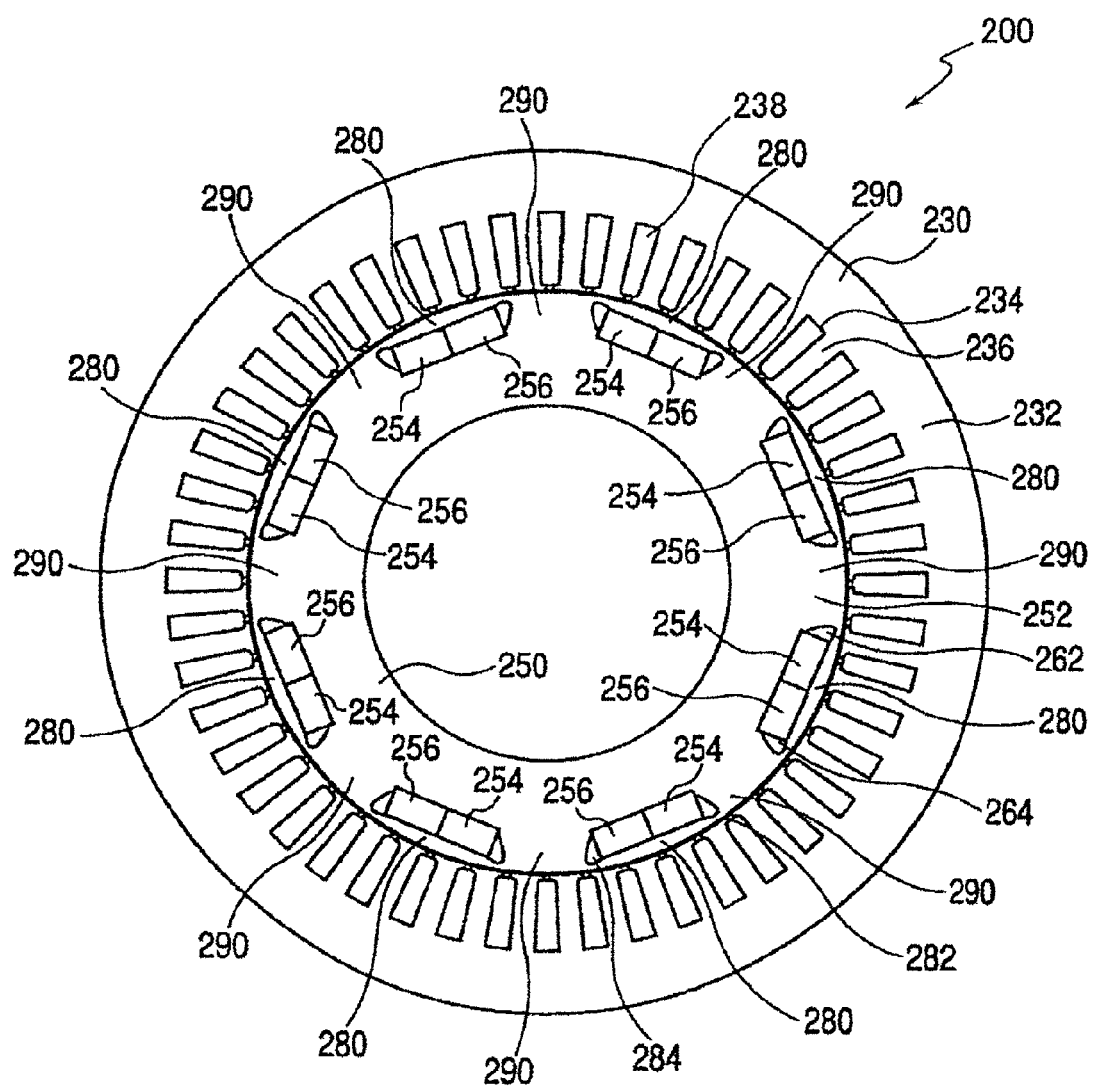
FIG. 46 is an A-A cross-section showing the stator and the rotor shown in FIG. 45.

The above-mentioned stator winding can be used not only in induction motors but also in permanent magnet rotating electrical machines. Referring to FIGS. 45 and 46, explanation is made on a permanent magnet rotating electrical machine with the above-mentioned stator winding. FIG. 45 is a cross-sectional view showing a permanent rotating electrical machine 200. FIG. 46 is an A-A cross-sectional view showing a stator 230 and a rotor 250 shown in FIG. 45. Description on a housing 212 and a shaft 218 have been omitted in FIG. 46.

The stator 230 is held inside the housing 212. The stator 230 includes a stator core 232 and the above-mentioned stator winding 238. The rotor 250 having a permanent magnet 254 is arranged so as to face the stator core 232 via a gap 222. The housing 212 has end brackets 214 on both sides in the direction of rotation axis of the shaft 218, respectively. The shaft 281 having a rotor core 218 is rotatably held by the end brackets 214, respectively, through the bearings 216.

The shaft 218 is provided with a rotor position sensor 224 that detects the position of the rotor and a rotation speed sensor 226 that detects the rotation speed of the rotor. The three-phase alternating current supplied to the stator winding is controlled based on outputs from these sensors.

Referring to FIG. 46, specific structures of the stator 230 and the rotor 250 shown in FIG. 45 are explained. The stator 230 has a stator core 232. The stator core 232 has a lot of slots 234 and teeth 236 uniformly distributed in the circumferential direction similarly to the above-mentioned structure. Each slot 234 has a stator coil 238. As shown in FIG. 46, the number of slots in the stator core is not particularly limited but is 48 in the present embodiment.

In the stator core 252 there are formed the permanent magnet insertion holes for inserting permanent magnets 254 and 256. The permanent magnets 254 and 256 are inserted in the permanent magnet insertion holes. The magnetization direction of the permanent magnets 254 and 256 is a direction in which the surface of the magnet on the side of the stator is an N pole or an S pole; the magnetization direction is inverted pole after pole of the rotor.

In the embodiment shown in FIG. 46, the permanent magnet 254 and the permanent magnet 256 functions as one pole of the rotor 250. The poles of the rotor 250 provided with the permanent magnets 254 and 256 are arranged at even intervals in the circumferential direction of the rotor 250. The number of poles of the rotor 250 is 8 in the present embodiment. However, this number is not limited to 8 and may be 10 or more and up to 30, or more than 30 depending on cases. The number of poles depends on conditions such as output power required for the rotating electrical machine. An in crease in number of poles results in an increase in number of magnets, leading to a deterioration in workability. In some cases, the number of poles may be less than 8. The portion of the rotor core present on the stator side of the permanent magnets 254 and 256 functions as a pole piece 280 and the magnetic lines that enter and exit the permanent magnets 254 and 256 enter and exit the stator core 232 through the pole piece 280.

As mentioned above, the permanent magnets 254 and 256 are magnetized inversely pole after pole. If the magnets 254 and 256 of one pole are an N pole on the stator side and an S pole on the shaft side, then the permanent magnet 254 and 256 that function as both side poles therefor are magnetized such that an S pole is on the stator side and an N pole is on the shaft side. There is between the poles of the rotor 250 a portion that functions as an auxiliary pole 290. Reluctance torque is generated due to a difference in magnetic resistance between a magnetic circuit of q-axis magnetic fluxes that pass the auxiliary magnetic poles 290 and a magnetic circuit of d-axis magnetic fluxes that pass through the magnets. Between any adjacent auxiliary magnetic pole 290 and magnetic piece 280 is a bridge portion 282 or 284. In the bridge portions 282 and 284, cross-sections of magnetic circuits are narrowed due to magnetic gaps 262 and 264. As a result, in each of the bridge portions 282 and 284 there occurs a phenomenon of magnetic saturation, so that the flux content of the magnetic fluxes that pass between the magnetic pieces 280 and the auxiliary magnetic poles 290, that is, between the bridge portions 282 and 284 is suppressed to a predetermined level.

In the rotating electrical machine shown in FIGS. 45 and 46, the switching operation of the inverter device shown in FIG. 4 is controlled based on the outputs of the rotation speed sensor 226 and the rotation position sensor 224 on the rotor and the operation in which direct current supplied from the secondary battery 612 is converted into three-phase alternating power is controlled. The three-phase alternating power is supplied to the stator coil 238 shown in FIGS. 45 and 46 and the frequency of the three-phase alternating current is controlled based on the detected value from the rotation speed sensor 226 and the phase of the three-phase alternating current with respect to the rotor is controlled based on the detected value from the rotor position sensor 224.

The rotating magnetic field based on the phase and frequency is generated in the stator 230 by the three-phase alternating current. The rotation magnetic field of the stator acts on the permanent magnets 254 and 256 to generate magnet torque in the rotor 250 based on the permanent magnets 254 and 256. The rotation magnetic field acts on the auxiliary magnetic pole 290 of the rotor 250 to generate reluctance torque in the rotor 250 based on a difference in magnetic resistance between the magnetic circuit of the rotation magnetic field that passes through the magnets 254 and 256 and the magnetic circuit of the rotation magnetic field that passes the auxiliary magnetic pole 290. The rotation torque of the rotor 250 is a value determined based on both the torques, i.e., magnetic torque based on the permanent magnet and the reluctance torque based on the auxiliary magnetic poles.

The reluctance torque is generated due to a difference between the magnetic resistance when the rotation magnetic field generated by the stator winding passes through the magnet and the magnetic resistance when the rotation magnetic field passes through the auxiliary magnetic pole 290. Accordingly, the inverter device 620 shown in FIG. 4 controls the resultant vector of magneto motive force of armature by the stator winding 238 to be directed on an advance side of rotation direction than the central position of the auxiliary magnetic pole and reluctance torque to be generated when the rotation magnetic flux is in an advanced side phase with respect to the auxiliary magnetic pole 290 of the rotor.

The reluctance torque generates rotation torque in the direction that is added to the magnet torque generated by the permanent magnets 254 and 256 in a state of starting or low speed running of the rotating electrical machine, so that the necessary torque that has to be generated by the rotating electrical machine can be afforded by summation torque of the magnet torque and the reluctance torque. Therefore, the amount of the magnet torque to be generated may be decreased by an amount that corresponds to the amount of the reluctance torque and thus the magnetomotive force of the permanent magnet can be decreased. A decrease in magnetomotive force enables one to suppress induction voltage by the permanent magnet upon high speed running of the rotating electrical machine, making it easy to supply power to the rotating electrical machine upon high speed running. Further, an increase in reluctant torque has the effect of decreasing the amount of the magnet. Since rare earth permanent magnets are expensive, it is desirable from the economical viewpoint to be able to reduce the amount of the magnet to be used.

The above-mentioned stator winding can be used in induction type rotating electrical machines and permanent magnet type rotating electrical machines. By using such stator windings, rotating electrical machines that are produced with ease and are highly reliable can be obtained. Since a single conductor is present in the circumferential direction of slots, rotating electrical machines of which torque pulsation is decreased and having excellent productivity can be obtained. In the above-mentioned embodiments, a coil wound around a plurality of times can be produced by a single conductor and rotating electrical machines having a minimized number of connection points and having excellent productivity can be obtained.

The above-mentioned embodiments may be used singly or in any combinations. This is because the advantageous effects of the embodiments can be obtained singly or in combination in synergism. As far as the features of the present invention are not damaged, the present invention is not limited to the above-mentioned embodiments.

What is claimed is:

1. A rotating electrical machine comprising:
a stator including at least two element coils of the same phase each having a plurality of turns and connected to each other through a coil-to-coil connection wire, the element coils being arranged in adjacent slots, respectively; and
a rotor rotatably provided to the stator through a gap, wherein:
the element coils of the same phase are fitted in the adjacent slots so that wound around portions of the element coils partially overlap each other;
the coil-to-coil connection wire connects at a coil end portion of conductor wires extending from linear conductor wire portions of innermost wires of the element coils contained in the slots,
the coil-to-coil connection wire is held between the coil end portion and an end face of a stator core in an axial direction,
a height of an outer side of the coil-to-coil connection wire in an axial direction is smaller than a height of inner sides of the element coils,
in a consecutive double coil including two element coils of the same phase, two linear conductor wire portions in a first element coil and two linear conductor wire portions in a second element coil are arranged alternately in a circumferential direction of the stator,
each consecutive double coil comprises a first linear conductor wire portion and a second linear conductor wire portion defined, respectively, in the direction of rotation, and
the first linear conductor wire portion of the first element coil and the first linear conductor wire portion of the second element coil are arranged in adjacent slots.

2. A rotating electrical machine according to claim 1, wherein
at least one of the element coils is a lap winding coil having a slot number per phase per pole of 2.

3. A rotating electrical machine according to claim 1, wherein
an angle between the coil-to-coil connector wire and the end face of the stator core in the axial direction is smaller than an angle between a conductor wire of a coil end and the end face of the stator core in the axial direction.

4. A rotating electrical machine according to claim 1, wherein
the coil-to-coil connector wire is arranged in a space surrounded by a conductor wire of a coil end and the end face of the stator core in the axial direction.

5. A rotating electrical machine according to claim 1, wherein
a distance between coil ends of the same phase in a direction of the overlap of element coils is equal to or larger than a width of the conductor wire.

6. A rotating electrical machine according to claim 1, wherein
coil ends on a terminal connection side have substantially the same heights.

7. A rotating electrical machine according to claim 1, wherein:
the coil-to-coil connector wire connects conductor wires of two linear conductor wire portions arranged on inner sides out of the four linear conductor wire portions arranged in the circumferential direction to each other.

8. A rotating electrical machine according to claim 1, wherein:
the coil-to-coil connector wire connects conductor wires of two linear conductor wire portions arranged on outer sides out of the four linear conductor wire portions arranged in the circumferential direction to each other.

9. A rotating electrical machine according to claim 1, wherein:
the rotating electrical machine comprises a first consecutive double coil constituted by two linear conductor wire portions arranged on inner sides out of the four linear conductor wire portions arranged in a circumferential direction, connected to each other by the coil-to-coil connector wire and a second consecutive double coil constituted by two linear conductor wire portions arranged on outer sides out of the four linear conductor wire portions arranged in the circumferential direction, connected to each other by the coil-to-coil connector wire; and
terminal wires arranged on an outer circumference side of the stator core in the first and the second consecutive double coils are connected to each other, and terminal wires arranged on an inner circumference side of the stator core in the first and the second consecutive double coils are connected to each other.

* * * * *